US007270879B2

(12) United States Patent
McCrary

(10) Patent No.: US 7,270,879 B2
(45) Date of Patent: Sep. 18, 2007

(54) PARTICULATE MATERIAL CONTAINING THERMOPLASTICS AND METHODS FOR MAKING AND USING THE SAME

(75) Inventor: Avis Lloyd McCrary, Montgomery, TX (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 351 days.

(21) Appl. No.: 10/825,087

(22) Filed: Apr. 15, 2004

(65) Prior Publication Data

US 2005/0019574 A1 Jan. 27, 2005

Related U.S. Application Data

(60) Provisional application No. 60/462,694, filed on Apr. 15, 2003.

(51) Int. Cl.
B32B 5/16 (2006.01)

(52) U.S. Cl. .................. 428/402; 428/403; 428/404; 428/405; 428/407; 427/214; 427/221; 427/379; 523/130; 523/131; 523/132; 523/139; 523/145; 166/295

(58) Field of Classification Search ............... 428/402, 428/403, 404, 405, 407; 427/214, 221, 379; 166/295; 523/130, 131, 132, 139, 145
See application file for complete search history.

(56) References Cited

U.S. PATENT DOCUMENTS

| | | | |
|---|---|---|---|
| 3,690,622 A | 9/1972 | Brunner et al. | |
| 4,255,554 A | 3/1981 | Wuskell | |
| 4,426,467 A | 1/1984 | Quist et al. | |
| 4,439,489 A | 3/1984 | Johnson et al. | |
| 4,474,904 A | 10/1984 | Lemon et al. | |
| 4,585,064 A | 4/1986 | Graham et al. | |
| 4,694,905 A | 9/1987 | Armbruster | |
| 4,732,920 A | 3/1988 | Graham et al. | |
| 4,785,884 A | 11/1988 | Armbruster | |
| RE32,812 E | 12/1988 | Lemon et al. | |
| 4,923,714 A | 5/1990 | Gibb et al. | |
| 4,960,826 A | 10/1990 | Walisser | |
| 4,990,373 A | 2/1991 | Kittle | |
| 5,055,217 A | 10/1991 | Garcia et al. | |
| 5,218,038 A | 6/1993 | Johnson et al. | |
| 5,223,165 A | 6/1993 | Winstanley et al. | |
| RE34,371 E | 9/1993 | Rumpf et al. | |
| 5,296,584 A | 3/1994 | Walisser | |
| 5,362,842 A | 11/1994 | Graves et al. | |
| 5,389,716 A | 2/1995 | Graves | |
| 5,595,782 A | 1/1997 | Cole | |
| 5,603,745 A | 2/1997 | Pettersen et al. | |
| 5,733,952 A | 3/1998 | Geoffrey | |
| 5,788,879 A | 8/1998 | Ogura et al. | |
| 5,916,933 A | 6/1999 | Johnson et al. | |
| 5,916,966 A | 6/1999 | Walisser | |
| 5,952,440 A | 9/1999 | Walisser et al. | |
| 5,968,222 A | 10/1999 | Kodali | |
| 6,264,861 B1 | 7/2001 | Tavernier et al. | |
| 6,358,309 B1 | 3/2002 | Langford | |
| 6,364,019 B1 | 4/2002 | Aggour et al. | |
| 6,382,319 B1 | 5/2002 | Hill, Jr. et al. | |
| 6,406,789 B1 * | 6/2002 | McDaniel et al. | .......... 428/402 |
| 6,491,736 B1 | 12/2002 | Bell et al. | |
| 6,528,157 B1 | 3/2003 | Hussain et al. | |
| 6,582,819 B2 | 6/2003 | McDanial et al. | |
| 6,632,527 B1 * | 10/2003 | McDaniel et al. | .......... 428/402 |
| 2002/0133887 A1 | 9/2002 | Jo et al. | |
| 2002/0148388 A1 | 10/2002 | Varnadoe et al. | |
| 2003/0024165 A1 | 2/2003 | Antal, Jr. | |

FOREIGN PATENT DOCUMENTS

EP 0 308 257 B1 3/1994

OTHER PUBLICATIONS

H. Allcock et al., "Contemporary Polymer Chemistry", Prentice-Hall, Second Edition, p. 9-11 (1990).
Knop and Pilato, "Chemistry and Application of Phenolic Resins", p. 49-52 (1985) (Springer-Verlag).
American Petroleum Institute, Recommended Practices for Testing High-Strength Proppants Used in Hydraulic Fracturing Operations, API RP-60, Second Edition, p. 1-15 (Dec. 1995).
American Petroleum Institute, "Recommended Practices for Testing Sand Used in Hydraulic Fracturing Operations", API RP-56, Second Edition, p. 1-12 (Dec. 1995).
American Petroleum Institute, "Recommended Practices for Testing Sand Used In Gravel Packing Operations", API RP-58, Second Edition, p. 1-4 (Dec. 1995).
American Petroleum Institute, "Recommended Practices for Testing High Strength Proppants Used in Hydraulic Fracturing Operations", API RP-60, First Edition, p. 2-21 (Feb. 1, 1989).
International Search Report PCT/US 04/11558; International Filing Date Apr. 15, 2004.

* cited by examiner

Primary Examiner—Leszek Kiliman

(57) ABSTRACT

Disclosed herein is a particle comprising a particulate substrate; and a thermoplastic elastomer present on or in the substrate as an amount sufficient to improve the dust suppression of the particle above that which would occur if the thermoplastic elastomer was absent. Disclosed herein is a particle comprising a particulate substrate; and a thermoplastic elastomer, wherein the particle has a compressive strength retention of greater than about 50% as measured by a UCS test and a turbidity of about 10 to 200 NTU after a one hour ball mill test.

98 Claims, 16 Drawing Sheets

1 □ CONTROL
2 ▨ Modified with 1.3lb ENABLE
3 ▭ Modified with 2.0lb ENABLE

1 □ CONTROL
2 ▨ Modified with 1% HYCAR X33
3 ▭ Modified with 1% ENABLE
4 ⊞ Modified with 2.5% ENABLE 1 □ CONTROL
2 ☒ Modified with 1% HYCAR X22 (delayed)
3 ☐ Modified with 1% HYCAR X33 (immediate)
4 ☒ Modified with 2.5% HYCAR X33
5 ⊞ Modified with 5% HYCAR X33
6 ◇ Modified with 5% HYCAR X31
7 ⊡ Modified with 2.5% HYCAR X31

PARTICULATE MATERIAL CONTAINING THERMOPLASTICS AND METHODS FOR MAKING AND USING THE SAME

CROSS REFERENCE TO RELATED APPLICATIONS

This application claims the benefit of U.S. Provisional Application Ser. No. 60/462,694 filed Apr. 15, 2003.

BACKGROUND OF THE INVENTION

1. Field of the Invention

The present invention relates to particulate matter to which a thermoplastic elastomer has been applied. For example, the present invention relates to particles optionally individually coated with a first set of one or more layers of thermosetting resin, on a proppant such as sand or ceramic, and contains a thermoplastic elastomer. The present invention also relates to methods for making and using this product as a proppant, gravel pack, foundry sand, or for dust control that is normally associated with the production and handling of particulate materials such as sand, ceramic, fertilizer, coal, or the like. The thermoplastic elastomer may assist is particle strengthening, dust suppression, fracture suppression and other aspects of performance enhancement.

2. Background Description

The term "proppant" is indicative of particulate material which is injected into fractures in subterranean formations surrounding oil wells, gas wells, water wells, and other similar bore holes to provide support to hold (prop) these fractures open and allow gas or liquid to flow through the fracture to the bore hole. Proppants are commonly used to prop open fractures formed in subterranean formations such as oil and natural gas wells during hydraulic fracturing.

One class of proppants contains particles lacking a resin coat. The uncoated proppants are typically particles of sand, ceramics, glass beads, walnut shells, or the like, as known in the art.

Another class of proppants includes coated proppants wherein individual particles are coated with a resin. The individual particles are typically particles of sand, ceramics, glass beads, walnut shells, or the like, as known in the art. The proppant coatings may be precured or curable. The precured proppants include a substrate core and a coating of resin cured prior to insertion into the subterranean formation. The curable proppants include a substrate core and a coating of resin cured downhole to form a consolidated proppant pack. Resin formulations typically used for curable coatings on proppant substrates (sand, ceramic, or the like) result in a highly crosslinked coating on the surface of the substrates.

Another class of proppants includes a homogeneous composite particle comprising fine particulate material bound by a binder wherein the binder comprises curable or precured resin. The composite particles have special and unique properties such as controlled plasticity and elasticity behavior. Because of these unique properties, the composite particles can be applied as the sole proppant in a 100% proppant pack (in the hydraulic fracture) or as a part replacement of existing commercial available ceramic and/or sand-based proppants, resin-coated and/or uncoated, or as blends between those. The composite particles can also be employed as the sole media in a 100% filtration pack or blended with other filtration media. Such composite particles are disclosed by U.S. Pat. No. 6,406,789 and U.S. patent application Ser. No. 09/450,588 and U.S. patent application Ser. No. 09/774,881, incorporated herein by reference in their entirety.

Curable resin coated proppants and precured resin coated proppants have been commercially available for use as propping agents. A curable proppant has a resin coating that includes a resin that is at least partially, and not fully, cured. In contrast, a "precured" proppant has a cured resin coating. The terms "cured" and "curable" are defined for the present specification by three tests historically employed in the art.

Temperature Stick Point Test: placing coated material on a heated melt point bar and determining the lowest temperature at which the coated material adheres to the melt point bar. A "sticking temperature" of greater than 350° F., typically indicates a cured material, depending upon the resin system used.

Acetone Extraction Test: an acetone extraction method, as described below, to dissolve the fraction of resin within the coating that is uncured.

Compressive Strength Test: no bonding, or no consolidation of the coated particles, following wet compression at 1000 psi at 200° F. for a period of as much as 24 hours, typically indicates a cured material.

However, unless otherwise indicated, the terms cured and curable are defined by the Acetone Extraction Test.

Another well completion system protects the well borewall production integrity by a tightly packed deposit of aggregate comprising sand, gravel or both between the borewall and the production pipe thereby avoiding the time and expense of setting a steel casing from the surface to the production zone which may be many thousands of feet below the surface. The gravel packing is inherently permeable to the desired hydrocarbon fluid and provides structural reinforcement to the borewall against an interior collapse or flow degradation. Such well completion systems are called "open hole" completions. The apparatus and process by which a packed deposit of gravel is placed between the borehole wall and the production pipe is encompassed within the definition of an "open hole gravel pack system." Unfortunately, other commercially available open hole gravel pack systems for placing and packing gravel along a hydrocarbon production zone have been attended by a considerable risk of precipitating a borehole wall collapse due to fluctuations in the borehole pressure along the production zone. These pressure fluctuations are generated by surface manipulations of the downhole tools that are in direct fluid circulation within the well and completion string. Further discussion of gravel packs is presented by U.S. Pat. No. 6,382,319 incorporated herein by reference.

Moreover, sand control is another consideration when extracting hydrocarbons such as natural gas and crude oil from the earth's subsurface formations, from boreholes drilled into hydrocarbon bearing production zones. Production of oil, gas and water from unconsolidated or weakly consolidated formations is normally accompanied by the production of formation sand particles along with the produced fluids. The production of sand with the well fluids poses serious problems such as the erosion of sub-surface and surface production facilities and the accumulation of the sand in the wellbore and surface separators. Several methods such as gravel packing, screens and plastic consolidation have been in use for many years with varying success. However, these methods have several-technical and cost limitations. Further discussion of sand control is presented by U.S. Pat. No. 6,364,019 incorporated herein by reference in its entirety.

To maintain the productivity of a borehole and control the flow of hydrocarbon fluids from the borehole, numerous other devices and systems have been employed to prevent the natural forces from collapsing the borehole and obstructing or terminating fluid flow therefrom. One such system provides a full depth casement of the wellbore whereby the wellbore wall is lined with a steel casing pipe that is secured to the bore wall by an annulus of concrete between the outside surface of the casing pipe and the wellbore wall. The steel casing pipe and surrounding concrete annulus is thereafter perforated by ballistic or pyrotechnic devices along the production zone to allow the desired hydrocarbon fluids to flow from the producing formation into the casing pipe interior. Usually, the casing interior is sealed above and below the producing zone whereby a smaller diameter production pipe penetrates the upper seal to provide the hydrocarbon fluids a smooth and clean flowing conduit to the surface.

Although particles, whether proppants, gravel pack, or for sand control are very useful for improving the production of oil and gas from subterranean formations it would be desirable to increase yields of these particles during their manufacture by reducing fracturing into particles of any other sizes than the original targeted materials. The particles, for example dust, generated from mechanical abuse during manufacturing may reduce yield of particles of suitable size for use. The particles may also be associated with potential plugging that may occur within the formation and a subsequent reduction of the hydrocarbon production. For purposes of this description, dust is defined as dry solid particles less than about 300 microns (about 50 mesh) or less.

The dust or particles generated during transportation to the site of the subterranean formation, and handling at the site of the subterranean formation may also reduce the activity of coated particles available for use. Dust injected into or generated within the subterranean formation may also have detrimental effects.

Thus, it would be desirable to provide particles for use as proppants, gravel pack, and/or for sand/proppant control in subterranean formations with improved suppression of dust formation or fracture during their manufacture, transportation, or use as it is being handled at the subterranean formation both above ground (prior to injection into the formation) and downhole within the formation.

U.S. Pat. No. 4,732,920 to Graham et al., incorporated herein by reference, discloses a particulate material for use in treating subterranean formations as a proppant and/or as a fluid loss agent in hydraulic fracturing and as a screening material in gravel packing comprised of heat curable particles capable of forming a cohesive mass. The particles comprised of a high strength center, a coupling agent chemically bound to the center with a heat curable resin coated over the center. '920 to Graham asserts the incorporation of a small amount of polyvinyl acetal resin into the resin coating to increase the resin strength and thereby reduce its brittleness. '920 to Graham asserts this results in the virtual elimination of the dusting problem. The preferred polyvinyl acetal for '920 to Graham is polyvinyl butyral. Specifically '920 to Graham asserts a polyvinyl butyral, BUTVAR B-76, manufactured by Monsanto Co. strengthens the resin and eliminates the dust problem. (B-76 denotes a solid thermoplastic material that is offered at present by Solutia, not Monsanto.) Polyvinyl formals may also be used.

It would be desirable to increase the capacity of the particles to take an impact and not fracture. There is still a need for technology to reduce or eliminate dustiness and improve fracture resistance and strength of resin coated particles employed in subterranean formations.

SUMMARY OF THE INVENTION

The present invention relates to particulates having a coating comprising a thermoplastic, preferably also elastomeric, polymer which acts to reduce the fracturing that occurs on impact of the particle during handling or use. A thermoplastic elastomer is a polymer that can be processed as a thermoplastic material but also possesses the properties of a conventional thermoset rubber. The invention includes embodiments having a coating of the thermoplastic elastomeric polymer only, as well as embodiments having single or multiple coatings of curable or precured resins applied to a particulate substrate. For example, at least one member of the group consisting of an inner coating and/or the outermost coating includes thermoplastic elastomer. The present invention also includes embodiments comprising a homogeneous composite particle comprising fine particulate material bound by a binder wherein the binder comprises curable or precured resin and thermoplastic elastomer. Such composite particles, absent the thermoplastic elastomers, are disclosed by U.S. Pat. No. 6,406,789 and U.S. patent applicaton Ser. Nos. 09/450,588 and 09/774,881 filed Feb. 1, 2001 incorporated herein by reference in their entirety.

Advantageously, this invention has the capability to reduce the tendency of particulate materials to fracture at conditions that normally begin to degrade the particles to form small fragments, even dust. The result is an improved capability for these particles to function (without failure) in otherwise damaging conditions. Thus, these thermoplastic elastomers may be effective to reduce the dust or other particles associated with the manufacturing, transportation, handling and use of proppants (with or without a resin coating) or other particles known to fracture and/or create dust when stressed such as coal, fertilizers, resin coated foundry sand, and ceramic particles or sand.

By selecting substrates and coatings suitable for foundry use, the present invention may be used to make resin coated foundry sands, for use in making cores, molds or other foundry molding shapes, wherein the resin coating comprises thermoplastic elastomer polymer. Use of resin coated sand in foundry use is described by U.S. Pat. No. 5,916,933, incorporated herein by reference in its entirety.

This invention also provides methods of making and using such particles.

Resin coated proppants include a proppant substrate, such as sand or ceramic, individually coated with one or more resin coatings, and includes a thermoplastic elastomer. The resulting resin coated proppant particle is less likely to fracture and/or form dust, than would be the same particle without the thermoplastic elastomer, during manufacturing, transportation, handling, and use both above ground and downhole at the site of the subterranean formation.

These thermoplastic elastomers include at least one thermoplastic elastomeric polymer component, which is amorphous or semi-crystalline. A thermoplastic is any material that softens when it is heated. An amorphous polymeric material contains randomly entangled chains. A microcrystalline (usually abbreviated to "crystalline") material contains domains in which the polymer chains are packed in an ordered array. These "crystalline" domains are embedded in an amorphous polymer matrix to form semi-crystalline material. Both amorphous and crystalline thermoplastics are glasses at low temperatures and both change from a glass to a rubbery elastomer or flexible plastic as the temperature is raised. This change from glass to elastomer usually takes place over a fairly narrow temperature range, and this transition point is known as the glass transition temperature (Tg).

Glass transition temperature can be compared to the characteristic melting point of a low-molecular-weight crystalline compound, although care should be taken to remember that Tg is definitely not a melting temperature in the accepted sense of the word. It is more a measure of the ease of torsion of the backbone bonds rather than of the ease of separation of the molecules. At temperatures above Tg, amorphous polymers behave in a different manner from crystalline polymers. As the temperature of an amorphous polymer is raised, the rubbery elastomeric phase gradually gives way to a soft, extensible elastomeric phase, then to a gum and finally to a liquid. No sharp transition occurs from one phase to another. Crystalline polymers, in contrast, retain their rubbery elastomeric or flexible properties above the glass transition, until the temperature reaches the melting temperature at which point the material liquifies. An elastomer is a polymer in the temperature range between its glass transition temperature and its liquifaction temperature. While by some definitions an elastomer has its Tg at or below room temperature such that it is an elastomer at room temperature, for purposes of this specification a thermoplastic elastomer is a thermoplastic polymer, which has a glass transition temperature at or below 50 degrees C. For additional background see Allock et al, *Contemporary Polymer Chemistry*, 2d ed. Prentice-Hall, Inc., p.p. 9-11 (1990), incorporated herein by reference.

Accordingly, thermoplastic elastomeric polymers for use with thermosetting resin coated particles are made by polymerizing ethylenically unsaturated monomers, other than polyvinyl acetal or polyvinyl formals, and have a glass transition temperature (Tg) below 50 degrees C., preferably below 25 degrees C., or below room temperature (70 degrees F./about 21 degrees C.), or below 0 degrees C. or minus 25 degrees C. In contrast, polyvinylbutyral has a Tg of 75 degrees C. (167 degrees F.). Typically, such polymers for use with particles lacking a thermosetting resin coating are made by polymerizing ethylenically unsaturated monomers. Preferably monomers to create polymers of Tg below 50 degrees C. or below 25 degrees C. or below 0 degrees C. or minus 25 degrees C.) other than polyvinyl acetal or polyvinyl formals.

The ethylenically unsaturated monomers are typically selected from at least one member of the group consisting of olefins (ethylene, propylene), C1 to C12 alkyl (meth)acrylates, acrylonitriles, alpha-olefins, butadiene, isoprene, ethylenically unsaturated siloxanes, anhydrides, and ethers. In the present specification the term (meth)acrylates encompasses acrylates or methacrylates and the term (meth)acrylonitrile encompasses acrylonitrile or methacrylonitrile The preferred elastomeric semi-crystalline polymers have a softening point in the range of 55 to 80 or to 100 degrees C. (131 to 176 or to 212 degrees F.). A typical preferred semi-crystalline polymer is a member of the ENABLE family of products having a softening point in the range from about 60 to 80 degrees C. and available from ExxonMobil Chemical Co. For example, ENABLE EN 33900 and ENABLE 33330 are ethylene n-butyl acrylate copolymers in the ENABLE family.

Potential advantages of this thermoplastic elastomer(s) are to retain or enhance proppant properties while reducing dust formation and/or fracture. Typical proppant properties include compressive strength (for proppants with curable coatings), or crush strength (for proppants with precured coatings), or uncoated proppant while minimizing or eliminating fracture and/or dust formation. The compressive strength of a sample of the coated proppant can be measured by the Unconfined Compressive Strength (ICS) test, as defined below under the heading "Particle Parameters". Advantageously, the particles having a bondable coating (coatings which bond by curing or another mechanism) can have a high value of UCS, e.g., a UCS of at least about 100 psi, at least about 500 psi, at least about 1000 psi, or at least about 1500 psi.

The thermoplastic elastomer(s) may also unexpectedly act as a lubricant during the manufacture of coated materials. During the coating step, a 25% reduction was noted in the amperage to turn an agitator used for mixing the material when processing resin coated substrates treated with the elastomer. The reduction in the amperage draw, indicates the use of the elastomer will function to lubricate the particles and avoid agglomeration. This is significant in terms of power consumption reduction, and in allowing the mixer to accept a larger total charge, even at the same amperage demands.

Further evidence of reduced agglomeration can be seen in the screening of the product from the mixer, where the amount of clusters (and other oversized clumps) was reduced. This allows a yield improvement of 2 to 5% of the desired in-size particles by reducing agglomerates.

The thermoplastic elastomer may also unexpectedly result in a particle having at least a 10 percent reduction, or at least a 20 percent reduction, in weight loss under API RP 56 (Section 9, Crush Resistance) at a pressure sufficient to typically cause destruction (fracturing) of the particles as compared to a particle which is the same but lacks the elastomer. For example, for a 10 percent reduction if the particle without elastomer had a 15% weight loss, the modified particle with the elastomer would have at most a 13.5% weight loss.

The thermoplastic elastomer may also unexpectedly result in a particle having sufficient thermoplastic elastomer to reduce water pickup by the particle by 20% as compared to a particle, which is the same but lacks the elastomer.

Another benefit is for the thermoplastic elastomer to act as a coupling agent to assist the organic resin to adhere to sand or ceramic.

Unless otherwise indicated the term polymer indicates polymers and co-polymers, e.g., ter-polymer, regardless of whether they are block or random.

DESCRIPTION OF THE PREFERRED EMBODIMENTS

Figure 1:
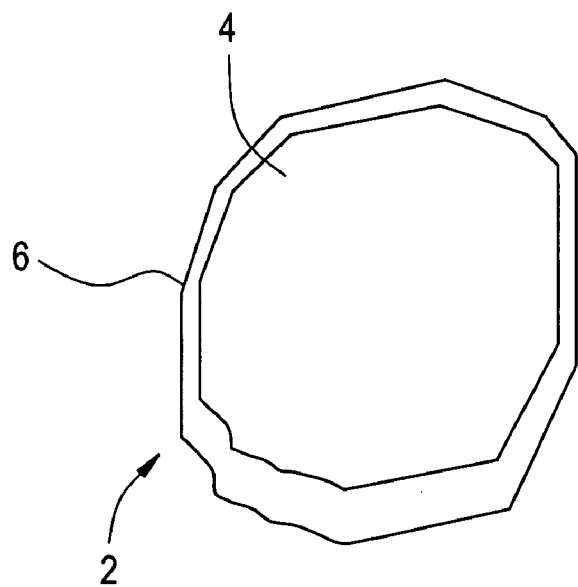
FIG. 1 shows a typical coated particle of the present invention.

In a first embodiment the present invention provides a particle comprising a substrate containing a thermoplastic elastomer but lacking a resinous coating. Typically, to make this embodiment the additive is contacted with a process stream of the substrate at a temperature sufficient to cause the additive to melt and flow and agitation is applied to effectively coat the surface of the substrate. For example, the thermoplastic elastomer may be added 0 to 5 minutes, or 1 to 3 minutes, after the hot substrate passes into a mixer.

Advantageously, when applying the thermoplastic elastomer to particulate substrates such as ceramic particles or sand particles without another resinous coating, the ceramic producers (substrate processors) would apply the additive at a point in their process where the substrate is already/still hot and kept agitated.

In a second embodiment, the present invention provides a coated particle comprising a substrate coated with at least one resinous coating containing a thermoplastic elastomer. The total amount of resin used to coat the substrate will generally vary from about 1 to 8% and preferably about 2 to 4% by weight of the substrate. The incremental amount of resin, used to form each coating layer(s), should be sufficient to form a substantially continuous coating on the entire surface of the particle. For certain multi-layer embodiments, this amount can be about 10% by weight of the total amount of resin, leaving the remaining 90% of the total amount of resin as one or more increments or layers of the same material to be applied in any number of additional applications. Preferably, any one increment should not exceed about 70%, and most preferably not exceed about 50% or 30% by weight of the total amount of resin.

In a third embodiment the present invention provides a composite particle comprising a core of a homogeneous particle comprising fine particles (filler) held together by a binder and optionally the core is further provided with at least one resinous coating, wherein the binder and/or the coating contains a thermoplastic elastomer. The filler particles may be employed with any conventional proppant resin. The type of resin and filler making up the proppant will depend upon a number of factors including the probable closure stress, formation temperature, and the type of formation fluid. If one or more coatings are applied the total amount of resin used to coat the core will generally vary from about 1 to 8% and preferably about 2 to 4% by weight of the core. The incremental amount of resin, used to form each coating layer(s), should be sufficient to form a substantially continuous coating on the entire surface of the particle. For certain multi-layer embodiments, this amount can be about 10% by weight of the total amount of resin, leaving the remaining 90% of the total amount of resin as one or more increments or layers of the same material to be applied in any number of additional applications. Preferably, any one increment should not exceed about 70%, and most preferably not exceed about 50% or 30% by weight of the total amount of resin.

The present invention also provides methods to make and use such particles of the above-listed embodiments.

Thermoplastic Elastomers

These thermoplastic elastomers comprise at least one elastomeric, typically thermoplastic, polymer or copolymer component that is typically amorphous and/or semi-crystalline. If the polymers and copolymers have an amorphous portion, the amorphous portion has a glass transition temperature of less than 50 or less than 25 or less than 0 or less than minus 25 degrees C. If the polymers and copolymers have a semi-crystalline portion the semi-crystalline portion preferably has a melting point from 40 to 80 degrees C., e.g., 60 degrees C.

An example of a thermoplastic amorphous polymer that behaves like a fluid at room temperature is HYCAR material. In contrast, the Tg for BUTVAR B-76 is about 150 degrees F. (70 degrees C.).

A preferred semi-crystalline polymer is a member of the ENABLE family of products available as particles (or pellets) having an equivalent diameter of about 0.125 to 0.25 inches and having a melting point in the range from about 58 to 80 degrees C. and available from ExxonMobil Chemical Co. For example, ENABLE EN 33900 (also known as ENBA) and ENABLE EN 33330 are ethylene n-butyl acrylate copolymers in the ENABLE family.

Such thermoplastic elastomers are typically polymers and copolymers based on units derived from ethylenically unsaturated monomers selected from at least one member of the group consisting of (alkenes such as ethylene and propylene), C1 to C12 alkyl (meth)acrylates, (meth)acrylonitriles, alpha-olefins, butadiene, isoprene, ethylenically unsaturated siloxanes, anhydrides, and ethers. In the present specification the term (meth)acrylates encompasses acrylates or methacrylates and the term (meth)acrylonitrile encompasses acrylonitrile or methacrylonitrile.

Typical thermoplastic elastomers comprise at least one polymer selected from the group consisting of C1 to C8 alkyl(meth)acrylate polymers; copolymers of C1 to C8 alkyl(meth)acrylates with monomers such as ethylene, styrene, and (meth)acrylonitrile; butadiene homopolymers; and butadiene-acrylonitrile copolymers with functionality at their chain ends. Examples of functional groups for the butadiene-acrylonitrile copolymers are carboxyl (COOH), methacrylate vinyl, amine (NH or $NH_2$), or epoxy. While not being limited to any particular theory, it is believed by the inventors that when employed in the present invention, the functional groups will react with the resin molecules.

Preferred thermoplastic elastomers comprise at least one member selected from the group consisting of butyl acrylate polymer, copolymers of butyl acrylate with other acrylates, ethylene, ethyl acrylate, or 2-ethylhexyl acrylate. For example, a preferred thermoplastic elastomer is ethylene-n-butyl acrylate copolymer optionally blended with n-butyl acrylate or other thermoplastic polymers. Other preferred thermoplastic elastomers comprise at least one member selected from the group consisting of carboxy terminated butadiene-acrylonitrile copolymer, methacrylate vinyl terminated butadiene-acrylonitrile copolymer and amine terminated butadiene-acrylonitrile copolymer. The molecular weight of the thermoplastic elastomers may be controlled by use of chain transfer agents, such as alkyl mercaptans.

The thermoplastic elastomers are added as liquids, dispersions of fine particles, or dry particles or pellets.

For the first embodiment of solid particles lacking a resin coating, the amount of thermoplastic elastomer generally varies between 0.01 and 4.0 parts, per hundred parts of the uncoated particles. It is generally for the amount of thermoplastic elastomer to be varied in an amount of about 0.02 to about 2 parts, preferably in an amount of about 0.05 to about 1 parts, per hundred parts of the particulate substrate.

For the second embodiment of particles including resin coated substrate, the amount of thermoplastic elastomer generally varies between 0.25 and 50 parts, between 0.25 and 20 parts, typically between 0.25 and 10 parts, or between 0.25 and 5 parts, or between 0.5 and 2.5 parts, based on 100 parts thermosetting resin. Typically, for embodiments having about 1 to 8% resin, the particle contains about 0.005 to 4.0, or about 0.005 to 2.0, weight percent of the thermoplastic elastomer based upon weight of the particle. Typically, the thermoplastic elastomer is added simultaneously or after the resin it is modifying. For example, the thermoplastic elastomer may be added 0 to 5 minutes, or 1 to 3 minutes, after the resin.

For the uncoated versions of the third embodiment of particles including composite particles, the amount of thermoplastic elastomer generally varies between 0.01 and 10 parts, 0.01 and 5.0 parts, 0.01 and 1.0 parts, or 0.02 and 0.5 parts, or 0.04 and 0.1 parts, per 100 parts of composite particles without the thermoplastic elastomer.

For the coated versions of the third embodiment of particles including composite particles. The amount of thermoplastic elastomer potentially in the coating is the same as described above for coated single particle substrate.

Substrate

For uncoated solid particles of the present invention, and coated solid particle embodiments of the present invention, the substrate can be any of the solid materials normally used as propping agents, gravel pack or for sand control. For example, suitable particulate material, i.e., includes sand, naturally occurring mineral fibers, such as zircon and mullite, ceramic, such as sintered bauxite, or sintered alumina, other non-ceramic refractories such as milled or glass beads, or walnut shells. The individual particles of the particulate substrate have a particle size in the range of USA Standard Testing screen numbers from about 8 to about 100 (i.e. screen openings of about 0.0937 inch to about 0.0059 inch).

20/40 mesh particles are typical. Preferred substrate diameter is from about 0.01 to about 0.04 inches. Bauxite, unlike alumina, contains naturally occurring impurities and does not require the addition of sintering agents. The substrate particles are hard and resist deforming or can be deformable. Deforming is different from crushing wherein the particle deteriorates. Moreover, the substrates do not melt at a temperature below 200° F. or 225° F., typically the substrates do not melt at a temperature below 450° F. or 550° F.

Additionally, the substrate may be of other particulate material, such as those used for sand control and gravel packs or foundry sands. The particle size for sand control and gravel pack are in the same size ranges as proppants but has a narrower range of size. Foundry sand is usually 40/100 mesh.

Composite Particles

The deformable composite particles comprise a homogeneous particle comprising fine filler particles held together by a binder. These composite particles are further described below and in U.S. Pat. No. 6,406,789, U.S. patent applicaton Ser. No. 09/450,588 filed Nov. 30, 1999 and U.S. patent applicaton Ser. No. 09/774,881 filed Feb. 1, 2001, all of which are incorporated herein by reference in their entirety.

A composite particle suitable for proppant or filtration media comprises filler particles, e.g., finely divided mineral or finely divided mineral and fiber, bound by a suitable organic or inorganic binder. A typical organic binder is selected from at least one member of the group consisting of a phenolic resole resin or phenolic novolac resin, urethanes (for example polyol resins, e.g., phenolic resin, dissolved in petroleum solvents which are cross-linkable with a polymeric isocyanate using an amine catalyst, such as SIGMA SET resins available from Borden Inc., Louisville, Ky.), alkaline modified resoles set by esters (for example, ALPHASET resins available from Borden Inc., Louisville, Ky.), melamine, and furans. Typical inorganic binders include silicates, e.g., sodium silicate, phosphates, e.g., polyphosphate glass, borates, or mixtures thereof, e.g., silicate and phosphate.

The filler particles should be inert to components in the subterranean formation, e.g., well treatment fluids, and be able to withstand the conditions, e.g., temperature and pressure, in the well. Filler particles, e.g., one or more of ground almond shells, ground coconut shells, ground walnut shells, finely divided minerals and fibers, of different dimensions and/or materials may be employed together.

The dimensions and amount of filler particles, as well as the type and amount of resin, are selected so the filler particles remain within the resin of the proppant rather than being loosely mixed with proppant particles. The containment of filler particles prevents loose particles from clogging parts, e.g., screens, of an oil or gas well. Moreover, the attachment prevents loose particles from decreasing permeability in the oil or gas well.

If desired, the amount and material of the one or more filler materials, as well as the resin and optional cement, are selected such that the composite particle has a bulk density of 0.50 to 1.30 grams per cubic centimeter ($gm/cm^3$), preferably 0.95 to 1.10 $gm/cm^3$, and a grain density (particle density) of 0.90 to 2.20 $gm/cm^3$, preferably 1.40 to 1.60 $gm/cm^3$. For example, a composite particle may comprise a low density filler material (such as ground walnut shells) together with a higher density filler material (such as finely divided silica), and a binder of polymer resin and cement, so long as the respective amounts of these ingredients results in a composite particle having the desired low density. Low density is advantageous in many uses because it facilitates transporting the composite particles and facilitates injection into the subterranean formation. For example, low density gravel packing is very advantageous because it is easy to use.

The present composite particles can be substantially spherical. The composite particles typically have a sphericity of at least 0.7, preferably at least 0.85, and most preferably at least 0.90, as measured according to API Method RP56 Section 5.

The composite particles are made by mixing filler particles selected from at least one member of the group consisting of finely divided minerals, fibers, ground walnut shells, ground almond shells, and ground coconut shells with at least one resinous binder. In particular, the composite particles are made by mixing the filler particles with a first portion of binder to form substantially homogeneous core particles of granulated product comprising the filler particles and the first portion of binder. By "substantially homogeneous" it is meant that the core particle has an absence of a large substrate particle as common, for example, for coated sand proppants. To strengthen the composite particles, a second portion of binder may be coated onto the core particles of granulated product. The core binders are preferably precured. The outer coating resins are curable or precured.

For purposes of this application, the term "cured" and "crosslinked" are used interchangeably for the hardening that occurs in an organic binder. However, the term "cured" also has a broader meaning in that it generally encompasses the hardening of any binder, organic or inorganic, to form a stable material. For example, crosslinking, ionic bonding and/or removal of solvent to form a bonded material in its final hardened form may be considered curing. Thus, mere removal of solvent from an organic binder prior to crosslinking may or may not be curing depending upon whether the dry organic binder is in final hardened form.

The filler particles of the present invention may be employed with any conventional proppant resin. The type of resin and filler making up the proppant will depend upon a number of factors including the probable closure stress, formation temperature, and the type of formation fracturing fluid.

FIG. 1 shows a proppant particle 2 comprising a substrate particle 4, and a resin coating 6. The resin, crosslinking agent, and substrate particle 4 are mixed to produce the proppant 2. The proppant 2 is prepared such that the total weight of the coating 6 is from about 1 to about 8 weight percent of the weight of the coated proppant. The substrate particle 4 has a pre-coated size in the range of USA Standard Testing screen numbers from about 8 to about 100. An uncoated particle would be the substrate particle without the coating.

Figure 2:
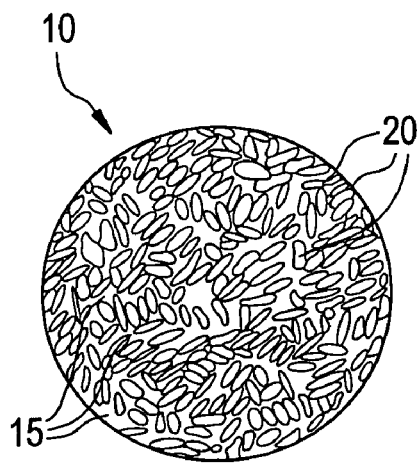
FIG. 2 shows a typical composite particle of the present invention.

FIG. 2 shows an embodiment of a composite particle 10 comprising filler particles 20 and a resin binder 15.

Figure 3:
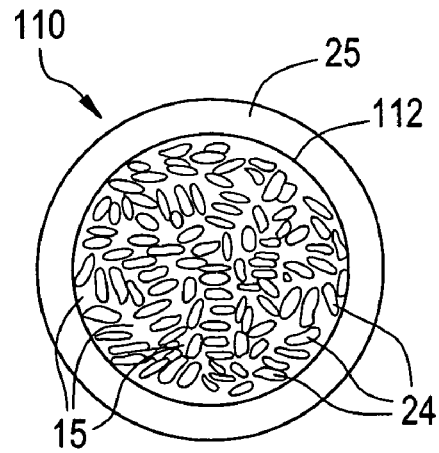
FIG. 3 shows a typical composite particle of the present invention with a coating.

FIG. 3 shows a coated composite proppant particle 110 having a core 112, of resin 15 and filler particles 24, coated by a second resin coating 25.

The deformable water-insoluble particulate material may be blended with non-deformable water-insoluble particulate material.

Finely Divided Minerals as Fillers

The finely divided minerals include at least one member of the group consisting of fly ash, silica (quartz sand), alumina, fumed carbon, carbon black, graphite, mica, silicate, e.g., orthosilicates or metasilicates, calcium silicate, calcined or uncalcined kaolin, talc, zirconia, boron and glass. Microcrystalline silica is especially preferred. A typical silicate for use as filler is NEPHELINE SYENITE, a whole grain sodium potassium alumina silicate available from Unimin Corporation, New Canaan, Conn. The particles of finely divided minerals range in size from about 2 to about 60 µm. Typically, the particles of minerals have a $d_{50}$ of about 4 to about 45 µm, preferably about 4 to about 6 µm. The parameter $d_{50}$ is defined as the diameter for which 50% of the weight of particles have the specified particle diameter (or less) Preferred filler would be angular or sub-angular rather than rounded in shape. One example of such preferred material is MIKRODORSILIT 120L microcrystalline silica flour, available from Capital Gebr. Dorfner GmbH and Company, Germany.

Fibers as Fillers

The fibers may be any of various kinds of commercially available short fibers. Such fibers include at least one member selected from the group consisting of milled glass fibers, milled ceramic fibers, milled carbon fibers, natural fibers, and synthetic fibers, e.g., crosslinked novolac fibers, having a softening point above typical starting temperature for blending with resin, e.g., at least about 200 degrees F., so as to not degrade, soften or agglomerate. A typical fiber is KYNOL novoloid fiber available from American Kynol, Inc of Pleasantville, N.Y.

The typical glasses for fibers include E-glass, S-glass, and AR-glass. E-glass is a commercially available grade of glass fibers typically employed in electrical uses. S-glass is used for its strength. AR-glass is used for its alkali resistance. The carbon fibers are of graphitized carbon. The ceramic fibers are typically alumina, porcelain, or other vitreous material.

Fiber lengths range from about 6 microns to about 3200 microns (about ⅛ inch). Preferred fiber lengths range from about 10 microns to about 1600 microns. More preferred fiber lengths range from about 10 microns to about 800 microns. A typical fiber length range is about 0.001 to about 1/16 inch. Preferably, the fibers are shorter than the greatest length of the substrate. Suitable, commercially available fibers include milled glass fiber having lengths of 0.1 to about 1/32 inch; milled ceramic fibers 25 microns long; milled carbon fibers 250 to 350 microns long, and KEVLAR aramid fibers 12 microns long. Fiber diameter (or, for fibers of non-circular cross-section, a hypothetical dimension equal to the diameter of a hypothetical circle having an area equal to the cross-sectional area of the fiber) range from about 1 to about 20 microns. Length to aspect ratio (length to diameter ratio) may range from about 5 to about 175. The fiber may have a round, oval, square, rectangular or other appropriate cross-section. One source of the fibers of rectangular cross-section may be chopped sheet material. Such chopped sheet material would have a length and a rectangular cross-section. The rectangular cross-section has a pair of shorter sides and a pair of relatively longer sides. The ratio of lengths of the shorter side to the longer side is typically about 1:2-10. The fibers may be straight, crimped, curled or combinations thereof.

Ground Shells as Fillers

Typical low density filler materials are one or more materials selected from the group consisting of ground almond shells, ground coconut shells and ground walnut shells. These shells are ground to finely divided particles which range in size from about 2 to about 60 µm. Typically, the particles have a $d_{50}$ of about 4 to about 45 µm, preferably about 4 to about 6 µm. It is theorized that because these ground shells are porous, they absorb resin to strengthen the composite particle.

Resins

The term resin includes a broad class of high polymeric synthetic substances. Resin includes thermosetting materials and cold setting materials.

Specific thermosets may be individually selected from the group consisting of epoxy which is a heat set resin when used with a phenolic (however, epoxy sets with formaldehyde at various temperatures), phenol-formaldehyde resins, e.g., resole (a true thermosetting resin) or novolac (thermoplastic resin which is rendered thermosetting by a hardening agent), epoxy-modified novolac, furan resins, urea-aldehyde resins, melamine-aldehyde resins, polyester resins and alkyd resins and mixtures thereof. Examples of typical resins include phenol formaldehyde novolac, phenol formaldehyde resole, furan terpolymer, furan resin, a combination of phenolic and furan resin, epoxy modified phenolic, urethane resin or those resins disclosed in U.S. Pat. No. 4,585,064 to Graham et al. (herein incorporated by reference in its entirety).

If curable resins are desired, the curable resins used in the practice of the invention are any thermosetting resin capable of being coated on the substrate in an uncured form. Examples of such resins include phenol-aldehyde resins, melamine-aldehyde resins, resole and novolac resins, urea-aldehyde resins, epoxy resins and furan resins, as well as urethane resins.

Epoxy-modified novolac is disclosed by U.S. Pat. No. 4,923,714 to Gibb et al incorporated herein by reference. The phenolic resin comprises any of a phenolic novolac polymer; a phenolic resole polymer; a combination of a phenolic novolac polymer and a phenolic resole polymer; a cured combination of phenolic/furan resin or a furan resin to form a precured resin (as disclosed by U.S. Pat. No. 4,694,905 to Armbruster incorporated herein by reference); or a curable furan/phenolic resin system curable in the presence of a strong acid to form a curable resin (as disclosed by U.S. Pat. No. 4,785,884 to Armbruster). The phenolics of the above-mentioned novolac or resole polymers may be phenol moieties or bis-phenol moieties.

Specific cold setting resins include epoxy resins cured with an amine when used alone or with polyurethane, polyurethanes, alkaline modified resoles set by esters (ALPHASETs), furans, e.g., furfuryl alcohol-formaldehyde, urea-formaldehyde, and free methylol-containing melamines set with acid. For the purposes of this description, a cold set resin is any resin that can normally be cured at room temperature. Typically cold set resins cure at a temperature less than 150 degrees F. Thus, for example, at 200 degrees F., phenol-formaldehyde resin heat cures.

Urethanes are disclosed by U.S. Pat. No. 5,733,952 to Geoffrey. Melamine resins are disclosed by U.S. Pat. Nos. 5,952,440, 5,916,966, and 5,296,584 to Walisser. ALPHASET resins are disclosed by U.S. Pat. Nos. 4,426,467 and Re. 32,812 (which is a reissue of U.S. Pat. No. 4,474,904) all of which are incorporated herein by reference.

A common test used to measure curability is the percent acetone extractables test and is described below in the section titled Particle Parameters. However, it must be understood that the curable state of the resin used to coat the substrate is a process parameter, not a function of the resin itself. Specifically, the temperature at which the resin is applied, in combination with the amount or concentration of curative added, can effectively determine the "curability" level of the resin. Substantially cured resin has less than 5 wt. % acetone extractables. Substantially curable resin has more than 5 wt. % acetone extractables.

In coated particle embodiments, the total amount of resin used to coat the particulate matter will generally vary from about 1 to about 8% and preferably about 2 to about 4% by weight of the particulate matter. The incremental amount of resin, used to form each coating layer(s), should be sufficient to form a substantially continuous coating on the entire surface of the particle. For certain multi-layer embodiments, this amount can be about 10% by weight of the total amount of resin, leaving the remaining 90% of the total amount of resin as one or more increments or layers of the same material to be applied in any number of additional applications. Preferably, any one increment should not exceed about 70%, and most preferably not exceed about 50% or 30% by weight of the total amount of resin.

Resole Resins

The phenol-aldehyde resole resin has a phenol:aldehyde molar ratio from about 1:1 to about 1:3, typically from about 1:1 to about 1:1.95. A preferred mode of preparing the resole resin is to combine phenol with a source of aldehyde such as formaldehyde, acetaldehyde, propionaldehyde, furfuryl alcohol, benzaldehyde or paraformaldehyde under alkaline catalysis. During such reaction, the aldehyde is present in molar excess. It is preferred that the resole resin have a molar ratio of phenol to formaldehyde from about 1:1.1 to 1:1.6. A typical way to make resoles is to put a phenol in a reactor, add an alkaline catalyst, such as sodium hydroxide or calcium hydroxide, and aldehyde, such as a 50 weight % solution of formaldehyde, and react the ingredients under elevated temperature until the desired viscosity or free formaldehyde is achieved. Water content is adjusted by distillation. Elasticizers or plasticizers, such as bisphenol A or cashew nut oil, may also be present to enhance the binder elasticity or plasticity. Other known additives may also be present.

The resoles may be conventional resoles or modified resoles. Modified resoles are disclosed by U.S. Pat. No. 5,218,038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol.

Modified resole resins include alkoxy modified resole resins. Of alkoxy modified resole resins, methoxy modified resole resins are preferred. However, the phenolic resole resin which is most preferred is the modified orthobenzylic ether-containing resole resin prepared by the reaction of a phenol and an aldehyde in the presence of an aliphatic hydroxy compound containing two or more hydroxy groups per molecule. In one preferred modification of the process, the reaction is also carried out in the presence of a monohydric alcohol.

Phenols and aldehydes suitable for preparing the modified orthobenzylic ether-containing phenolic resole resins are generally any of the phenols and aldehydes, which may be utilized in the formation of phenolic resins. Metal ion catalysts useful in production of the modified phenolic resins include salts of the divalent ions of Mn, Zn, Cd, Mg, Co, Ni, Fe, Pb, Ca and Ba. Tetra alkoxy titanium compounds of the formula $Ti(OR)_4$ where R is an alkyl group containing from 3 to 8 carbon atoms, are also useful catalysts for this reaction. A preferred catalyst is zinc acetate.

A molar excess of aldehyde per mole of phenol is used to make the modified resole resins. Preferably the molar ratio of phenol to aldehyde is in the range of from about 1:1.1 to about 1:2.2. The phenol and aldehyde are reacted in the presence of the divalent metal ion catalyst at pH below about 7. To the reaction mixture is added an aliphatic hydroxy compound, which contains two or more hydroxy groups per molecule. The hydroxy compound is added at a molar ratio of hydroxy compound to phenol of from about 0.001:1 to about 0.03:1.

Useful hydroxy compounds which contain two or more hydroxy groups per molecule are those having a hydroxyl number of from about 200 to about 1850. The hydroxyl number is determined by the standard acetic anhydride method and is expressed in terms of mg KOH/g of hydroxy compound. Suitable hydroxy compounds include ethylene glycol, propylene glycol, 1,3-propanediol, diethylene glycol, triethylene glycol, glycerol, sorbitol and polyether polyols having hydroxyl numbers greater than about 200.

After the aliphatic hydroxy compound containing two or more hydroxy groups per molecule is added to the reaction mixture, heating is continued until from about 80% to about 98% of the aldehyde has reacted. The modified phenolic resole may be "capped" to be an alkoxy modified phenolic resole resin. In capping, a hydroxy group is converted to an alkoxy group by conventional methods that would be apparent to one skilled in the art given the teachings of the present disclosure.

Novolac Polymer-Containing Resins

An embodiment of the present invention employs resin which includes phenol-aldehyde novolac polymer. The novolac may be any novolac employed with proppants. The novolac may be obtained by the reaction of a phenolic compound and an aldehyde in a strongly acidic pH region. Suitable acid catalysts include the strong mineral acids such as sulfuric acid, phosphoric acid and hydrochloric acid as well as organic acid catalysts such as oxalic acid, or para toluenesulfonic acid. An alternative way to make novolacs is to react a phenol and an aldehyde in the presence of divalent inorganic salts such as zinc acetate, zinc borate, manganese salts, cobalt salts, or the like. The selection of catalyst may be important for directing the production of novolacs, which have various ratios of ortho or para substitution by aldehyde on the phenolic ring, e.g., zinc acetate favors ortho substitution. Novolacs enriched in ortho substitution, i.e., high-ortho novolacs, may be preferred because of greater reactivity in further cross-linking for polymer development. High ortho novolacs are discussed by Knop and Pilato, *Phenolic Resins*, p. 50-51 (1985) (Springer-Verlag) incorporated herein by reference. High-ortho novolacs are defined as novolacs wherein at least 60% of the total of the resin ortho substitution and para substitution is ortho substitution, preferably at least about 70% of this total substitution is ortho substitution.

The novolac polymer typically comprises phenol and aldehyde in a molar ratio from about 1:0.85 to about 1:0.4. Any suitable aldehyde may be used for this purpose. The aldehyde may be formalin, paraformaldehyde, formaldehyde, acetaldehyde, furfuryl alcohol, benzaldehyde or other aldehyde sources. Formaldehyde itself is preferred.

The novolac resins used in this invention are generally solids in the form of a flake, powder, or the like. The molecular weight of the novolac will vary from about 500 to 10,000, preferably 1,000 to 5,000 depending on their intended use. The molecular weight of the novolacs or other polymers in this description of the present invention are on a weight average molecular weight basis unless otherwise indicated. High-ortho novolac resins are especially preferred.

The novolac resin compositions typically comprise at least 10 weight percent novolac polymer, preferably at least about 20 weight percent novolac polymer, most preferably about 50 to about 70 weight percent novolac polymer. The remainder of the resin composition could include crosslinking agents, modifiers or other appropriate ingredients.

The phenolic moiety of the novolac polymer is selected from phenols of Formula I or bisphenols of Formula II, respectively:

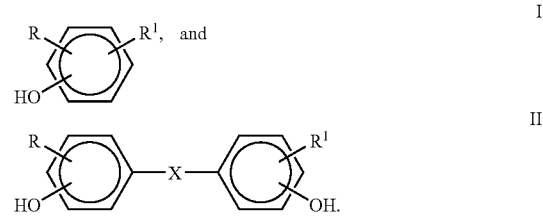

R and $R^1$ are independently alkyl, aryl, arylalkyl or H. In Formula II, R and $R^1$ are preferably meta to the respective hydroxy group on the respective aromatic ring. Unless otherwise defined, alkyl is defined as having 1 to 6 carbon atoms, and aryl is defined as having 6 carbon atoms in its ring. In Formula II, X is a direct bond, sulfonyl, alkylidene unsubstituted or substituted with halogen, cycloalkylidene, or halogenated cycloalkylidene. Alkylidene is a divalent organic radical of Formula III:

When X is alkylidene, $R^2$ and $R^3$ are selected independently from H, alkyl, aryl, arylalkyl, halogenated alkyl, halogenated aryl and halogenated arylalkyl. When X is halogenated alkylidene, one or more of the hydrogen atoms of the alkylidene moiety of Formula II are replaced by a halogen atom. Preferably the halogen is fluorine or chlorine. Also, halogenated cycloalkylidene is preferably substituted by fluorine or chlorine on the cycloalkylidene moiety.

A typical phenol of Formula I is phenol, per se. Typical bisphenols of Formula II include Bisphenol A, Bisphenol C, Bisphenol E, Bisphenol F, Bisphenol S, or Bisphenol Z.

The novolac polymers may contain any one of the phenols of Formula I, bisphenols of Formula II, or combinations of one or more of the phenols of Formula I and/or one or more of the bisphenols of Formula II.

For practical purposes, phenolic novolacs do not harden upon heating, but remain soluble and fusible unless a hardener (crosslinking agent) is present. Thus, in curing a novolac resin, a crosslinking agent is used to overcome the deficiency of alkylene-bridging groups to convert the resin to an insoluble infusible condition. Appropriate crosslinking agents include hexamethylenetetramine (HEXA), paraformaldehyde, oxazolidines, melamine resin or other aldehyde donors and/or the above-described resole polymers. Each of these crosslinkers can be used by itself or in combinations with other crosslinkers. The resole polymer may contain substituted or unsubstituted phenol. A resin composition of this invention typically comprises up to about 25 weight percent HEXA and/or up to about 90 weight percent resole polymers based on the total weight of coating composition. Where HEXA is the sole crosslinking agent, the HEXA comprises from about 5 to about 25 weight percent of the resin. Where the phenol-aldehyde resole polymer is the sole crosslinking agent, the resin contains from about 20 to about 90 weight percent of the resole polymer. The composition may also comprise combinations of these crosslinkers.

Additives are used for special cases for special requirements. The resin systems of the invention may include a wide variety of additive materials. The resin may also include one or more other additives such as a coupling agent such as a silane to promote adhesion of the coating to substrate, a silicone lubricant, a wetting agent, a surfactant, dyes, flow modifiers (such as flow control agents and flow enhancers), and/or anti-static agents. The surfactants may be anionic, nonionic, cationic, amphoteric or mixtures thereof. Certain surfactants also operate as flow control agents. Other additives include humidity resistant additives or hot strength additives. Of course, the additives may be added in combination or singly.

To make phenolic novolac polymers with one or more phenols of Formula I, the phenol is mixed with acidic catalyst and heated. Then an aldehyde, such as a 50 weight % solution of formaldehyde is added to the hot phenol and catalyst at elevated temperature. Water made by the reaction is removed by distillation to result in molten novolac. The molten novolac is then cooled and flaked.

To make novolac polymers with bisphenols of Formula II, the bisphenol is mixed with a solvent, such as n-butyl acetate, at elevated temperature. An acid catalyst such as oxalic acid or methane sulfonic acid is then added and mixed with the bisphenol and then an aldehyde, typically formaldehyde, is added. The reactants are then refluxed. It is noted that the preparation of the novolac resin can occur under acidic catalysis, or divalent metal catalysis (e.g., Zn, Mn), wherein the bisphenol is present in greater than equimolar amount relative to the source of aldehyde. After reflux, water is collected by azeotropic distillation with n-butyl acetate. After removal of the water and n-butyl acetate, the resin is flaked to yield resin products. Alternatively, the polymers can be made using water as a solvent.

The novolac polymer may optionally be further modified by the addition of VINSOL®, epoxy resins, bisphenol, waxes, or other known resin additives. One mode of preparing an alkylphenol-modified phenol novolac polymer is to combine an alkylphenol and phenol at a molar ratio above 0.05:1. This combination is reacted with a source of formaldehyde under acidic catalysis, or divalent metal catalysis (e.g., Zn, Mn). During this reaction, the combination of alkylphenol and phenol is present in molar excess relative to the formaldehyde present.

If desired, phenol-aldehyde novolacs or bisphenol-aldehyde novolacs may be modified by reacting these novolacs with an additional quantity of aldehyde using a basic catalyst. Typical catalysts used are sodium hydroxide, potassium hydroxide, barium hydroxide, calcium hydroxide (or lime), ammonium hydroxide and amines. In the case of phenol-aldehyde polymers or bisphenol-aldehyde polymers, the molar ratio of added aldehyde to phenolic moiety, based on the phenolic moiety monomeric units in the novolac, ranges from 0.4:1 to 3:1, preferably from 0.8:1 to 2:1. This achieves a crosslinkable (reactive) polymer having different chemical structures and generally higher molecular weights than the resole polymers obtained by a single step process which involves initially mixing bisphenol monomers and aldehyde with an alkaline catalyst at the same molar ratio of the combined aldehyde and bisphenol. Furthermore, it is feasible to use different aldehydes at different stages of the polymer preparation. These polymers can be used alone or with other polymers, such as phenol-aldehyde novolacs, bisphenol-aldehyde novolac, or combinations thereof, as a crosslinking agent, or as a component of crosslinking agents. When the aldehyde-modified polymers are employed as crosslinking agents, they may be used with other typical crosslinking agents such as those described above for novolac polymers.

Whether a resin binder or coating composition is of the precured or curable type depends upon a number of parameters. Such parameters include the ratio of the novolac resin to the curing agent; the acidity of the novolac resin; the pH of the resole resin; the amount of the crosslinking agent; the time of mixing the resin compositions and filler particles; the temperature of the resin compositions and filler particles during mixing; catalysts (if any) used during the mixing or coating and other process parameters as known to those skilled in the art.

A typical process for coating the resin onto particulate material is a hot coat process. In the hot coat process, sand (or other particulate material) is heated in a standard sand heater to a temperature above the melting point of the resin, but not high enough to cause the resin to fall apart or thermally degrade. Thereafter, the sand (or other particulate material) is removed from the heater and is placed in a mixer. Then the resin is added to the hot sand (or other particulate material) in the mixer. Because no additional heat is applied, the temperature of the sand when leaving the heater is high enough, such that the final coat(s) may be applied, but low enough, such that the rate of cure is capable of being controlled.

For example, the sand is heated to a temperature in a range from about 225 to about 550° F., about 350 to about 550° F., about 400 to about 550° F., about 400 to about 530° F., preferably about 400 to about 450° F., and removed from the heater, and placed in a mixer. Then, a curable resin is added to the heated sand, and the resin is allowed to coat the sand by mixing at a temperature in the range from about 225 to the initial temperature of the resin plus substrate mixture, for example about 225 to 450° F. or about 300 to 410° F. Typically, the particulate material, having the first coating, has dropped to about 300 to 380° F. or 330 to 380° F., following the application of the first coating. In the case of coating with novolac, typically, the novolac is provided in the form of a flake and simply melted at the temperature of the particles. When applying resin to make a proppant to have a precured coating the temperatures would typically be higher, e.g., about 10 to about 50 degrees F. higher or the material would be left in longer at the elevated temperature.

Typically, the thermoplastic elastomer is added simultaneously or after the resin it is modifying. For example, the thermoplastic elastomer may be fed to the mixer 0 to 5 minutes, or 0 to 3 minutes, or 1 to 3 minutes, after the resin. Time of addition of the thermoplastic elastomer affects product properties.

For example, ENABLE is a semi-crystalline material available as particles having an equivalent diameter of about 0.125 to 0.25 inches and a softening point of 77 degrees C. (171 degrees F.). Specifically preferred is ENABLE EN 33900 (also known as ENBA) that is an ethylene-n-butyl acrylate copolymer. It contains about 32.5 wt % n-butyl acrylate with the softening temperature of 138° F. (77 degrees C.). This has a sufficiently high melting point that it benefits from having more time to be heated than some other thermoplastic elastomers. Thus, ENABLE (discussed below in the Examples) is preferably added within one minute of the novolac, preferably together with the novolac rather than afterwards.

In contrast, HYCAR material is behaves as a fluid at room temperature. It, has a melting point below about 25 degrees C., is preferably added 1 to 3 minutes after the novolac has been added and had time to at least partially melt (reduce in viscosity and flowcoat the substrate).

Once the first resin has completely coated the particulate material (typically 30-60 seconds), a curative is added, and the ingredients are stirred for the desired time to produce a particulate material coated with a curable or cured resin. A coverage of 100% is desired, but it is considered within the scope of the invention to add the curative when the resin has only covered about 99.5%.

As mixing continues, the resin forms a coating on the particulate matter to produce a free flowing product comprised of individual particles coated with the cured or partially cured resin. Typically, a 40% hexa aqueous solution is supplied. It is also desirable to add a lubricant to the mix at some time after the last hexa addition and before the mix leaves the mixer. A coupling agent is typically added to the heated substrate or with the first resin addition. A typical lubricant is L45 silicone poly dimethoxy silicone manufactured by Dow Corning Corporation, Midland, Mich. (materials of this type are discussed in U.S. Pat. No. 4,439,489 to Johnson, et al., herein incorporated in its entirety) and a typical coupling agent is A1100 silane, If it is desired to include reinforcing fine particles in the coating, these may be embedded in the novolac flake or added separately (either at the same or different time as the flake).

If additional layers of coating of material the same or different from that of the first coating are to be applied, a temperature drop of between about 30-40° F. can be expected per layer, because no other heat is applied. Multiple layers of the coating may be used to smooth or "round off" the generally irregular shape of the sand or other particulate matter.

A second embodiment of a process is for making composite proppants, gravel packing, or filtration media of the present invention. In this embodiment, a binder stream and a filler particle stream are fed to a high intensity mixer to prepare a homogeneous slurry stream. Slurry stream feeds a granulator to produce a granulated product stream. The binder stream contains resin, water and conventional additives. Typically, the resin is a resole and may act as its own crosslinking agent. Coupling agents are also typical additives. A typical granulator is an Eirich mixer, such as an Eirich R11 mixer, manufactured by Eirich Machines, Inc., Gurnee, Ill.

Typically, the granulator is operated as a batch process and is operated as disclosed generally in EP 308 257 and U.S. Pat. No. Re. 34,371, both of which are incorporated herein by reference. For example, EP 308 257 discloses making ceramic particles in an Eirich machine described in U.S. Pat. No. 3,690,622. The machine comprises a rotatable cylindrical container, the central axis of which is at an angle to the horizontal, one or more deflector plates, and at least one rotatable impacting impeller usually located below the apex of the path of rotation of the cylindrical container. The rotatable impacting impeller engages the material being mixed and may rotate at a higher angular velocity than the rotatable cylindrical container.

The following sequence occurs in the mixer pelletizer (granulator): (1) nucleation or seeding at which time slurry is added near the impacting impeller; (2) growth of the spheroids during which the impacting impeller rotates at slower speed than during the nucleation step; and (3) polishing or smoothing the surfaces of the spheroids by turning off the impacting impeller and allowing the cylindrical container to rotate.

In the composite particles, the amount of binder (resin) generally comprises about 10 to about 30, preferably about 10 to about 25, weight percent of the total dry materials (resin, filler, or the like) fed to the granulator. The amount of binder being a water free value defined as the amount of resin, e.g., novolac and/or resole, and additives other than water. Typically, the mixing occurs in the presence of a coupling agent such as gamma/amino propyl trimethoxy silane. The coupling agent may be added to the mixer before, or premixed with the binder stream.

The mixing may occur in the presence of the thermoplastic elastomer. The thermoplastic elastomer may be premixed with the binder stream, or added to the mixer 0 to 5 minutes after the binder stream.

Typically, 0 to 50% of the total binder stream is water. Typically, mixing time ranges from 1 to 5 minutes at a pan rotation speed of 50 to 80 rpm and a chopper speed of 1400 to 1600 rpm. The granulation (nucleation time) ranges from about 2 to about 10 minutes with a vessel speed of 25 to 45 rpm and a chopper speed of 1400 to 1600 rpm. The smoothing is also known as "chopping." The temperature of the granulator during the above steps ranges from 10 to 40 degrees C.

The granulated material stream then passes to a curing apparatus. Typically, the curing apparatus is a drying oven operating at a residence time for the granulated material of about 1 minute to about 2 hours, at a temperature of about 90 to about 200 degrees C., preferably about 150 to about 190 degrees C. This produces a cured granulated product stream that feeds a screening apparatus to recover a proppant product stream of predetermined product size. A typical screening apparatus is a sieve such as a vibrating screen. A typical desired proppant particle has a $d_{50}$ from 0.4 to 0.8 mm, or a particle diameter range of 20 to 40 USS mesh (0.425 to 0.85 mm) or 30 to 40 USS mesh.

A third embodiment of a process for making proppants, gravel packing, or filtration media of the present invention resembles the process of the second embodiment except that the granulated material stream is fed dried but uncured to a refining apparatus to mechanically increase the sphericity of the granulated material to a sphericity of at least about 0.8, preferably at least about 0.85, and more preferably at least about 0.9, and produce a stream of such mechanically treated material.

If it is desired to coat the composite particles, then the cured (or partially cured) stream of composite particles discharge from the curing apparatus and then feed the coating apparatus. The coating apparatus is typically a profiled rotating drum or some form of batch mixer. This rotating drum apparatus may have a rotation speed of 16-20 rotations/min. Typically, the coating resin stream is preheated to 50-60 degrees C. and sprayed into the rotating drum apparatus (containing the formed composite particles) through a nozzle with air atomizing. This rotating drum apparatus operates as a batch process with a process time of about 5 to 20 minutes. If an Eirich mixer is employed as the coating apparatus, it typically operates at a vessel rotation speed of 20-40, preferably 30-35, rotations/min and a chopper speed of 700-1100, preferably 800-1000, rotations per minute with a process time of 2-10 minutes, preferably 2-5 minutes.

The coating stream typically contains a solution of resin, water, and conventional resin additives. Moreover, the coating stream may contain the thermoplastic elastomer, or the thermoplastic elastomer may be added to the particles in the mixer after (typically 0 to 5 minutes after) the coating stream. Alternatively, when a proppant having curable resin in its core is desired, the oven may be operated to merely dry the coated proppant.

The coated composite particles discharge from the coating apparatus as the coated proppant stream and then feed the curing apparatus. The curing apparatus is typically a chamber dryer which heats the proppant on flat plates (or it may be a rotary drier) to maintain the coated proppant at a suitable curing temperature, for example about 120 to about 180 degrees C. for a suitable curing time, for example about 1 minute to about 2 or more hours. If a proppant having a curable coating is desired, then curing apparatus is operated to dry, or partially cure, the coating. The cured proppant is discharged from the curing apparatus as a cured proppant particle stream, which is sieved in a sieving apparatus to recover a proppant product stream of a predetermined particle size range. A typical predetermined particle size range is about 20 to about 40 mesh. A typical sieving apparatus is a vibration sieve. Particles having a size outside the predetermined particle size are discharged.

Composite proppants may also be made by modifying the above processes by extruding pellets in an extruder and then mechanically making the pellets spherical (rather than granulating spherical pellets in an Eirich mixer.

Furan Resin

The furan resins are the thermosetting resins made by reacting furfuryl alcohol with formaldehyde or by the self-polymerization of furfuryl alcohol, or a combination of reacting furfuryl alcohol with formaldehyde followed by polymerization. Furfuryl alcohol can also be used in place of furfuryl alcohol. Furfuryl alcohol-formaldehyde resins are produced in a process that incorporates a water soluble multivalent metal salt as the catalyst. The use of a water soluble multivalent metal salt eliminates the necessity of using a protonic acid catalyst and the reaction is carried out under essentially hydrous conditions.

The water soluble multivalent metal salt catalysts which can be used in this reaction include the multivalent ions of manganese, zinc, cadmium, magnesium, cobalt, nickel, copper, tin, iron, lead and calcium. Preferred catalysts are zinc acetate, lead acetate or mixtures thereof.

An adequate amount of catalyst should be present in aqueous solution to catalyze the reaction. The mole ratio of furfuryl alcohol to formaldehyde can vary from about 3:1 to about 0.5:1, respectively, preferably about 2:1 to 1:1. The amount of water soluble multivalent metal salt used as the catalyst can vary from about 0.2 to about 8% by weight of the furfuryl alcohol. The reaction can be carried out at temperatures of about 85 to 105° C. at atmospheric pressure or at elevated temperatures under pressure. One of the primary concerns in carrying out the reaction at elevated temperatures and pressures is to prevent the reaction mixture from boiling.

Although the reaction has been described in terms of formaldehyde, other aldehydes of the general formula: R—CHO can also be used, wherein R is a hydrocarbon radical containing about 1-8 carbon atoms such as formaldehyde, acetaldehyde, propionaldehyde, furfuraldehyde, and the like. The preferred source of formaldehyde is 50% formalin.

Furfuryl alcohol or substituted furfuryl alcohol compounds can be used with the formula I

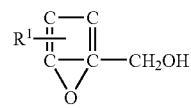

where $R^1$ can be an alkyl, aryl, alkenyl, alkylol, alkoxy, aryloxy, hydrogen, halogen or hydroxy radical. The preferred compound is furfuryl alcohol.

Suitable furan resin for use as a binder (for a composite particle) or coating (for a coated single particle substrate or a composite particle) for the particles of the present invention is disclosed by U.S. Pat. No. 4,694,905 to Armbruster incorporated herein by reference, or other furan resins known in the art. Furan resins are also described in U.S. Provisional Patent Application No. 60/385,578, filed Jun. 5, 2002, incorporated herein by reference in its entirety.

After being applied as binders or coatings, the furans may be cured with curatives, such as acid catalyst such as ammonium chloride or ammonium sulfate, and combined with the thermoplastic elastomers. The timing for addition of the thermoplastic elastomers would be determined as in the above-described description of timing for adding the thermoplastic elastomers to phenolic novolac resins.

Furans employable in the present invention include resins made from urea formaldehyde and furfuryl alcohol; urea formaldehyde, phenol formaldehyde and furfuryl alcohol; phenol formaldehyde and furfuryl alcohol; or formaldehyde and furfuryl alcohol.

Accordingly, composite particles are prepared by mixing uncured thermosetting phenolic resin and uncured thermosetting furan resin or a terpolymer of phenol, furfuryl alcohol and formaldehyde with filler. The filler may be preheated to an operating temperature of from about 225 to about 450 degrees F. The resin is then added while the filler is being mixed to form the composite particles. As mixing is continued, the resin cures to produce a free flowing product comprised of filler and the cured resin.

The composite particles may then be coated with the resin by a similar procedure.

Although it is possible to employ furans without the use of a catalyst, it is preferred to use a curing catalyst, which is sufficiently non-volatile at the operating temperatures, to accelerate the cure of the resin. The curing catalyst can be incorporated into or premixed with the resin or added to the mixture after the resin has been added. The preferred method is to add it to the mixer after the resin has been added. The advantage of the catalyst is that its use can result in a lower coating temperature and/or faster processing time. The catalyst can be used as is or dissolved in water or other suitable solvent system depending on the catalyst. A strong acid catalyst must be diluted with water to prevent localized reaction of the catalyst with the resin before the catalyst has had a chance to mix with the resin. Solid catalysts that do not melt below the mixing temperature are preferably used in aqueous solution. Catalyst may also be generated in situ.

Specific catalysts include acids with a pKa of about 4.0 or lower, such as phosphoric, sulfuric, nitric, benzenesulfonic, toluenesulfonic, xylenesulfonic, sulfamic, oxalic, salicylic acid, and the like; water soluble multivalent metal ion salts such as the nitrates or chlorides of metals including Zn, Pb, Ca, Cu, Sn, Al, Fe, Mn, Mg, Cd and Co; and ammonia or amine salts of acids with a pKa of about 4.0 or lower, wherein the salts include the nitrates, chlorides, sulfates, fluorides, and the like. The preferred class of catalyst is the ammonia salts of acids and the preferred catalyst is aqueous ammonium nitrate.

The amount of catalyst used can vary widely depending on the type of catalyst used, type of resin used, mixing temperature and type of mixer. In general, the amount of catalyst solids can range from about 0.2% to 10% based on the weight of the resin.

It is desirable to add a lubricant to the mix at some point after the catalyst is added and before the product "breaks down" into free flowing particles. The lubricant is preferably one that is liquid at the mixing temperature and has a sufficiently high boiling point so that it is not lost during the mixing process. Suitable lubricants include vegetable oil, e.g., soy or corn oil, low vapor pressure lubricating oil, liquid silicone such as Dow Corning Silicone 200, mineral oil, paraffin wax, petrolatum, or the synthetic lubricant ACRAWAX CT (a bis-stearamide of a diamine, available from Glyco Chemicals, Inc., Greenwich, Conn.).

It is also desirable to include a silane additive to ensure good bonding between the resin and the particulate matter. The use of organofunctional silanes as coupling agents to improve interfacial organic-inorganic adhesion is especially preferred.

In a cold set process for making composite particles and coating composite particles with a furan resin of formaldehyde and furfuryl alcohol a filler stream and liquid acid stream feed an Eirich mixer wherein they are mixed to produce a slurry stream. The slurry stream and a furan resin (of formaldehyde and furfuryl alcohol) stream feed an Eirich mixer operating at high speed. The resin cures in the Eirich mixer to form composite particles of filler and cured resin which discharge as a core stream. Optionally, the core stream feeds a fluid bed dryer. In the fluid bed dryer the composite particles are dried using ambient to 50 degrees C. air from an air stream to remove excess solvent and/or assist setting. This produces a stream of dried composite particles. If desired, an endless belt (not shown) with an overhead heater may be substituted for the fluid bed dryer.

If it is desired to coat composite particles or single particle substrates with furan resin (of formaldehyde and furfuryl alcohol), the uncoated composite particles or single particle substrates, a furan resin stream, a hydrogen peroxide stream, a thermoplastic elastomer stream, and $SO_2$ feed a standard foundry mixer. In the mixer the $SO_2$ and hydrogen peroxide form sulfuric acid in situ and the sulfuric acid cures the resin. This results in a proppant stream of cured coated composite particles or coated single particle substrates. If desired, proppant stream may feed an optional dryer (not shown) which dries the cured coated cores using ambient to 50 degrees C. air stream to remove excess solvent or to a dryer (not shown) comprising endless belts with an overhead infrared heater. The proppant stream may also be sieved (not shown) to recover the desired size particle with the remainder recycled.

Combination of Furan Resin and Resole Resin

The above-discussed furan resin may be used together with resole resin by the above-described processes listed for furan. Typically the weight ratio of the furan resin to the resole resin ranges from 9:1 to 1:9.

Terpolymer of Phenol, Furfuryl Alcohol and Formaldehyde

A terpolymer of phenol, furfuryl alcohol and formaldehyde can also be used in place of separate phenolic and furan resins.

A phenol-formaldehyde-furfuryl alcohol terpolymer is prepared from the catalytic reaction of phenol, formaldehyde and furfuryl alcohol, wherein the catalyst is a water soluble multivalent metal salt, and wherein the reaction is carried out under essentially hydrous conditions. The common water soluble salts of multivalent metal ions which can be used as the catalyst in the present invention are less costly than the organic solvent soluble salts at equal equivalents of metal ion that are used in the process disclosed in U.S. Pat. No. 4,255,554 to Wuskell. The use of a water soluble multivalent metal salt eliminates the necessity for controlling the reaction pH in the manner necessary with an acid catalyst. However, the multivalent metal salt catalyzed reaction must be operated at a pH of less than 7.0. When uncontaminated phenol, formalin, furfuryl alcohol and zinc or lead acetate are mixed in the proper proportions, the pH is always less than 7.0.

The water soluble multivalent metal salts used as the catalysts to make this terpolymer include the multivalent ions of manganese, zinc, cadmium, magnesium, cobalt, nickel, tin, copper, iron, lead, and calcium. Preferred catalysts are zinc acetate or lead acetate, and mixtures thereof.

The terpolymer reaction can be carried out by initially reacting furfuryl alcohol and formaldehyde at temperatures of about 85° to 105° C., at atmospheric pressure, then adding phenol and continuing the reaction to a viscosity of about 100 to 10,000, preferably about 200 to 5,000 centipoises, measured at a temperature of about 25° C. However, the reaction can be conducted at elevated temperatures of up to about 140° C. in pressurized reaction vessels, taking care to ensure that the reaction mixture does not boil under these elevated conditions. The reaction can also be carried out by initially reacting phenol and formaldehyde, then adding the furfuryl alcohol and continuing the reaction to a viscosity of about 100 to 10,000 cps, preferably about 200 to 5,000 cps, measured at about 25° C. Alternatively, the reaction can be carried out by reacting phenol, furfuryl alcohol and formaldehyde simultaneously in the presence of the water soluble multivalent metal salt catalysts.

It is generally desirable to remove excess water from the reaction products by distillation. The excess water is the fraction above the amount necessary to solubilize the multivalent metal salt catalyst. However, sufficient water should be present to maintain enough multivalent metal salt catalyst in aqueous solution to catalyze the reaction. The resulting phenol-formaldehyde-furfuryl alcohol terpolymer can be used as is or diluted with any suitable solvent, including furfuryl alcohol or water.

In general, the mole ratio of phenol to furfuryl alcohol can vary from about 0.1:1 to about 10:1, respectively. The mole ratio of formaldehyde to the combination of phenol and furfuryl alcohol can vary from about 0.5:1 to 2:1. The amount of catalyst can vary from about 0.2% to about 8% by weight of the total amount of phenol and furfuryl alcohol.

Although the reaction has been described in terms of formaldehyde, other aldehydes of the general formula, R—CHO, can also be used, wherein R is a hydrocarbon radical containing about 1 to about 8 carbon atoms such as acetaldehyde, propionaldehyde, furfuraldehyde, paraformaldehyde, the solid low molecular weight polymer of formaldehyde, and the like. The preferred form of formaldehyde is in the hydrous state, such as formalin.

Furfuryl alcohol or substituted furfuryl alcohol compounds can be used with the formula II:

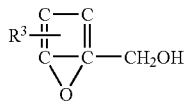

where $R^3$ can be an alkyl, aryl, alkenyl, alkylol, alkoxy, aryloxy, halogen, hydrogen or hydroxy radical. The preferred compound is furfuryl alcohol.

In addition, although phenol is the preferred phenolic reactant, other substituted phenols can also be used, especially those phenols having the formula III:

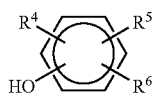

wherein $R^4$, $R^5$ and $R^6$ can independently be hydrogen, hydrocarbon radicals, oxyhydrocarbon radicals, hydroxy radicals or halogen, and substituted such that either the two ortho, one ortho and the para, or the two ortho and the para positions are unsubstituted. In general, the phenols that can be used are those that are suitable for making phenolic resins. Some examples are o-cresol, m-cresol, p-cresol, octyl phenol, nonyl phenol, 3,5-dimethoxy phenol, p-tert-butylphenol, p-butoxyphenol, resorcinol, 3,5-xylenol, 3-5-diethylphenol, catechol, 3,5-dibutylphenol and the like.

After being applied as coatings, these terpolymers may be cured with curatives such as acid catalyst such as ammonium chloride or ammonium sulfate. Terpolymers are also disclosed by U.S. Provisional Patent Application Ser. No. 60/385,578, filed Jun. 5, 2002, incorporated herein by reference.

To make coated particles with single particle substrates, e.g. sand, the terpolymer is applied to hot substrates, e.g. sand, and flows on the substrate to coat the substrate as described above for applying novolac resin to hot substrate. The times of mixing, temperatures of mixing, and amounts of catalyst or curing agents are controlled to make either curable or pre-cured coatings as desired. There is interplay among these parameters. For example, when curable coatings are desired, a temperature increase could be offset by a lower level of acid catalyst, i.e., ammonium chloride or ammonium sulfate for curing furan resin, or the resole or HEXA to cure the novolac, to achieve the same degree of curability as if a lower temperature and a higher amount of catalyst or curing agent had been employed.

When employing the terpolymer as a binder for fine particulate material to make composite particles, it may be applied as described above for novolac resin used to bind fine particles to make a composite particle with the exception that an acid catalyst, i.e., ammonium chloride or ammonium sulfate is employed for curing furan resin, rather than the resole or HEXA employed to cure the novolac.

Urethane Resins

Polyurethane resins are made by mixing a polyisocyanate component, a polyhydroxy component and a catalyst. Typically the polyhydroxy component is a polyhydroxy phenolic component dissolved in solvent. Generally the solvents are mixtures of hydrocarbon and polar organic solvents such as organic esters. Exemplary hydrocarbon solvents include aromatic hydrocarbons such as benzene, toluene, xylene, ethyl benzene, high boiling aromatic hydrocarbon mixtures, heavy naphthas and the like.

The polyhydroxy component is generally a phenolic resole resin or alkoxy modified resole resin as described above. The isocyanate component may vary widely and has a functionality of 2 or more. As defined herein, polyisocyanates include isocyanates having such functionality of 2 or more, e.g., diisocyanates, triisocyanates, or the like. Exemplary useful isocyanates are organic polyisocyanates such as tolylene-2,4-diisocyanate, tolylene-2,6-diisocyanate, and mixtures thereof, particularly crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4''-triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following general Formula III:

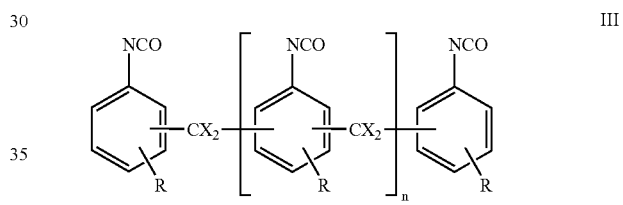

wherein R is selected from the group consisting of hydrogen, chlorine, bromine, and alkyl groups having 1 to 5 carbon atoms; X is selected from the group consisting of hydrogen, alkyl groups having 1 to 10 carbon atoms and phenyl; and n has an average value of generally about 0 to about 3. The preferred polyisocyanate may vary with the particular system in which the binder is employed.

Coupling Agents

In the practice of this invention with urethanes, coupling agents may be employed. Such coupling agents include, for example, organo silanes which are known coupling agents. The use of such materials may enhance the adhesion between the binder and the filler. Examples of useful coupling agents of this type include amino silanes, epoxy silanes, mercapto silanes, hydroxy silanes and ureido silanes.

Catalysts

The above-described isocyanate and/or below-described epoxy compositions are cured by means of a suitable catalyst. The catalyst employed is generally a volatile catalyst or a liquid catalyst. At least enough catalyst is employed to cause substantially complete reaction of the polyhydroxy phenolic resin component and the isocyanate component and/or cure the epoxy.

Preferred exemplary curing catalysts are volatile basic catalysts, e.g., tertiary amine gases, which are passed through a mass of core particles being formed or coated, with an inert carrier such as air or carbon dioxide. Exemplary volatile tertiary amine catalysts, which result in a rapid cure at ambient temperature that may be employed in the practice of the present invention include trimethyl-amine, triethylamine and dimethylethylamine and the like.

Exemplary liquid tertiary amines, which are basic in nature include those having a $pK_b$ value in a range of from about 4 to about 11. The $pK_b$ value is the negative logarithm of the dissociation constant of the base and is a well-known measure of the basicity of a basic material. The higher the number is, the weaker the base. Bases falling within the mentioned range are generally, organic compounds containing one or more nitrogen atoms. Preferred among such materials are heterocyclic compounds containing at least one nitrogen atom in the ring structure. Specific examples of bases which have a $pK_b$ value within the range mentioned include 4-alkyl-pyridines wherein the alkyl group has from 1 to 4 carbon atoms, isoquinoline, arylpyridines, such as phenyl pyridine, acridine, 2-methoxypyridine, pyridazines, 3-chloropyridine, and quinoline, N-methylimidazole, N-vinylimidazole, 4,4-dipyridine, phenylpropylpyridine, 1-methylbenzimidazole and 1,4-thiazine. Additional exemplary, suitable preferred catalysts include, but are not limited to, tertiary amine catalysts such as N,N-dimethylbenzylamine, triethylamine, tribenzylamine, N,N-dimethyl-1,3-propanediamine, N,N-dimethylethanolamine and triethanolamine. It is to be understood that various metal organic compounds can also be utilized alone as catalysts or in combination with the previously mentioned catalyst. Examples of useful metal organic compounds which may be employed as added catalytic materials are cobalt naphthenate, cobalt octate, dibutyltin dilaurate, stannous octate and lead naphthenate and the like. When used in combinations, such catalytic materials, that is the metal organic compounds and the amine catalysts, may be employed in all proportions with each other.

The liquid amine catalysts, if desired, can be dissolved in suitable solvents such as, for example, the hydrocarbon solvents mentioned hereinabove. The liquid amine catalysts are generally employed in a range of from about 0.5% to about 15% by weight, based on the weight of the phenolic resin component present in a composition in accordance with the invention.

The curing time can be controlled by varying the amount of liquid catalyst added. In general, as the amount of catalyst is increased, the cure time decreases. Furthermore, curing takes place at ambient temperature without the need for subjecting the compositions to heat, or gassing or the like. However, if desired preheating of the filler may be employed to raise the temperature of the filler to accelerate the reactions and control temperature and thus, provide a substantially uniform operating temperature on a day-to-day basis. The filler may be typically preheated to from about 30 degrees F. to as high as 120 degrees F. and preferably to about 75 degrees F. to 100 degrees F. However, such preheating is neither critical nor necessary in carrying out the practice of this invention.

To make uncoated composite particles with polyurethane resin, the filler is admixed with at least a binding amount of the polyhydroxy component, e.g., phenolic resole resin dissolved in sufficient solvent to have a viscosity below about 1000 centipoises, and an isocyanate component, having a functionality of two or more. This solvent comprises hydrocarbon solvents, polar organic solvents and mixtures thereof. There is no criticality in the order of mixing the polyhydroxy component and isocyanate component with the filler. The components and filler may be mixed in suitable mixing devices, such as mullers, continuous mixers, ribbon blenders and the like, to uniformly blend the filler with the polyhydroxy component and isocyanate component and shape the admixture into uncured cores. Then the uncured cores are subjected to a sufficient amount of a gaseous amine catalyst to catalyze the reaction between the components and form the uncoated composite particles. Typically, thermoplastic elastomer is added to the mixer either simultaneous with or after the catalyst. If desired, the composite particles are sieved to recover the desired size particles with the remainder recycled.

In alternative embodiments to make uncoated composite particles, a liquid catalyst rather than the above-described gaseous catalyst is employed for curing the polyurethane. The liquid catalyst may be admixed to the phenolic component or isocyanate component prior to mixing the filler with the phenolic and isocyanate components, or added as a separate stream. For example, the filler, phenolic resin and catalyst may be premixed in a mixer operating at low speed of 50 to 80 rpm. Then the isocyanate stream would feed an Eirich mixer operating at high speed. If desired, the premixing and the high speed mixing may be accomplished in the same Eirich mixer by controlling feed rates and mixing speed. Then the resin cures in the high speed mixer to form composite particles. Typically, thermoplastic elastomer is added to the mixer either simultaneous with or after the catalyst. Optionally, the composite particles are then sent to a fluid bed drier that dries the composite particles using ambient to 50 degrees C. air to remove excess solvent and/or assist setting.

If coated composite particles or coated single substrate particles are desired, the uncoated composite particles or uncoated single substrate particles, the phenolic (hydroxy) component, the isocyanate component and the catalyst feed a standard foundry mixer, wherein a coating is formed on the composite particles or single substrate particles and then cured. For example, the polyhydroxy and polyisocyanate components are coated onto the uncoated composite particles or uncoated single substrate particles, and then the gaseous or liquid catalyst is applied. The thermoplastic elastomer is added to the mixer either simultaneous with or after the catalyst. Then the cured coated particles optionally feed a fluid bed dryer which dries the cured coated particles using ambient to 50 degrees C. air stream to remove excess solvent. If desired, the fluid bed dryer could be omitted or replaced by a rotary dryer or a chamber having an inclined, vibrating perforated plate with hot air in downflow, e.g., a WOLVARINE dryer.

The cured coated particles are typically sent to classification to collect proppants having the desired particle size. Particles that are too small may be recycled to the pre-mixer. Particles that are too large may be crushed and then recycled to the pre-mixer.

Also, urethane binders typically have a curing exotherm that increases its temperature during curing. This higher temperature increases curing speed. If additional curing is desired, a small amount (less than 3 wt. %) of hot catalyst or hardener may be added during mixing.

SIGMA SET Binders

A class of polyurethane binders are SIGMA SET resins. These are phenolic resin dissolved in petroleum solvents that are cross-linkable with a polymeric isocyanate using an amine catalyst. They are available from Borden, Inc., Louisville, Ky. A typical blend for coating composite proppant provides 1000 lbs of cores coated with a 10 weight percent coating of a mixture of 60 pounds of SIGMA CURE MR71, 40 pounds of SIGMA SET 6605 and 2 pounds of SIGMA SET 6710 available from Borden, Inc., Louisville, Ky. Typically, the SIGMA SET 6710 is mixed with SIGMA CURE MR71 before use. They are employed as are the above-described polyurethanes.

Epoxy Resin

Epoxy resins are commercially available and prepared from either glycidyl materials such as the ethers, produced by the reaction of epichlorohydrin with a phenol or alcohol, or epoxies, such as the product from the reaction of peracetic acid with a linear or cycloaliphatic olefin. The epoxy resin molecule is characterized by the reactive epoxy groups:

IV serving as terminal linear polymerization points. Crosslinking or cure is accomplished through these groups or through hydroxyls or other groups present. The well-known epoxy resins are usually prepared by the base-catalyzed reaction between an epoxide, such as epichlorohydrin and a polyhydroxy compound, such as bisphenol A.

Suitable epoxy resins can be selected from glycidyl ethers made from bisphenol A and epichlorohydrin. These resins are available in liquid form having a typical viscosity of about 200 to about 20,000 centipoises, and an epoxide equivalent weight of about 170 to about 500 and weight average molecular weight of about 350 to about 4000. Typical epoxy resins include ARALDITE 6005 sold by Ciba-Geigy Corporation or EPN 1139 novolac-based epoxy resin such as a liquid epoxy novolac resin manufactured by Ciba-Geigy Corporation. A preferred epoxy resin is Dow DER 331 manufactured by Dow Chemical Company, Midland, Mich. However, solid epoxy resins (solid in the neat state) may be employed if they are soluble in the binder/coating resin system and reactive.

In general, preferred bisphenol A-based epoxy resin for the present invention would have approximately the structure given in Formula V below. These types of resins are commercially available in a range of molecular weights, epoxy equivalents, and viscosities. Typically, these epoxy resins are reaction products of bisphenol A and epichlorohydrin as shown, for example, by Formula V:

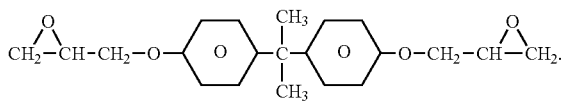

V

The reaction products polymerize to form resins having the following general Formula VI:

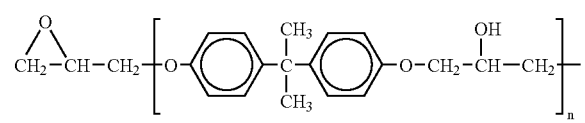

VI

-continued

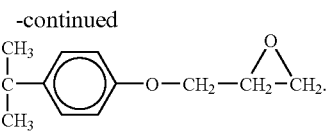

In Formula VI, n is the number of repeating units and may be from 0 to about 15. Although the preferred formulation employs the above type of epoxy, other epoxy resins are useful. These would include any epoxy resins that are at least di-functional and soluble in the resin system. The upper limit of functionality occurs where the epoxy is insoluble, or intractable, in the resin system. The resin system would include the base resin and the solvents and plasticizers the base resin is dissolved into. The two parameters, functionality and solubility, are key to the application for improved resistance to water-based coatings. If an epoxy resin is soluble in the resin system, and if it is "cross-linkable" (minimally di-functional), then the properties disclosed relative to resistance to water-based coatings would be attainable in varying degrees.

The epoxy resin is uncured when added to the binder/coating resin systems of the present invention. The epoxy resin is then cured to the appropriate degree of conversion. Epoxy resins may be cross-linked by various routes, and the resin systems presently disclosed provide several of these routes. Epoxy-epoxy polymerizations initiated by tertiary amines, for example, are well known mechanisms in the field of epoxy chemistry. Such tertiary amines are described above as catalysts for curing polyurethane resins. Epoxy-hydroxyl polymerization may occur if properly catalyzed. Both organic and inorganic bases have been used as catalysts for epoxy-hydroxyl polymerization. A tertiary amine is one such catalyst. It should also be apparent to one skilled in the art that heat will aid the polymerizations discussed herein.

The uncoated filler and epoxy resin composite proppants may be made by a process similar to the above-described process for making composite proppants with filler and polyurethane resin. For example, in a cold set process, an epoxy stream and filler stream feed a pre-mixer operating at 50 to 80 revolutions per minute (rpm) to form a mixed stream. Then the mixed stream and catalyst stream feed an Erich mixer operating at high speed. The resin cures in the Erich mixer to form uncoated composite particles of filler and cured resin binder which discharge as a composite particle stream. The uncoated composite particles are then contacted with the thermoplastic elastomer in the mixer. Optionally, the composite particle stream feeds a fluid bed drier to dry the composite particles using ambient to 50 degrees C. air to remove excess solvent and/or assist setting. This produces a stream of dried composite particles.

If coated composite particles or coated single substrate particles are desired, the uncoated composite particles or uncoated single substrate particles feed a standard foundry mixer operating at 50 to 80 rpm. An epoxy stream and a catalyst stream feed the standard foundry mixer, to coat the particles and then cured to the appropriate degree of conversion. The coated particles then contact the thermoplastic elastomer in the mixer. This forms coated particles which feed an optional fluid bed dryer for drying the cured coated particles using an ambient to 50 degrees C. air stream to remove excess solvent.

As in the case of the urethanes, the premixing step and high speed mixing can both be performed in the Erich mixer by adjusting its speed.

If desired, epoxy groups may be used to modify other groups such as phenolics to produce an epoxy modified phenolic resin. These can be further modified by the thermoplastic elastomers.

Alkaline-modified Resoles Set by Esters

Alkaline-modified resoles settable by esters, e.g., ALPHASET resins available from Borden Inc., Louisville, Ky., are disclosed by U.S. Pat. Nos. 4,426,467 and Re. 32,812 (which is a reissue of U.S. Pat. No. 4,474,904), all of which are incorporated herein by reference.

Typical alkaline-modified resoles settable by esters comprises an aqueous solution, having a solids content of from 50% to 75% by weight, of a potassium alkali-phenol-formaldehyde resin having the following characteristics:

(a) a weight average molecular weight (Mw) of from 700 to 2000;
(b) a formaldehyde:phenol molar ratio of from 1.2:1 to 2.6:1; and
(c) a KOH:phenol molar ratio of from 0.5:1 to 1.2:1 and preferably 0.6:1 to 1.2:1.

At ratios less than 0.5 the speed of cure and product strength are much reduced. The use of KOH:phenol ratios lower than 0.6 is not preferred with resins having $M_w$ (weight average) less than 800 because the speed of cure and product strength is below optimum.

The potassium alkali can be present in the resin during manufacture or, more usually, post added to resin as KOH, preferably in aqueous solution of suitable strength. If desired, rather than using only potassium hydroxide as a base, the base may be selected from the group of potassium hydroxide, sodium hydroxide, lithium hydroxide, or mixtures thereof.

Suitable esters for curing the alkaline-modified resoles include low molecular weight lactones, e.g., gamma-butyrolactone, propiolactone, and xi-caprolactone, and esters of short and medium chain, e.g., $C_1$ to $C_{10}$ alkyl mono- or polyhydric alcohols, with short or medium chain, e.g., $C_1$ to $C_{10}$ carboxylic acids especially acetic acid, or triacetin (glyceryl triacetate). The amount of catalyst used is in the range 20% to 110%, preferably 25% to 40% by weight on the weight of resin solution used, corresponding approximately to 10% to 80% by weight on the weight of solid resin in the solution. The optimum in any particular case will depend on the ester chosen and the properties of the resin. A silane, typically delta-aminopropyltriethoxy silane, is included in the mixture to improve product strength. Typical amounts range from 0.05% to 3% by weight on the weight of resin solution.

In a cold set process for making composite proppant particles of filler and ALPHASET resin binder an ester stream and filler stream feed a mixer operating at 50 to 80 revolutions per minute (rpm) wherein they are mixed to produce a mixture stream. The mixture stream and an alkaline modified resole resin stream feed an Eirich mixer operating at high speed. (If desired, both mixing steps may be accomplished by one Eirich mixer wherein the filler and ester are added at low speed and the alkaline modified resole resin is then added while mixing at high speed.) The resin cures in the Eirich mixer to form composite particles of filler and cured resin. The thermoplastic elastomer is added to the composite particles in the mixer either simultaneous with or after curing.

The composite particles discharge from the mixer. Optionally, the composite particles feed a fluid bed drier for drying the composite particles using ambient to 50 degrees C. air (typically 40 degrees C.) to remove excess solvent and/or assist setting, i.e., curing.

If coated composite particles or coated single substrate particles are desired, a stream of ester and a stream of alkaline modified resole are fed to a mixer where they are mixed to form curable resin. The uncoated particles and resin feed a standard foundry mixer operating at 50 to 80 rpm wherein the resin coats the particles and then cures. The thermoplastic elastomer is added to the mixer either simultaneous with or after curing. This forms a stream of cured coated composite particles or coated single substrate particles that optionally feeds a fluid bed dryer that dries the cured coated cores using ambient to 50 degrees C. air stream to remove excess solvent.

If desired, the composite particles are sieved to recover the desired size particles with the remainder recycled.

Melamine/Formaldehyde Resins

Typically, mixtures of resoles and melamines are heated to effect a melamine formaldehyde reaction to produce a dissolved methylol melamine reaction product (See U.S. Pat. No. 4,960,826). Heat may be applied to thermally set (polymerize) these types of conventional resole resins in curing operations by condensing methylol groups in the resole resins and condensing methoxy methyl groups in the melamine resins. The terms melamine resin is a general term to encompass any melamine-formaldehyde resin with or without other ingredients, e.g., urea groups. The term "A-stage" resin or dispersion means the resin or dispersion when it is made in solution prior to mixing with a substrate. The term "B-stage" resin or dispersion means the resin or dispersion mixed with substrate. A typical melamine phenolic resin for use as a binder for composite particles or as a coating comprises a liquid alkaline resole resin composition are disclosed by U.S. Pat. Nos. 5,296,584, 5,952,440 and 5,916,966 to Walisser incorporated herein by reference.

The alkaline resole resins employed as part of the present invention may be any of the wide variety of commercially available aqueous or solvent-based phenolic resole resins. Liquid or solid phenolic resole resins, or mixtures thereof, are operative herein, with liquid resins being preferred.

The term "melamine crystal" means melamine, per se, and underivatized in powder, crystalline, or flake form. This shall include, for example, and not by way of limitation, MCI's GP (General Purpose), non-recrystallized grade of melamine powder. Melamine crystal herein shall also mean 1,3,5-triazine-2,4,6-triamine; 2,4,6-triamino-S-triazine; and cyanurotriamide.

A typical melamine resin is provided as a dispersion comprising (i) the reaction product of combining formaldehyde and phenol at a formaldehyde to phenol mole ratio of about 0.5:1 to about 3.5:1 in the presence of a basic catalyst, and (ii) solid melamine crystal dispersed throughout the resin composition. The melamine crystal to phenol mole ratio is from about 0.01:1 to about 1:1. Moreover, the dispersion has a free formaldehyde content of at most about 0.5 weight percent.

A first embodiment of a process for making composite particles of the present invention with melamine/phenol-formaldehyde as a binder employs melamine resins, with or without free methylol groups, which may be set by heat. In this process, a melamine crystal stream and an alkaline resole resin particle stream, water and conventional additives, e.g. coupling agents are fed to a mixer to prepare a homogeneous binder. Just prior to mixing with the filler, the dispersion formed by the mixing step is converted to a water soluble A-stage, unreacted, uncured but curable binder composition by adding to the dispersion an acid such as oxalic acid, sulfamic acid, nitric acid, or methane sulfonic acid in an amount sufficient to drop the pH to a level of from 2.5 to 6. A "latent acid" (a pH neutral substance that chemically reacts, usually with application of heat to form an acidic condition) may also be used. A latent acid such as ammonium sulfate is preferred. The temperature when the binder and acid are mixed is not sufficient to dissolve the melamine or to initiate any polymerization between the melamine and the resole. Then, the unreacted, uncured, A-stage melamine dispersions can be mixed with filler in a high intensity mixer/granulator which drives off liquid carrier such as organic solvent or water, to produce a dry or high solids dispersion as the binder. A typical mixer/granulator is an Eirich R02 mixer manufactured by Eirich Machines, Inc., Gurnee, Ill. The dispersion can then be heat cured during which the melamine is solubilized in the resole, the components react, and crosslinking results in amino methyl linkages. Typically the curing apparatus is a drying oven operating at a residence time for the granulated material of about 1 minute to about 2 hours, at a temperature of about 90 to about 200 degrees C., preferably about 150 to about 190 degrees C. The thermoplastic elastomer is added during or after curing. This produces a cured granulated product stream. These are the composite particles. These composite particles may be used as proppant as is, after screening to desired particle size, or may be coated with additional resin.

The amount of binder (resin) generally comprises about 10 to about 30, preferably about 10 to about 25, weight percent of the total dry materials (resin, filler, or the like) fed to the granulator. The amount of binder being a water free value defined as the amount of resin and additives other than water. Typically, the mixing occurs in the presence of a coupling agent such as gamma/amino propel trimethoxy silane. The coupling agent may be added to the mixer/granulator before, or premixed with the binder stream. Typically, 0 to 50% of the total binder stream is water.

If it is desired to coat the composite particles or single particle substrates with heat settable melamine/resole-formaldehyde resin then a cured uncoated composite particles or uncoated single particle substrates stream, a melamine/resole-formaldehyde binder stream and an acid stream feed a mixer to produce a coated binder stream. The coated binder stream then feeds an oven, operated at the above-described curing conditions, to cure the coating and produce a proppant stream of cured particles. The thermoplastic elastomer is added during or after curing.

The cured product is fed to a screening apparatus to recover a proppant product stream of predetermined product size. A typical screening apparatus is a sieve such as a vibrating screen. A typical desired proppant particle has a $d_{50}$ from 0.4 to 0.8 mm, or a particle diameter range of 20 to 40 mesh (0.425 to 0.85 mm).

Alternatively, the binder or coating may be a melamine resin that contains free methylol groups and may be cold set with acid. Typically, the acids are one of the aforementioned acids provided in sufficient quantity to cure the resin without additional heat. If cold set resins are employed, the oven may be omitted and the resins may be cold set in the mixer. The thermoplastic elastomer is added during or after curing.

Urea/Formaldehyde Resins

The urea/formaldehyde resins are employed as a binder or coating by methods similar to those employed for other thermosetting resins. For example, they may be combined with particles to form composite cores and then cured at 150 to 250 degrees C. for 30 to 90 seconds. Likewise, they may be coated onto composite cores and then cured at 150 to 250 degrees C. for 30 to 90 seconds.

The thermosetting urea-formaldehyde (UF) resin can be prepared from urea and formaldehyde monomers or from UF pre-condensates in manners well known to those skilled in the art. Skilled practitioners recognize that the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention. One particularly useful class of UF resins for use in preparing binders in accordance with the present invention is disclosed in U.S. Pat. No. 5,362,842, the disclosure of which is incorporated herein by reference.

Formaldehyde for making a suitable UF resin is available in many forms. paraformaldehyde and formalin solutions are commonly used forms.

Any form of urea or urea in combination with formaldehyde is suitable for use in the practice of the invention. Solid urea, such as prill, and urea solutions, typically aqueous solutions, are commonly available. Further, urea may be combined with another moiety, most typically formaldehyde and urea-formaldehyde adducts, often in aqueous solution. Both urea prill and combined urea-formaldehyde products are preferred, such as Urea-Formaldehyde Concentrate or UFC 85. These types of products are disclosed in, for example, U.S. Pat. Nos. 5,362,842 and 5,389,716.

Any of the wide variety of procedures used for reacting the principal urea and formaldehyde components to form a UF thermosetting resin composition also can be used, such as staged monomer addition, staged catalyst addition, pH control, amine modification and the like. Generally, the urea and formaldehyde are reacted at a mole ratio of formaldehyde to urea in the range of about 1.1:1 to 4:1, and more often at an F:U mole ratio of between about 2.1:1 to 3.2:1. Generally, the U—F resin is highly water dilutable, if not water soluble.

Urea-formaldehyde resins useful in the practice of the invention generally contain 45 to 70%, and preferably, 55 to 65% non-volatiles, generally have a viscosity of 50 to 600 cps, preferably 150 to 400 cps, normally exhibit a pH of 7.0 to 9.0, preferably 7.5 to 8.5, and often have a free formaldehyde level of not more than about 3.0%, and a water dilutability of 1:1 to 100:1, preferably 5:1 and above.

The reactants for making the UF resin may also include a small amount of resin modifiers such as ammonia, alkanolamines, or polyamines, such as an alkyl primary diamine, e.g., ethylenediamine (EDA). Additional modifiers, such as melamine, ethylene ureas, and primary, secondary and tertiary amines, for example, dicyanodiamide, can also be incorporated into UF resins used in the invention. Concentrations of these modifiers in the reaction mixture often will vary from 0.05 to 20.0% by weight of the UF resin solids. These types of modifiers promote hydrolysis resistance, polymer flexibility and lower formaldehyde emissions in the cured resin. Further urea additions for purposes of scavenging formaldehyde or as a diluent also may be used.

Many suitable thermosetting urea-formaldehyde resins are commercially available, such as those sold by Georgia Pacific Resins, Inc. (such as GP-2928 and GP-2980) for glass fiber mat, Borden Chemical Co., and Nestle Resins Corporation may be used. These resins are prepared in accordance with the previous teachings and contain reactive methylol groups that upon curing form methylene or ether linkages. Such methylol-containing adducts may include N,N'-dimethylol, dihydroxymethylolethylene; N,N'-bis (methoxymethyl), N,N'-dimethylolpropylene; 5,5-dimethyl-N,N'dimethylolethylene; N,N'-dimethylolethylene; and the like.

One example of a cold set process for using UF resin to bind or coat cores would be similar to that for furans. The thermoplastic elastomer would be added during or after curing.

Typical polyesters are those containing unsaturated (vinyl) endgroups which cure through the use of peroxide catalysts. These polyesters may be blended with other monomers such as styrene to incorporate a desired property. Examples of such styrenated vinyl ester is the DERAKANE materials from Dow Chemical Company. Polymerization catalysts such as benzoyl peroxide may also use metal catalysts to accelerate cure, such as cobalt salts.

Crosslinking Agents and Other Additives

For practical purposes, phenolic novolacs do not harden upon heating, but remain soluble and fusible unless a hardener (curative, or crosslinking agent) is present. Thus, in curing a novolac resin, a crosslinking agent is used to overcome the deficiency of alkylene-bridging groups to convert the resin to an insoluble infusible condition.

Appropriate crosslinking agents include hexamethylenetetramine (hexa), paraformaldehyde, oxazolidines, melamine resin or other aldehyde donors and/or phenol-aldehyde resole polymers. Each of these crosslinkers can be used by itself or in combinations with other crosslinkers. The resole polymer may contain substituted or unsubstituted phenol, as long as the amount of crosslinker (i.e., the amount of aldehyde donation) and the temperature at which it is added to the coating are controlled.

The novolac coating composition of this invention typically comprises up to about 25, typically from about 1 to about 15, or from about 1 to about 5, weight percent hexa and/or up to about 95, typically not less than 70 weight percent novolac polymers based on the total weight of the composition for each particular layer of coating. Where hexa is the sole crosslinking agent, the hexa comprises from about 1 to about 25, for example from about 1 to about 15, or about 1 to about 5, weight percent of the resin for this particular layer. Where the phenol-aldehyde resole polymer is the sole crosslinking agent, the resin of this particular layer contains from about 20 to about 90 weight percent of the resole polymer. However, in another embodiment the resole polymer may be present from about 5 to about 50%, by weight. The composition may also comprise combinations of these crosslinkers.

Other Additives

Additives are used for special cases for special requirements. The coating systems of the invention may include a wide variety of additive materials. The coating may also include one or more other additives such as a coupling agent (such as a silane) to promote adhesion of the coating to substrate, a silicone lubricant, a wetting agent, a surfactant, dyes, flow modifiers (such as flow control agents and flow enhancers), reinforcements (such as fibers), and/or anti-static agents. The surfactants may be anionic, nonionic, cationic, amphoteric or mixtures thereof. Certain surfactants also operate as flow control agents. Other additives include humidity resistant additives or hot strength additives. Of course, the additives may be added in combination or singly.

The use of organofunctional silanes as coupling agents to improve interfacial organic-inorganic adhesion is especially preferred. These organofunctional silanes are characterized by the following formula VII:

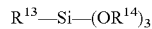

where $R^{13}$ represents a reactive organic function and $OR^{14}$ represents a readily labile alkoxy group such as $OCH_3$ or $OC_2H_5$. Particularly useful for coupling phenolic or furan resins to silica are the amino functional silanes of which Union Carbide A1100 (gamma aminopropyltriethoxysilane) is an example. The silane can be premixed with the resin or added to the mixer separately.

It is desirable to add the lubricant to the mix at some point after the catalyst or hexa is added and before the product "breaks down" into free flowing particles. The lubricant is preferably one that is liquid at the mixing temperature and has a sufficiently high boiling point so that it is not lost during the mixing process. Suitable lubricants include liquid silicone such as Dow Corning Silicone 200 (L-45), mineral oil, paraffin wax, petrolatum, cocamidopropyl-hydroxysultaine (SST-070) (Chembetatine CAS from Chemron Corp., Paso Robles Calif., or the synthetic lubricant ACRAWAX CT, a bis-stearamide of a diamine, available from Glyco Chemicals, Inc., Greenwich, Conn.). The amount of lubricant can vary from about 0.01 or 0.03% to about 0.5% by weight based upon the weight of the particulate material.

Reinforcements (if any) in the resins may be any number of materials, including natural and synthetic fibers including fiberglass or other mineral types or phenolic fibers or other organic types. Reinforcements for coatings are described in U.S. Pat. No. 6,528,157 to Hussain et al incorporated herein by reference in its entirety or other filler material described above for composite particles.

Particle Parameters

The following parameters are useful when characterizing particles of the present invention.

Density

Density of resin coated frac sand, ceramic proppants, gravel packing and uncoated particles may be measured by American Petroleum Institute Recommended Practices for Testing High Strength Proppant Used in Gravel Packing Operations, RP-60. The following procedure is equivalent to API RP-60 (1989).

Place a specific, gravity bottle (Le Chatelier specific gravity bottle, Kimax No. 15115-24 or equivalent) on a level surface, and fill to the zero mark with kerosine (kerosine, K-1, deodorized, water white in color; alternate test liquid de-ionized/distilled water, doped with 0.1 weight % FSO, 15 gram FSO, duPont Fluorosurfactant ZONYL FSO). Wipe the inside & the outside of the bottle with a KIMWIPES EX-L or equivalent to remove all excess liquid. If gentle tapping, do not swirl or shake, on the side of the bottle does not remove all adhering bubbles the bottle should be cleaned before further use or use another bottle.

Then place the bottle in the thermostated water bath (water bath, 25±1 degree C., deep enough to submerge the bottle above a vortex mixer, THERMOLYNE MAXI-MIX I or equivalent) for at least 30 minutes or until the flask & liquid have temperature equalized. Adjust the liquid level, as necessary, using a dropper. Then record the level. For example: 0.05 mL Using a riffle type sample splitter, reduce the resin coated proppant (RCP) or raw uncoated substrate (sand/ceramic proppant) sample size to about 55 grams. Using a digital top-loading electronic balance, weigh the reduced sample into a dixie cup to 54.95 to 55.05 grams. High-density ceramic proppants, intermediate density & bauxite, will require a larger sample of about 70 g. Then, pour the weighed "sand" sample into the bottle. If any liquid or "sand" is spilled, discard the sample and begin.

Make sure no air bubbles adhere to the walls of the bottle. Use the vortex mixer as necessary to insure the sand is fully wetted and to remove any and all air bubbles. Then place the bottle into the water bath and allow temperature to equalize. Then read and record the new volume of liquid and calculate the apparent density and specific volume of the "sand" by the equations:

Density, $p$, g/cm=weight of "sand", gram/(final volume−initial volume), mL

Specific volume, gal/lb$_m$=0.119831/density, g/cm$^3$

Compressive Strength

Compressive strength of curable proppants is defined as that measured according to the following procedure, known as the Unconfined Compressive Strength or UCS test. In this test, a 2 weight percent KCl solution (doped with a small amount of detergent to enhance wetability) is added to proppant. The KCl solution and proppant (about 6 to 18, typically 12 lbs. proppant per gallon KCl) are gently agitated to wet the proppant. Remove entrained air bubbles, if any. If necessary use a wetting agent to remove the bubbles. This slurry (~100-200 grams depending on density) is transferred into duplicate 1.25 inch OD×10 inch stainless steel cylinders, equipped with valves on the top and bottom to bleed liquid and gas pressure as required, a pressure gauge reading 0-2000 psi, and a floating piston to transfer pressure to the sample. Typically at least 3, preferably at least 6 specimen molds are loaded to give a length greater than two times the diameter of the finished slug. The bottom valve is opened during the application of stress, allowing fluid to drain from the slurry, and then closed during the application of temperature. The cylinder is connected to a nitrogen cylinder and 1000 psi is imposed on the cylinder, transmitted by the sliding pistons to the sample, and then top valve is shut and bottom valve remains open. (As test temperature is approached near to the fluid valve on the mold, the bottom valve (fluid valve) is closed. Closing the fluid valve too soon may generate enough pressure, as the cell is heating, to prevent/reduce the intended closure stress applied to the proppant slug. Closing the valve too late may allow loss of too much fluid from the slug by evaporation or boiling).

The duplicate cylinders containing the sample are transferred to an oven preheated to the desired setpoint, i.e., 250±1° F., and remain in the oven for 24 hours. Maintain stress and temperature during the cure time. Stress should be maintained ±10%. During the curing process in the oven, loose curable proppant particles become a consolidated mass. At the end of the 24 hours, the cylinders are removed, venting off pressure and fluid rapidly, and the approximately one inch by six inch consolidated slug sample is pressed from the cylinder. The sample is allowed to cool and air dry for about 24 hours, and cut (typically sawed) into compression slugs of length×diameter (L×D) of greater than two: one, preferably about 2.5:1. Air drying is performed at a temperature of less than about 49 degrees C. (120 degrees F.). Typically, both ends of each slug are smoothed to give flat parallel surfaces and the slugs are cut to maintain a greater than 2:1 ratio of the length:diameter.

The compression slugs are mounted in a hydraulic press and force is applied between parallel platens at a rate of about 4000 lbs$_f$/minute until the slug breaks. For slugs with compressive strength less than 500 psi, use a loading rate of 1000 lbs$_f$/minute. The force required to break the slug is recorded, replicates are documented, and the compressive strength for each sample is calculated using the formula below. An average of the replicates is used to define the value for this resin coated proppant sample.

$$(Fc, \text{psi}) = 4 \times Fg / \{(p \times d \times d)[0.88 + (0.24 d/h)]\}$$

wherein
Fc=compressive strength (psi)
Fg=hydraulic gauge reading (lb force)
p=pi (3.14)
d=diameter of the slug (inches)
h=length of slug (inches)

Compressive strength of the slugs is determined using a hydraulic press, i.e., Carver Hydraulic Press, model #3912, Wabash, Ind. Typical compressive strengths of proppants of the present invention range from 50 to 3000 psi or higher. However, the reproducibility of the UCS test is probably ±10% at best. Typically, the individual resinous layers of the invention have UCS strengths greater than 500 psi, as detailed below. It is also noted that the Compressive Strength Test can be used to indicate if a coating is cured or curable. No bonding, or no consolidation of the coated particles, following wet compression at 1000 psi at 250° F. for a period of as much as 24 hours, indicates a cured material.

Acetone Extraction Test

The Acetone Extraction Test is another method to determine if a coating or coatings are curable. The acetone extraction method dissolves the fraction of resin that is uncured. This test is performed by placing a dried pre-weighed sample, about 50 grams, of resin coated particles (with a known resin coating content) in a Soxhlet thimble and refluxing acetone condensate over the material for 2 hours. After drying the treated sample, the change in resin content is reported as percent acetone extractables. Specifically, because uncured resin is soluble in acetone, and cured resin is not soluble in acetone, the acetone condensate reflux will remove only the uncured fraction. By weighing the sample both before and after acetone reflux and determining a percentage change, the degree of cure is calculated. For example, the weight loss for a typical cured resin coated sand may only be 5% of 2.0 grams (the LOI on 50 gms of RCS), for an acetone extractable percentage of less than 5%. In contrast, uncured resins used in the invention the weight loss for a fully curable RCS will only be the LOI of the sample (for example, 2.0 grams would reflect 100% curable).

Temperature Stick Point Test

The Temperature Stick Point Test is another indicator of whether a coating is curable. It is performed by placing coated material on a heated melt point bar and determining the lowest temperature at which the coated material sticks. A "sticking temperature" of greater than 350° F. at the hottest end of the bar, typically indicates a cured material, depending upon the resin system used. The melt point bar is a brass metal bar (18 inches long and 2 inches wide) with an electric heating element at one end. Therefore, a temperature gradient can be established across the length of the bar and the temperature across the bar is monitored with thermometers or thermocouples. Using a funnel, a uniform strip of resin coated substrate, e.g., sand, is laid on the heated bar and cured for 60 seconds. Then the bar is tipped to allow any uncured proppant to fall off. Melt point is the lowest temperature at which the resin coated sand forms a continuous mass and does not fall from the bar once it is tipped to ninety degrees. Typically, the cured coating has a sticking temperature in the range from about 200 to about 300° F., for example about 200 to about 250° F.

Percent Crush Test

The percent crush test determines the strength of the proppant pack, such as cured resin-coated frac sand or ceramic proppant, gravel packing sand, uncoated substrate, and composite particles either uncoated or having a cured coating. This procedure is equivalent to American Petroleum Institute (API) Recommended Practices for Testing Sands Used in Hydraulic Fracturing Operations, API RP-56, Recommended Practices for Testing Sands Used in Gravel Packing Operations, API RP-58 and Recommended Practices for High-Strength Proppants Used in Hydraulic Fracturing Operations, API RP-60, all of which are herein incorporated by reference in their entirety.

In this test, uncoated or cured coated particulate material, in a sieve range of 20/40 mesh are selected and weighed. In particular, using a sample splitter an 80 to 100 gram sample is obtained and sieved. From the sample remaining after sieving a 40 gram sample is obtained and placed into the test cell (1.5 to 3 inch internal diameter, Rockwell C hardness of 43 or better (Rockwell C 60 Preferred). Using a hydraulic load frame (press), 50,000 lbf, Forney, Inc., Model No. FT-0040D or equivalent), the sample is then pressed by a piston in a crush cell at 10,000 psi for three minutes (pressure applied in one minute and maintained for two additional minutes). The press is removed and the sample is poured onto the same 20/40 screen. The crushed fines fraction that falls through the screen is weighed and compared to the first weight. The percent crush is equal to the weight of the crushed fines fraction to the weight of the sample prior to the pressing. Typical cured coated proppants of the invention exhibit a percent crush between about 2 and 10%.

Wettability of Particles in Water

Wettability to determine the quantity of selected surfactant(s) required to wet proppant(s) is performed to determine the quantity of surfactant(s) required for the reduction of aeration/air entrainment to zero.

Prepare diluted surfactant solution and fill a 25 mL glass burette. A dilution factor of 1:100 is typical. However, many surfactants may be tested as is. Then add 200 mL of 2% KCl to a 300 mL brazallius (tail form) beakers (deionized H20 may be used). Adjust the beaker under a VARIAC or stirrer with built-in speed control so the blade is about ¼" above the bottom. The beaker should be clamped in place using a ring stand and clamp. Then adjust the burette to an appropriate position, set the stirrer switch to OFF and adjust the speed control to its highest position, which will not eject the contents of the beaker (sand in the water). Then start the stirrer and add the appropriate amount of proppant to be tested.

Typical proppant loading ranges are listed in TABLE 1:

TABLE 1

| Proppant Loading Ranges | |
|---|---|
| $lb_m$/gal | gm/200 mL |
| 2 | 48 |
| 4 | 96 |
| 6 | 144 |
| 8 | 192 |

TABLE 1-continued

| Proppant Loading Ranges | |
|---|---|
| $lb_m$/gal | gm/200 mL |
| 10 | 240 |
| 12 | 288 preferred |

Then stir for 5 seconds, and then stop and observe the air bubbles adhering to the proppant grain surfaces. If no bubbles are visible, the proppant is considered fully wetted. If there are air bubbles then add ¼ mL of surfactant, restart the stirrer for 10 s, and then again observe the air bubbles adhering to the proppant surface. If bubbles are again observed, then repeat the step of adding surfactant stirring and observing until most of the bubbles have disappeared, then reduce the incremental surfactant to ⅛ mL. When the bubbles are no longer observed, record the volume of surfactant required for wetting the proppant.

Repeat the test as follows to more nearly duplicate the usage conditions & procedure in the field.

Prepare another sample of water, and add to the water the exact amount of diluted surfactant (determined by the first procedure for when the proppant was fully wetted). The place the beaker under the stirrer and start the stirrer. Add the proper amount of proppant. Stir for 10 seconds, and then stop the stirrer. Observe & record the relative quantity of air bubbles on the surfaces of the proppant. If there are any bubbles in step continue titration as before until they are gone and no additional surfactant is required. Record the additional volume of surfactant required.

Calculate the volume of surfactant required to completely wet the proppant.

$$V_V, \text{(name of surfactant), gal/1000 gal} = 1000 \times ((V_{surf} \times F_D)/V_{fluid})$$

at X $lb_m$ prop/gal.

$$V_M, \text{(name of surfactant), gal/1000 gal} = 119.831 \times ((V_{surf} \times F_D)/M_{prop})$$

for each $lb_m$ prop/gal.

where,

Vv is volume of surfactant to wet proppant, gal/1000 gal at X $lb_m$ prop/gal.

$V_M$ is volume of surfactant to wet proppant, gal/1000 gal/lb, prop/gal $F_D$ is dilution factor, volume surfactant/volume diluent, dimensionless $V_{surf}$=experimental volume of diluted surfactant, mL $M_{prop}$=mass of proppant tested, g $V_{fluid}$=volume of water in the proppant/water mixture, mL Ball Mill Test and Turbidity Test The dust levels of particles can be determined for particles subjected to a Ball Mill Test using a Turbidity Test. The particles are processed in the Ball Mill as follows: Into a standard eight inch ball mill is added two ceramic balls (~2 inches in dia.) and 100 grams of the material to be tested. This combination is closed and placed on the rollers at ~50 rpm. The unit is stopped at specific times, samples removed, and subjected to the Turbidity Test as shown below.

Then after being subjected to the Ball Mill Test the particles are subjected to a Turbidity Test as follows.

APPARATUS:
1) turbidity meter: Hach Model 2100P
2) Gelex secondary standards
3) vortex mixer: Thermolyne Maxi-Mix 1 or equivalent
4) sample cells, screw caps: Hach catalog #21228 or equivalent
5) lint free paper
6) digital top loading electronic balance.

REAGENTS:
1) deionized/distilled water, doped with 0.1% FSO surfactant, 15 grams
2) FSO, duPont Fluorosurfactant ZONYL™ FSO
3) sample to be measured, 5.00 grams DETERMINATIONS: The turbidimeter should be calibrated daily.
1) Weigh 15.0 grams of doped water into a clean sample cell and replace the cap.
2) Wipe outside of the cell with lint free paper
3) Make sure no air bubbles adhere to the walls of the cell
4) Place the cell into the turbidimeter and read the turbidity in NTU units
5) Weigh 5.00 grams of the sample to be measured and place this in the cell from step 4 above.
6) Using the Vortex mixer, agitate the sample/water mixture for 10 seconds
7) Again, clean the outside of the cell with lint free paper
8) Place the sample/cell back into the turbidimeter and read the turbidity, 30 seconds after the Vortex mixing ended.
9) Record the turbidity in NTU units for this sample as "dust content".

Preferably the particulate material (either a single particle substrate or a composite particle) without a thermoset resin coating, but to which thermoplastic elastomer has been applied, or coated particulate material (either a substrate or a composite particle having a coating) improves the dust suppression of the particle above that of a particle which is the same except for lacking the thermoplastic elastomer and upon being subjected to a 60 minute ball mill test the particles of the present invention preferably achieve a turbidity measurement of less than 200 NTU or less than 100 NTU at 30 minutes ball mill time and/or less than 300 NTU or less than 150 at 60 minutes ball mill time.

Preferably the particles of the present invention having single particle substrates and curable coatings achieve UCS of at least 85% of the control (particles which are the same as the particle of the present invention except for lacking the thermoplastic elastomer).

Preferably the coated particles (either coated single particle substrate or coated composite particles) of the present invention having precured coatings have crush resistance of at least equal to that of the control. It is a part of this invention to achieve unexpected improvements in crush resistance of particles through the use of thermoplastic elastomers, to achieve percent crush that is reduced by 10 or 20% relative to the percent crush of the control.

Use of Particles as Proppant

The particles, as described in this invention can be injected into a subterranean formation as the sole proppant in a 100% proppant pack (in the hydraulic fracture) or as a part replacement of existing commercial available ceramic and/or sand-based proppants, resin-coated and/or uncoated, or as blends between those, e.g., coated particles are 10 to 50 weight % of the proppant injected into the well. For example, after the curable proppant, precured proppant or uncoated proppant is placed in a well, curable proppant of the present invention can be placed in the well to be located at the fracture openings.

In the case of curable proppants, the method may comprise curing the curable resin composition by exposing the resin composition to sufficient heat and pressure in the subterranean formation to cause crosslinking of the resins and consolidation of the curable proppant of the present invention. In some cases an activator can be used to facilitate consolidation of curable proppant. In another embodiment employing a curable resin composition on the proppant, the method further comprises low temperature acid catalyzed curing at temperatures as low as 70 degrees F. An example of low temperature acid catalyzed curing is disclosed by U.S. Pat. No. 4,785,884 incorporated herein by reference in its entirety.

The curable coated particles of the invention are especially advantageous whether the coated particles are used alone as a proppant, or together with other proppants as a tail end after using uncoated proppant or precured coated proppant or another curable proppant to be in the portion of the fracture nearest the wellbore.

The precured coated proppant particles are injected into the subterranean formation with fracturing fluid and used as would be conventional precured coated particles of proppant.

The deformable composite particles of the present invention are employed as are the deformable composite particles of U.S. Pat. No. 6,406,789, U.S. patent application Ser. No. 09/450,588 and U.S. patent applicaton Ser. No. 09/774,881 all incorporated herein by reference.

Use of Coated Particles as Gravel Packing or for Sand Control

It is known that oil or gas well boreholes are provided with gravel packing about their bore holes. Another aspect of the present invention is that these gravel packs may be provided with the coated particles of the present invention.

These coated particles would be provided in the standard sizes known for gravel used in gravel packs. Gravel packing is typically applied by as multi-layer packs. Typically the strength requirements for a proppant particle are higher than for gravel packing. The gravel pack may serve for sand control to prevent flow of formations fines (of sand drop) from the formation into the well bore.

For example a gravel pack may be formed adjacent to bore holes for the purpose of forming a permeable solid barrier that restrains the movement of said sand (fines) by:
a) injecting the coated particles into the sand formation in a zone around a bore hole;
b) curing the injected particles within the zone; to form a permeable solid barrier is formed which restrains the movement of the sand.

For example, resin-containing particulate material may be used by filling a cylindrical structure with the resin-containing particulate material, i.e., proppant, and inserted into the wellbore. Once in place, the improved properties of this invention are beneficial because the proppant will cure and act as a filter or screen to eliminate the backwards flow of sand, other proppants, or subterranean formation particles. This is a significant advantage to eliminate the back flow of particulates into above ground equipment.

Use of Coated Particles as Filtration Media

The particles of the present invention may be used to replace filtration media in conventional sand filters.

EXAMPLES

The following examples serve to illustrate the present invention, and all parts and percentages are by weight unless otherwise indicated, and all screen mesh sizes are U.S. Standard Screen sizes.

The following general coating procedures were followed to prepare coated proppants. Coating of the various grades of proppants is carried out by using a laboratory bowl mixer. The required quantity of the substrate is placed in the bowl and heated by direct contact with the propane burner. On attaining the required temperature, coating commences by adding the ingredients. The ingredients and time required to complete a coating cycle for each product are shown below. The size of all substrates coated is 20/40.

In particular, 1000 grams of the substrate to be coated (either sand, ceramic, or other proppant substrate) is heated to 400-410° F. while mixing in a Hobart C-100 lab mixer and the heat source is removed. In the order shown below (and times specified), the resin(s) are added, in addition to the catalysts, curatives, or additives as indicated. At the end of this cycle, the material is discharged from the mixer as a free flowing product consisting of individual sand grains coated with a precured or curable resin coating and cooled quickly for characterization.

Example 1

This example was undertaken to demonstrate the synthesis and properties of resin coated bauxite and resin coated sand. In the Examples the silane is A1100 adhesion promoter from OSI Corporation. The proppant was coated with PFFA Resole Ex18663 known as Plasti Flake EX18663, a commercial phenol-formaldehyde resole furfuryl alcohol terpolymer resin manufactured by Borden, Inc./North American Resins, Louisville, Ky.

Also, the proppant was coated with a layer of PF Novolac 5150 known as Plasti Flake EX5150, a commercial phenol-formaldehyde novolac manufactured by Borden, Inc./North American Resins, Louisville, Ky.

Chembetaine is a shortened reference to a lubricant. It is a fatty acid amide derivative (coamidopropyl hydroxysultaine) purchased from Chemron Corp.

Ammonium chloride is listed in % Conc./gms of ammonium chloride in aqueous solution. KYNOL novoloid fibers are available from American Kynol, Inc., Pleasantville, N.Y.

ESCOR AT325: is an acid (EMAAA) terpolymer with melting point of 163° F. (73° C.) and crystallization temperature of 120° F. (49° C.). The elongation-at-break can be as high as 725%. It is produced by ExxonMobil Chemical Co.

SMA 1440H—water dispersion: is a family of hydrolyzed SMA (styrene maleic anhydride) polymers that are aqueous dispersions of the SMA resin sodium salts. This form of SMA is particularly well suited for use in preparing water-based formulations. It contains the following ingredients:
72-78% Water
15-25% Styrene maleic anhydride resin, cumene end-capped, 2-butoxyethylester, ammonium salt
1% 2-Butoxy ethanol.

ENABLE EN 33900 (also known as ENBA) is an ethylene-n-butyl acrylate copolymer. It contains about 32.5 wt % n-butyl acrylate with the softening temperature of 77° C. (171° F.). It is produced by ExxonMobil Chemical Co. ENABLE is a family of advanced thermoplastic elastomers (TPE). ENABLE has rubbery texture. A rubbery texture is a characteristic of thermoplastic elastomers.

BUTVAR is a family of polyvinyl butyral resins available from Solutia, Inc., St. Louis, Mo. BUTVAR resins are thermoplastic but have glass transition temperatures, which are too high for these resins to be thermoplastic elastomers. In contrast, ENABLE resins are thermoplastic elastomers. There is difference between the two classes of resins. In contrast to merely thermoplastic resins, thermoplastic elastomers can combine the processing characteristics of thermoplastics with the physical properties of crosslinked elastomers.

HYCAR 1330 is a family of butadiene and butadiene-acrylonitrile copolymers with functionality at the chain ends. Functional groups are carboxyl (COOH), amine (NH or $NH_2$), methacrylate or epoxy. Three Grades of HYCAR from Noveon Corporation were employed. The difference between the Grades are the functional groups, i.e.

(a) HYCAR 1330 X31 (CTBN) is a carboxyl terminated butadiene-acrylonitrile with an acrylonitrile content of about 10%, a Tg of about −77 degrees C., a Brookfield viscosity of about 60,000 (MPa), and a carboxyl content of about 25%

(b) HYCAR 1330 X33 (CTBNX) is a methacrylate vinyl terminated butadiene-acrylonitrile copolymer with an acrylonitrile content of about 18%, a Tg of about −49 degrees C., and a Brookfield viscosity of about 150000 (MPa or centipoise).

(c) HYCAR 1330 X42 (ATBN) is an amine terminated butadiene-acylonitrile copolymer with an acrylonitrile content of about 18%, a Tg of about −59 degrees C., and a Brookfield viscosity of about 100000 MPa.

RICON RI130MA8: RICON is a polybutadiene adducted with maleic anhydride. The molar mass of butadiene is between 20-35% and the total acid is around 7-9 wt %. RICON is a low molecular weight material ($M_n$=3100) and produced by Sartomer/Atofina SMA 3840: SMA 3840 is a styrene—maleic—anhydride (SMA) material containing more than 91% SMA and about 5% of 20 butoxy ethanol. The melting point is between 55 and 75° C. with specific gravity of 1.07. It is produced by Sartomer/Atofina.

TABLE 2 shows the procedure and ingredients for coating resin coated sand and ceramics with three curable coatings. The first (innermost) coating comprises FA resole that is a terpolymer of phenol, formaldehyde and furfuryl alcohol with an ammonium chloride catalyst. The second (middle) layer also comprises FA resole that is a terpolymer of phenol, formaldehyde and furfuryl alcohol with an ammonium chloride catalyst. The third (outer) layer comprises novolac and HEXA. Wherein the substrate is heated in the mixer to the desired temperature and then components are added in the ratio, and at times as noted. Amounts in TABLE 2 are in grams unless otherwise indicated. The coating temperature was 440 degrees F.

TABLE 2

| Ingredients | Weight (g) | Add time (min:seconds) |
| --- | --- | --- |
| 20/40 Sand or Ceramic particles | 1000 | — |
| **Resole EX-18663 | 22.0 | 0:00 |
| Silane A-1100 | 0.4 | 0:07 |
| 2.5% $NH_4Cl$ | 1.16 | 0:40 |

TABLE 2-continued

| Ingredients | Weight (g) | Add time (min:seconds) |
|---|---|---|
| **Resole EX18663 | 22.0 | 1:20 |
| 2.5% NH₄Cl | 1.16 | 2:00 |
| *modifier (before flakes) | 1, 2.5 or 5% based on resin | 2:35 |
| **Novolac EX5150 | 15.0 | 2:40 |
| KYNOL fiber | 1.0 | 2:40 |
| *modifier (after flakes) | 1, 2.5 or 5% based on resin | 2:45 |
| HEXA 40% | 0.56 | 3:20 |
| Water | 5.04 | 3:20 |
| SFT-070 | 0.30 | 4:00 |
| Discharge | | 4:00 |

*modifier may be added before or after Novolac flakes.
Resole EX-18663 and Novolac EX5150 are available from Borden Chemical, Inc.

TABLE 3 shows the procedure and ingredients for coating precured resin (which has a precured resole coating) wherein the sand substrate is heated in the mixer to the desired temperature and then components are added in the ratio, and at times as noted. Amounts in TABLE 3 are in grams unless otherwise indicated

TABLE 3

| Ingredients | Weight (g) | Add time (min:seconds) |
|---|---|---|
| 20/40 Sand | 1000 | — |
| Resole OWR9200 | 58 | 0:00 |
| Modifier (% based on resin) | 1. 1.75, 2.5, 5% | (immediate or delay) |
| Surfactant (SFT-070) | 0.3 | 3:10 |
| Discharge | | 4:10 |

Quickly post-bake at 320° F. for an additional 4:10 (min:seconds) then cool down TABLE 4 shows the procedure and ingredients for coating a curable resole/novolac flake combination on sand or 16/20 ceramic substrate, wherein the substrate is heated in the mixer to the desired temperature and then components are added in the ratio, and at times as noted. Amounts in TABLE 4 are in grams unless otherwise indicated. The coating temperature was 377° F.

TABLE 4

| Ingredients | Weight (g) | Add time (min:seconds) |
|---|---|---|
| Ceramic substrate | 1000 | — |
| KYNOL synthetic phenolic fiber | 1 | 0:00 |
| DURITE 1501 Novolac | 26 | 0:00 |
| ENABLE | 0.43 | 0:00 |
| Dye ANX-Black | 0.05 | 0:00 |
| Silane A-1100 | 0.4 | 0:07 |
| Resole OWR 9200 | 15 | 1:00 |
| Water (1) | 21.6 | 2:00 |
| Water (2) | 16.8 | 2:40 |
| L-45 | 0.8 | 3:07 |
| SFT-070 | 0.6 | 3:21 |
| Discharge | | 4:02 |

Modifier may be added - immediately after Durite or immediately after resole.
OWR 9200 and DURITE 1501 are available from Borden Chemical, Inc.

After coating the samples, the following properties were characterized:
Turbidity
Wettability
Stick melting point
Unconfined compressive strength (where applicable)
Crush resistance test (where applicable)
Loss on ignition (LOI)

The Ball Mill Test is assumed to simulate the likely amount of dust generated during transportation and pneumatic transfer. The amount of dust generated is measured via the Turbidity Test.

Turbidity is a cloudy or hazy appearance in a naturally clear liquid caused by the suspension of fine solids or impurities that interfere with the clarity of the liquid, e.g. water. These impurities may include: dust, clay, silt, or the like. In a simple form, it is a measure of relative clarity of a liquid. The coated samples were subjected to a ball mill (2 balls) and the amount of dust generated between 0 and 60 minutes was evaluated by a turbidity test.

The stick melting points of all coated samples are not shown but in all cases, the modified samples produced acceptable melting points.

Example 2

Figure 4:
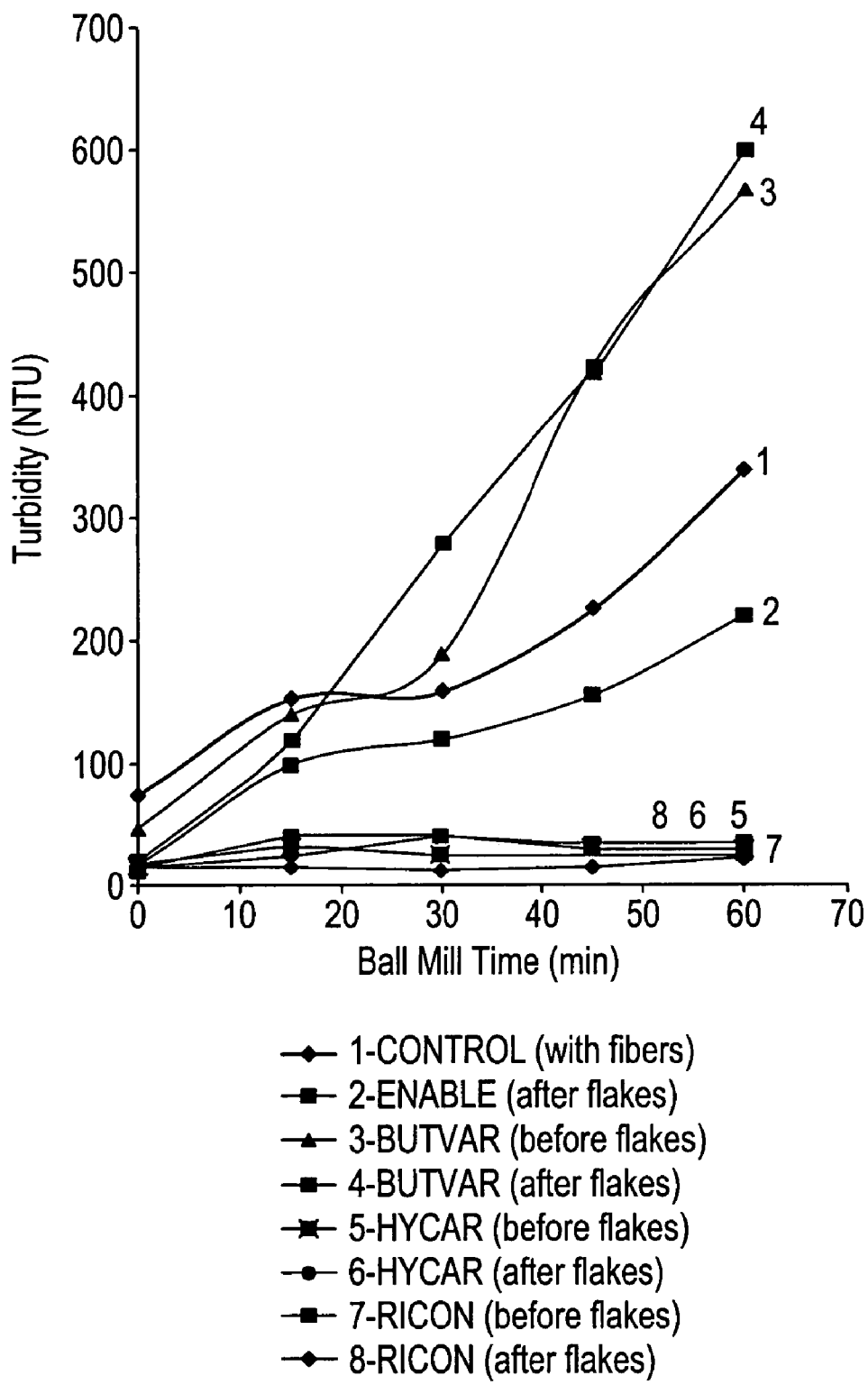
FIG. 4 shows data of turbidity of 20/40 curable resin triple coated sand proppant using ENABLE, BUTVAR, HYCAR or RICON additives as a modifier.

This experiment was undertaken to demonstrate the use of sand triple coated with a resin that contains modifiers. The turbidity results of all the modifiers used in sand that has three curable coatings (made according to TABLE 2) are shown in TABLE 5. The first (innermost) coating comprises FA resole that is a terpolymer of phenol, formaldehyde and furfuryl alcohol with an ammonium chloride catalyst. The second (middle) layer also comprises FA resole that is a terpolymer of phenol, formaldehyde and furfuryl alcohol alcohol with an ammonium chloride catalyst. The third (outer) layer comprises novolac and HEXA and is at least partially curable). The lower the turbidity the lower the tendency to fracture and produce dust. The modifiers were added either before or after flakes. In all cases, the coated materials before the ball mill test were almost dust-free. On milling, the dust level increases. Irrespective of when the modifier was added, both HYCAR and RICON modifiers were almost dust-free even after 60 minutes ball mill. The representative samples (examples) are shown in FIG. 4.

TABLE 5

| | Turbidity (NTU) Time (min) Ball Mill Test | | | | |
|---|---|---|---|---|---|
| Materials | 0 | 15 | 30 | 45 | 60 |
| Control without thermoplastic elastomer | 75 | 153 | 160 | 227 | 340 |
| ENABLE (before flakes) | 19 | 85 | 155 | 247 | 350 |
| (after flakes) | 16 | 99 | 126 | 156 | 220 |
| BUTVAR (before flakes) | 46 | 140 | 190 | 425 | 569 |
| (after flakes) | 20 | 121 | 279 | 421 | 600 |
| ESCOR (before flakes) | 22 | 131 | 357 | 588 | 875 |
| (after flakes) | 19 | 96 | 379 | 580 | 864 |
| SMA 1440H (before flakes) | 48 | 98 | 191 | 259 | 325 |
| (after flakes) | 52 | 295 | 324 | 423 | 540 |
| HYCAR (before flakes) | 20 | 33 | 28 | 28 | 25 |
| (after flakes) | 17 | 25 | 43 | 32 | 33 |
| RICON (before flakes) | 12 | 41 | 43 | 35 | 36 |
| (after flakes) | 16 | 18 | 15 | 17 | 25 |

In TABLE 5, the BUTVAR is the BUTVAR Dispersion BR. In this and other examples mentioning ENABLE modifier, the ENABLE modifier was ENABLE EN33900. Also, the HYCAR used in this experiment was X33. Moreover, FIG. 4 shows the dust control ability on sand coated with three resinous coatings indicating that the HYCAR modifier demonstrates a greater ability to reduce the dust than ENABLE. The HYCAR modifier shows a greater ability to reduce turbidity and dusting as compared with the ENABLE.

Example 3

Figure 5:
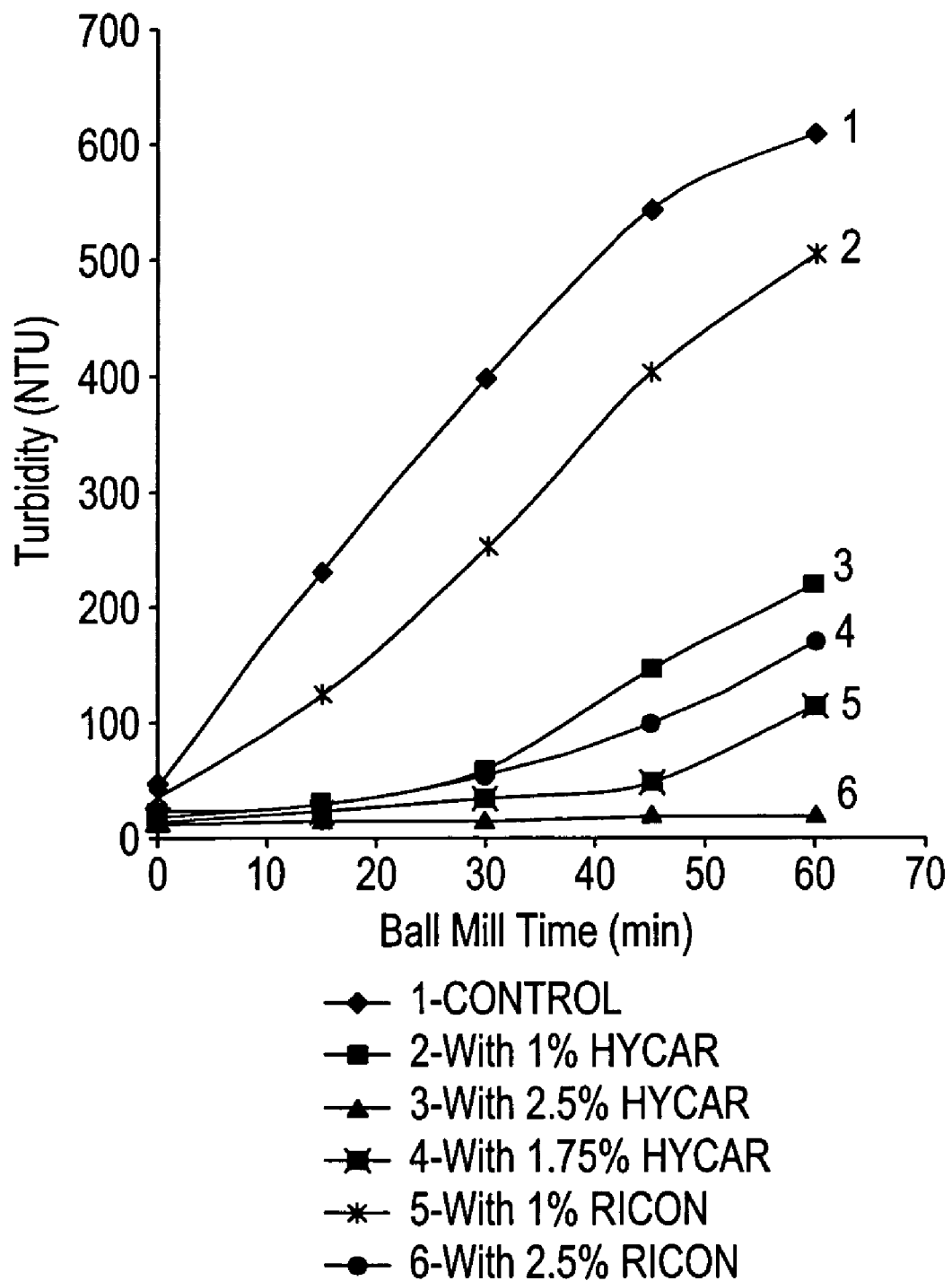
FIG. 5 shows data of turbidity of 20/40 curable resin triple coated ceramic proppant using HYCAR or RICON additive as a modifier.

This example employs a proppant, which has a substrate of nearly pure bauxite having a specific gravity of about 3.4 to 3.6 and three curable coatings. The first (innermost) coating comprises FA resole that is a terpolymer of phenol, formaldehyde and furfuryl alcohol alcohol with an ammonium chloride catalyst. The second (middle) layer also comprises FA resole that is a terpolymer of phenol, formaldehyde and furfuryl alcohol alcohol with an ammonium chloride catalyst. The third (outer) layer comprises novolac and HEXA and is at least partially curable and modified with HYCAR and RICON modifiers. FIG. 5 shows results from tests of modified sample having 1%, 1.75% and 2.5% HYCAR 1330X33 (based on weight of resin on the substrate). FIG. 5 shows the 2.5% HYCAR modified sample is the best of all. However, this 2.5% seems to be wet and the wettability is poor. On the other hand, wettability of the 1% HYCAR modified sample was as good as that of the unmodified CONTROL sample.

Figure 6:
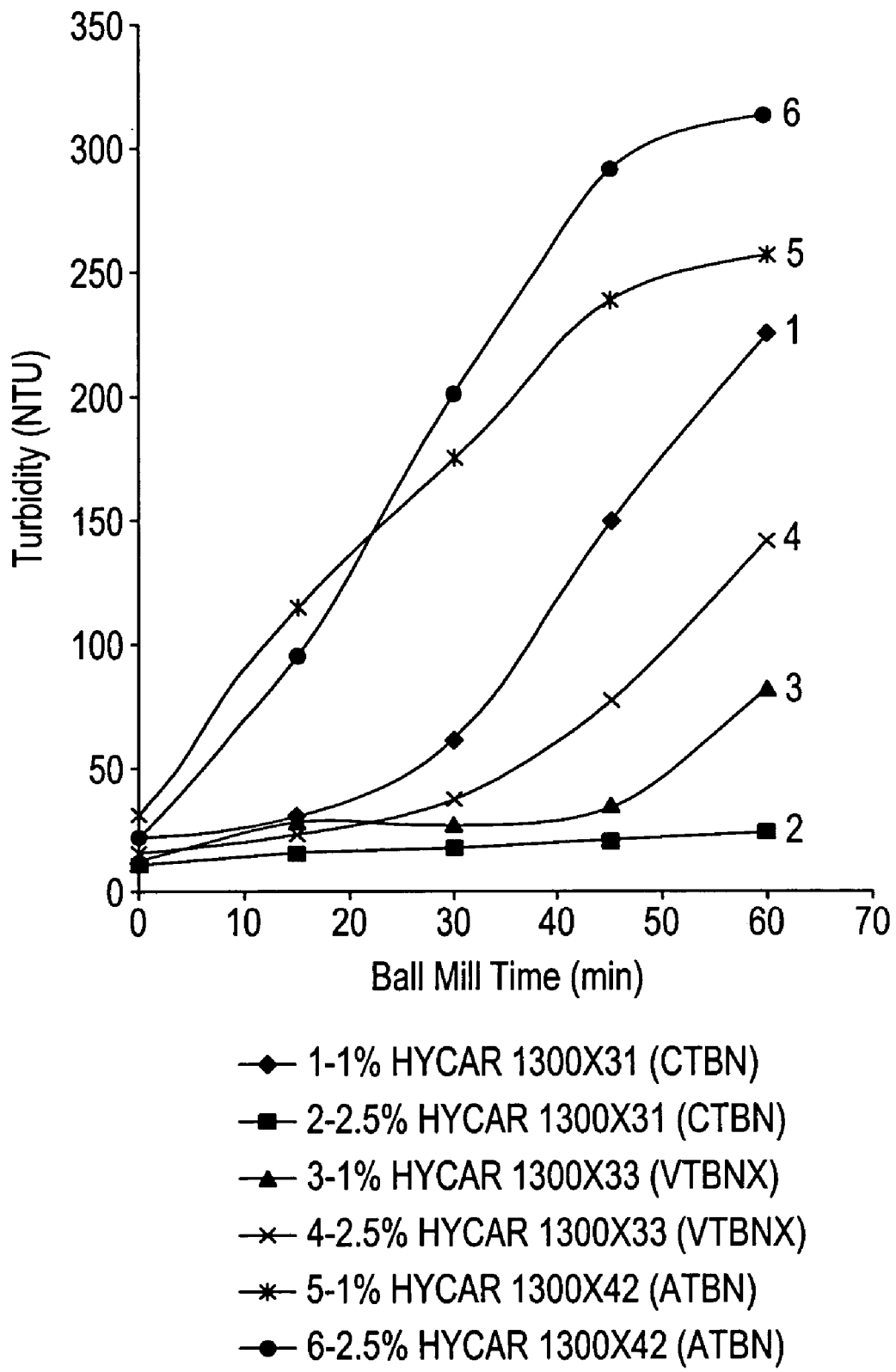
FIG. 6 shows data comparing turbidity of 20/40 curable resin triple coated ceramic proppant coated with various amounts of HYCAR modifier.

FIG. 6 shows the turbidity of samples of three types of HYCAR modifier, i.e. X31, X33 and X42 on a proppant, which has the above-described substrate of pure bauxite having a specific gravity of about 3.4 to 3.6 and three curable coatings. FIG. 6 shows the sample with 2.5% HYCAR X31 additive is almost dust-free, while X42 is the dustiest of all. Thus, HYCAR X31 and 33 additives were found to be good. Another important property is wettability and HYCAR X31 additive was not as wettable as X33 additive as may be seen in the TABLE 7 below. HYCAR X33 additive was found to be very good in terms of dust control as well as good wettability.

ENABLE modifier was tested as an easier to handle alternative to the HYCAR modifier in a production trial. ENABLE modifier is a thermoplastic elastomer with a softening point of 77° C. (HYCAR modifier is a viscous liquid and has a glass transition temperature of minus 59° C. The trial coating procedure with ENABLE modifier on the above-described proppant which has a substrate of nearly pure bauxite having a specific gravity of about 3.4 to 3.6 and three curable coatings is shown in TABLE 6.

TABLE 6

| Materials | Weight (pounds) | Addition Time (min:seconds) |
| --- | --- | --- |
| Bauxite | 2250 | — |
| Resole EX18663 | 49.5 | 0:00 |
| Silane A-1100 | 0.9 | 0:07 |
| 2.5% NH$_4$Cl | 2.6 | 0:40 |
| Resole EX18663 | 49.5 | 1:20 |
| 2.5% NH$_4$Cl | 2.6 | 2:00 |
| ENABLE EN33900 | 1.33 or 2.0 | 2:40 |
| Novolac EX5150 | 33.7 | 2:40 |
| KYNOL fiber | 2.25 | 2:40 |
| HEXA | 1.3 | 3:20 |
| Water | 11.3 | 3:20 |

TABLE 6-continued

| Materials | Weight (pounds) | Addition Time (min:seconds) |
| --- | --- | --- |
| SFT-070 | 1:12 | 4:00 |
|  | Discharge | 4:40 |

Resole EX18663 and Novolac EX5150 are available from Borden Chemical, Inc.

Figure 7:
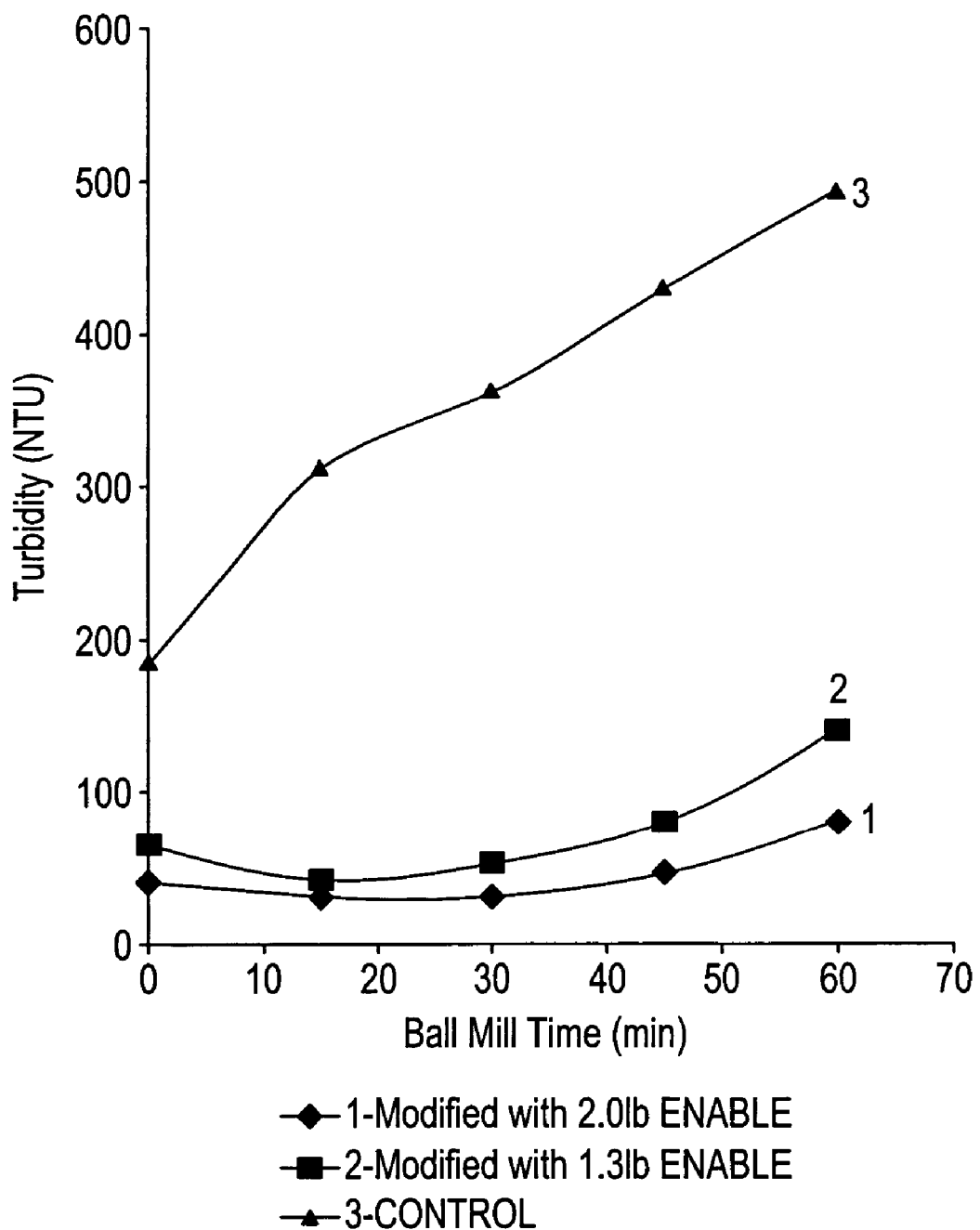
FIG. 7 shows data of turbidity of 20/40 curable resin triple coated ceramic proppant modified with various levels of the ENABLE modifier and shows bauxite modified with various levels of the ENABLE.

Above mentioned, FIG. 4 shows the dust control ability of ENABLE modifier on sand coated with three resinous coatings. FIG. 7 is a representation of data in TABLE 6 and shows the results of turbidity of the above-described bauxite proppant coated with three resinous coatings and modified with ENABLE modifier added with the novolac flakes. FIG. 7 shows ENABLE modifier is capable of suppressing dust during processing and transportation of the proppants at a production site. For this trial, 1.3 and or 2.0 lbs. of ENABLE (1% and 1.75% ENABLE based on resin coating) were added to the batch and both levels are capable of reducing the dust level.

Figure 8:
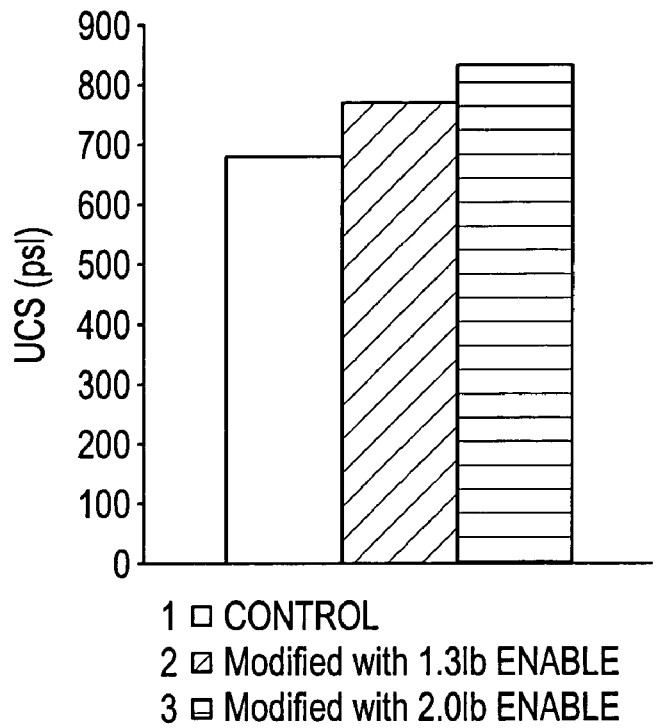
FIG. 8 shows data of UCS of 20/40 curable resin triple coated ceramic proppant modified with ENABLE modifier.

Another significant property is the unconfined compressive strength (UCS). FIG. 8 shows the Unconfined Compressive Strength UCS strength of the samples of a substrate of nearly pure bauxite having a specific gravity of about 3.4 to 3.6 and coated according to TABLE 6 to have 1.3 and 2.0 lbs. of ENABLE (1% and 1.75% ENABLE based on resin coating). The UCS values for the modified samples irrespective of the level of modification are slightly higher than that for the CONTROL sample, but within experimental error.

Figure 9:
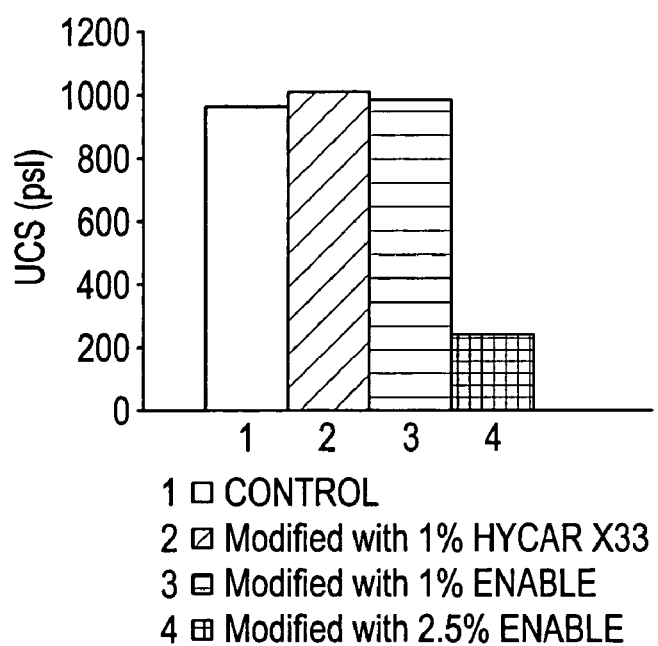
FIG. 9 shows unconfined compressive strength data of 20/40 curable resin triple coated ceramic proppant modified with HYCAR or ENABLE modifier.

FIG. 9 compares UCS data for these samples of the above-mentioned substrate of pure bauxite having a specific gravity of about 3.4 to 3.6 and coated according to TABLE 2, but modified with 1% and 2.5% ENABLE modifier or 1% HYCAR X33 modifier. This data indicates both HYCAR and ENABLE modifiers yielded final resin coated bauxite products without affecting the strength properties at these levels tested. Both samples modified with 1% HYCAR and ENABLE modifier result in good proppant properties. The 2.5% ENABLE modified samples had low UCS suggesting that care should be taken to determine the level of modifier where proppant properties, other than dust control, are not overly (adversely) affected.

TABLE 7 compares wettability of the above-described tri-coated bauxites modified with various grades of HYCAR modifier.

TABLE 7

| Materials | $V_v$ (gallon per 1000 gallons at 10 lb$_m$ proppant per gallon) | $V_m$ (gallons per 1000 gallons for each lb$_m$ proppant/gallon) | Observations |
| --- | --- | --- | --- |
| CONTROL | 0.125 | 0.0125 | Complete wet-out at 0.125. Very few small bubbles at (volume of surfactant) 0.105. About 5 medium-sized bubbles at 0.09. It is dusty. |
| Modified with 1% HYCAR X33 | 0.09 | 0.009 | Complete wet-out at 0.09. At 0.05, only few tiny bubbles were observed. It is dust-free. |

TABLE 7-continued

| Materials | $V_v$ (gallon per 1000 gallons at 10 $lb_m$ proppant per gallon) | $V_m$ (gallons per 1000 gallons for each $lb_m$ proppant/gallon) | Observations |
|---|---|---|---|
| Modified with 1.75% HYCAR X33 | 0.100 | 0.01 | Complete wet-out at 0.100. Very few small bubbles at 0.09. Presence of large (not much) bubbles at 0.05. It is crystal clear. |
| CONTROL from Plant | 0.01 | 0.001 | Complete wet-out at 0.01. It is too dusty to be evaluated The bubbles could out not be seen though the wall of the beaker. |

The wettability of ENABLE modified samples were also checked and found to be good.

Both HYCAR and ENABLE modifiers reduced the level of dust as compared with the CONTROL sample.

Example 4

Figure 10:
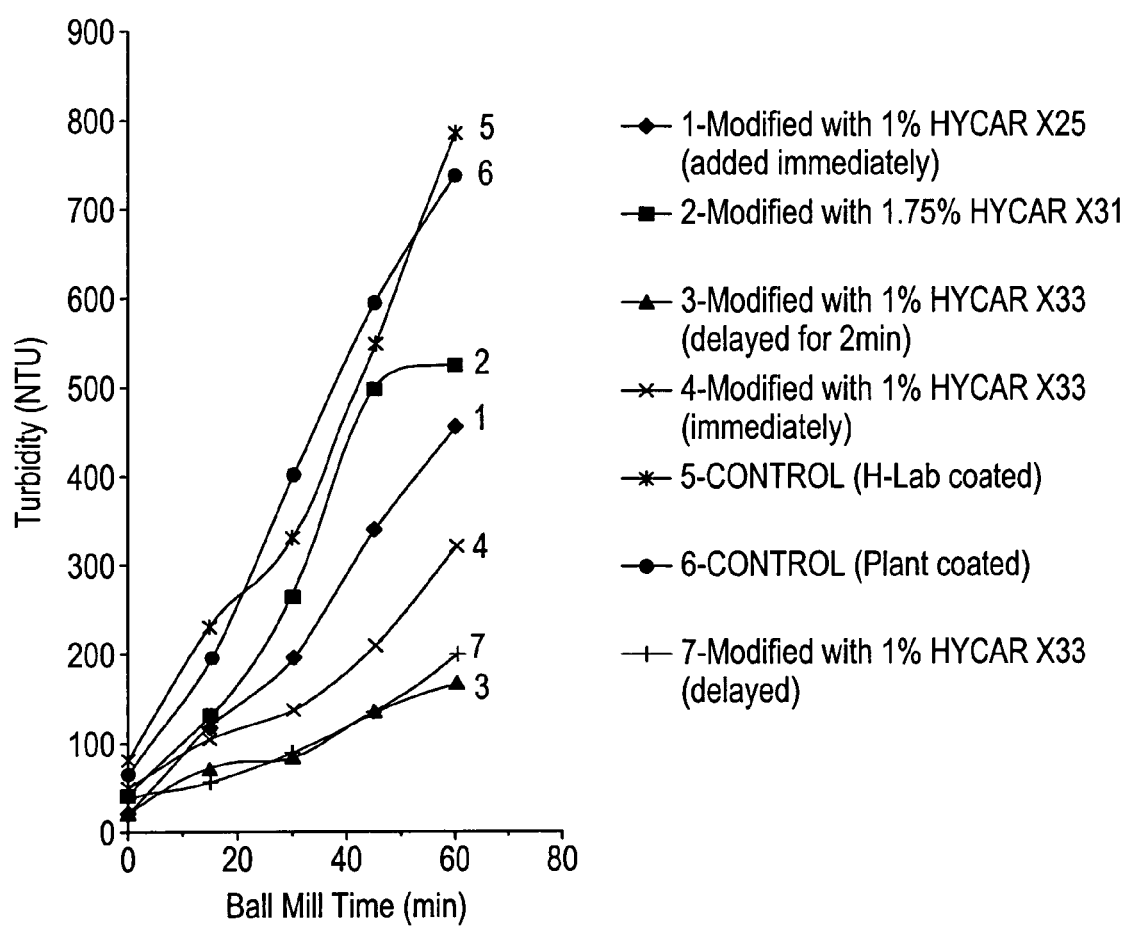
FIG. 10 shows the turbidity of curable novolac/resole resin coated onto a sand substrate.

HYCAR X33 and X31 were used as modifiers in preparing proppants of ceramic having a curable resole/novolac coating made according to TABLE 4. The modifiers were either added to the ingredients immediately or delayed for two minutes during coating, after the phenolic resin has been added. FIG. 10 compares the turbidity results with those of the CONTROL samples (lab and plant coated samples). Once again, HYCAR X33 modifier provides good dust control. For good dust suppression, addition of the modifier is preferably delayed for 2 minutes otherwise, if added immediately (early in the coating cycle), the ability to control the dust is reduced.

Figure 11:
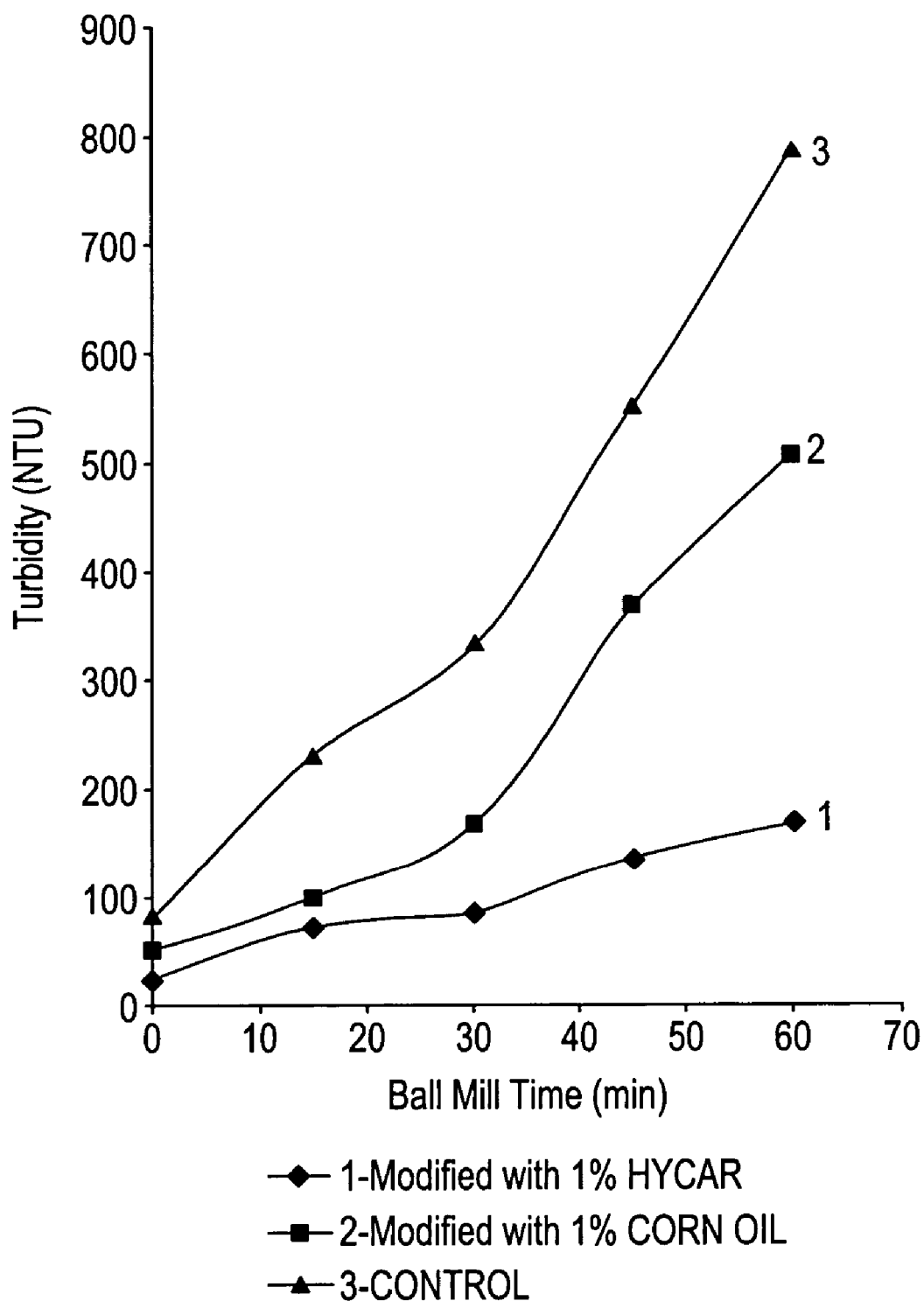
FIG. 11 shows data of turbidity of curable novolac/resole resin coated sand modified with HYCAR X33 and corn oil.

FIG. 11 shows corn oil, another sample tried during this experiment, also reduces the dust level but not as effectively as HYCAR X33 modifier.

Figure 12:
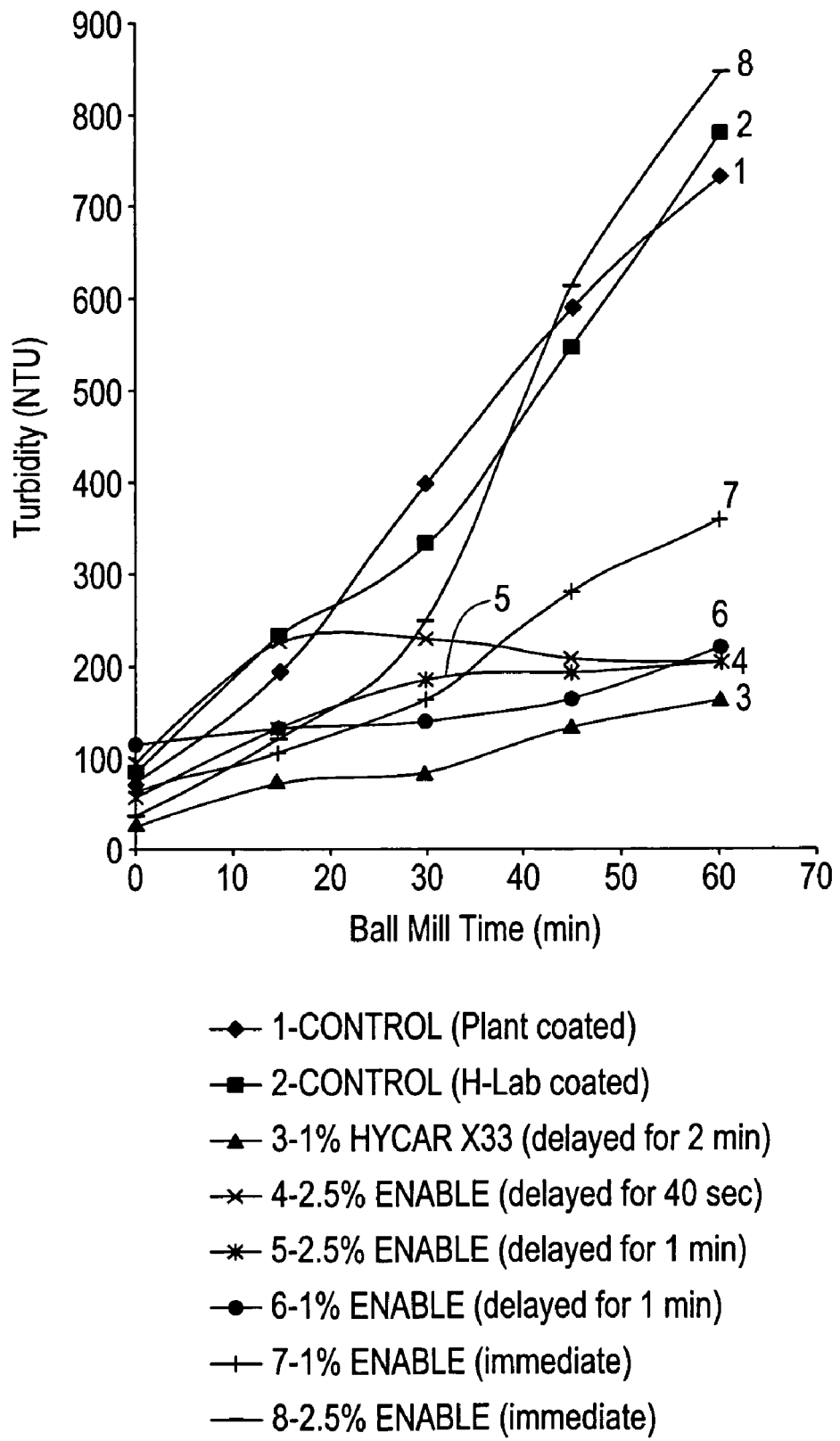
FIG. 12 shows data of turbidity of curable novolac/resole resin coated onto a sand substrate.

FIG. 12 compares capability in suppressing dust particles in samples of controls of this curable resole/novolac resin coated sand with samples modified with HYCAR modifier or ENABLE modifier. The experimental results shown in FIG. 12 also illustrate the effect of adding the modifier too soon (examples wherein ENABLE modifier was immediately added) compared to a more effective use by delaying the time of addition for the modifier (by even 40 seconds or 60 seconds after the resin has been added).

WETTABILITY: Wettability of 1% ENABLE and 1% HYCAR modified samples are both good with good angle of repose.

Figure 13:
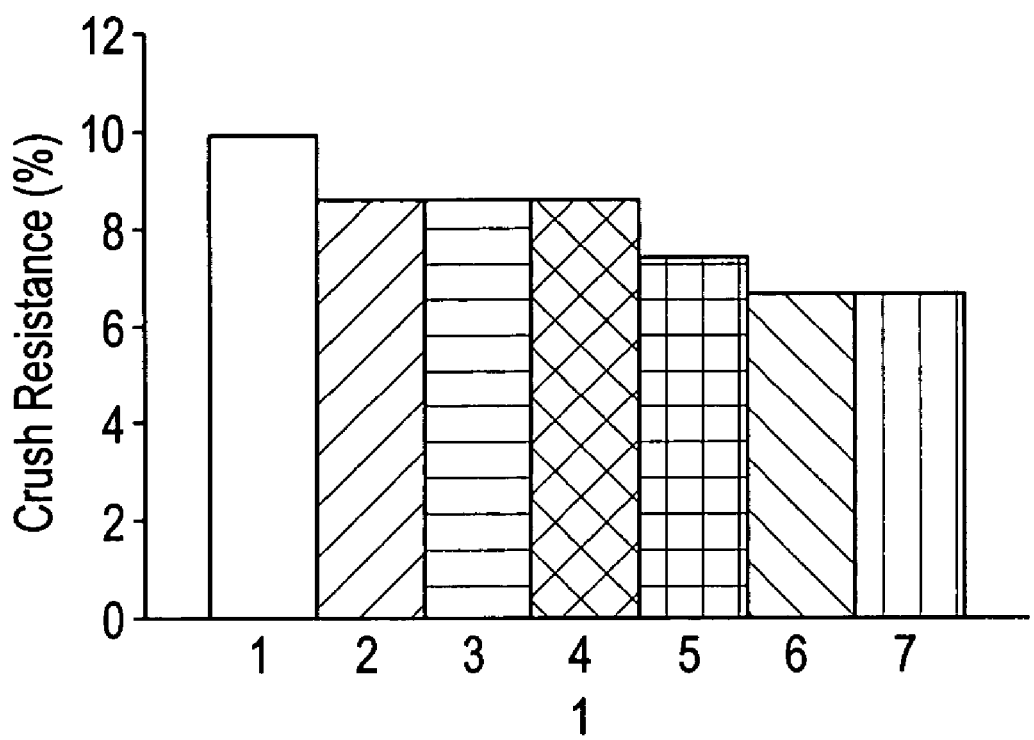
FIG. 13 shows crush resistance test data of precured resole resin coated sand proppant modified with HYCAR X31 or HYCAR X33 additive.

FIG. 13 shows crush resistance test data for a precured resin coated sand made according to TABLE 3 modified with various grades of HYCAR modifier. From this data it was found that this precured resin coated sand HYCAR has the advantage of a reduced level of dust/fracturing (particle failure) as compared with the CONTROL sample.

Example 5

This example compares a ceramic substrate having a curable resin triple layer coating modified with BUTVAR Modifier compared with a ceramic substrate having a curable resin layer coating modified with ENABLE modifier.

Figure 14:
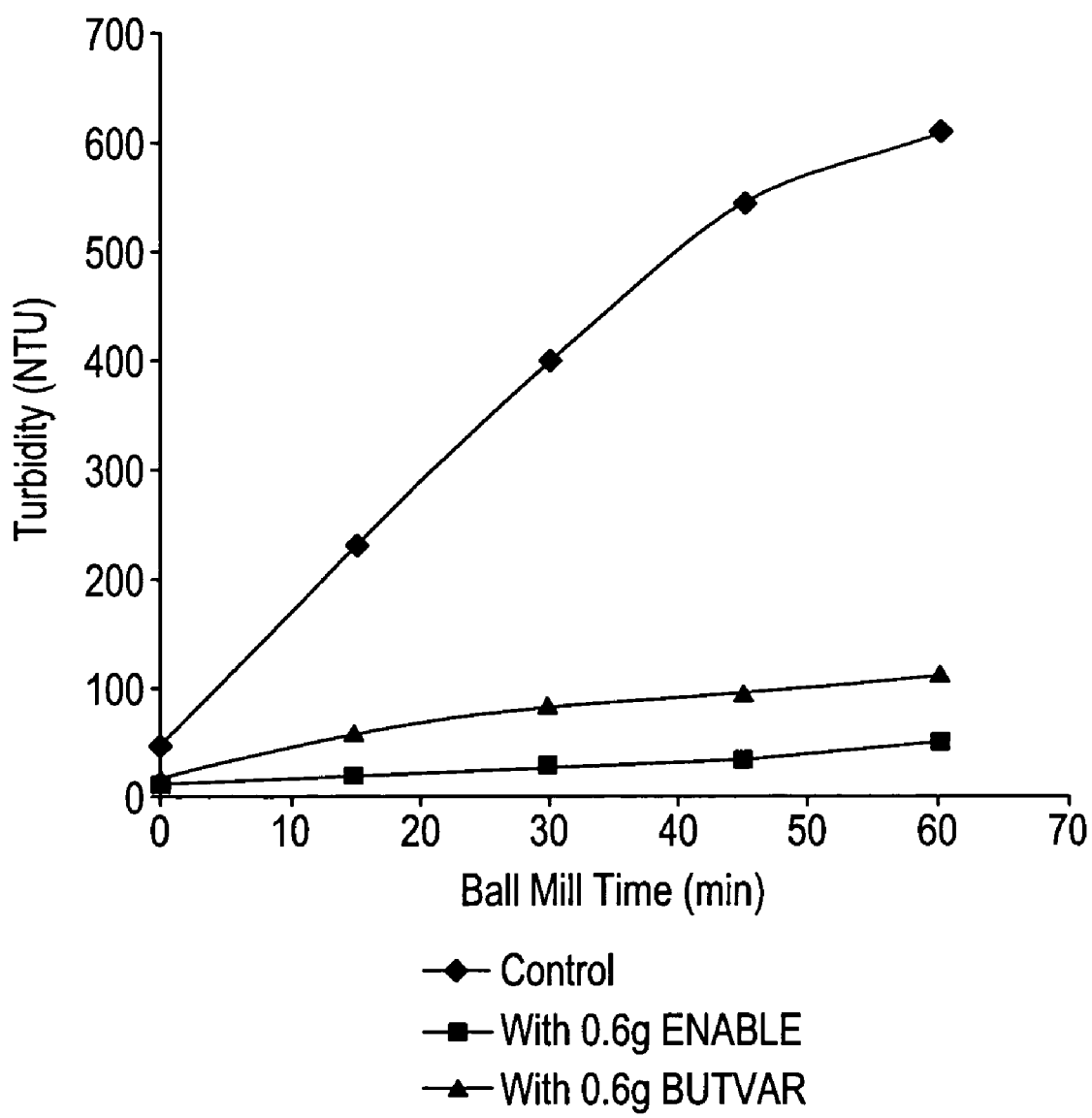
FIG. 14 shows data of turbidity of 20/40 curable triple resin coated ceramic proppant modified with various levels of BUTVAR or ENABLE modifier.

The present example compares a sample having a substrate of pure 20/40 bauxite having a specific gravity of about 3.4 to 3.6, coated with novolac flake with resole over it and modified by adding BUTVAR B90 on already resin coated bauxite as opposed to being modified with ENABLE modifier as shown in Table 4. A sample of BUTVAR B90 of polyvinyl butyral, was obtained from Solutia-St. Louis as a possible dust suppressant for use in resin coated proppants. The ENABLE modified sample was made at the conditions described in the next example. THE BUTVAR modified sample was made at substantially the same conditions but substituting BUTVAR modifier for ENABLE modifier FIG. 14 compares data for BUTVAR B90 modified sample with ENABLE 33900 modified sample and the control treated at the same weight level and for the same period of time. The product produced is superior to that disclosed in U.S. Pat. No. 4,732,920 to Graham et al., which requires the use of a silane coupling agent on the substrate particle as well as in the coating.

Example 6

Figure 15A:
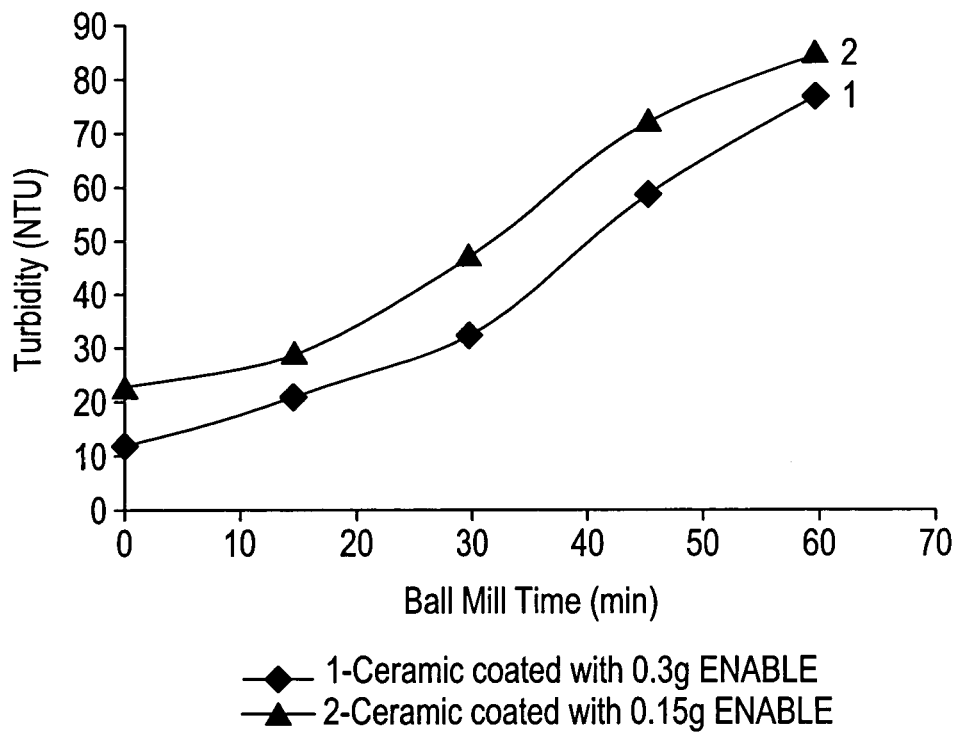
FIG. 15A shows data of turbidity of 20/40 curable resin triple coated ceramic proppant modified with ENABLE modifier.

This example demonstrates the use of a ceramic substrate having a curable resin triple layer coating modified with an ENABLE modifier. FIG. 15A shows turbidity data for samples of particles having a substrate of pure bauxite having a specific gravity of about 3.4 to 3.6 and coated according to TABLE 2 and modified with ENABLE modifier. The Control (shown in FIG. 5) is triple coated with curable resin, but without modifier. The other coated samples are also triple coated with curable resin. Both the SST (440° F.) and the coating time (4 min 40 sec) used for bauxite and ENABLE are the normal coating temperature and time. FIG. 15A shows as low as 0.15 g ENABLE per 100 grams of coated substrate (2.5 weight % based on a 6 weight % resin coating) brings down the dust level dramatically. (SST stands for substrate starting temperature.)

Example 7

Figure 15B:
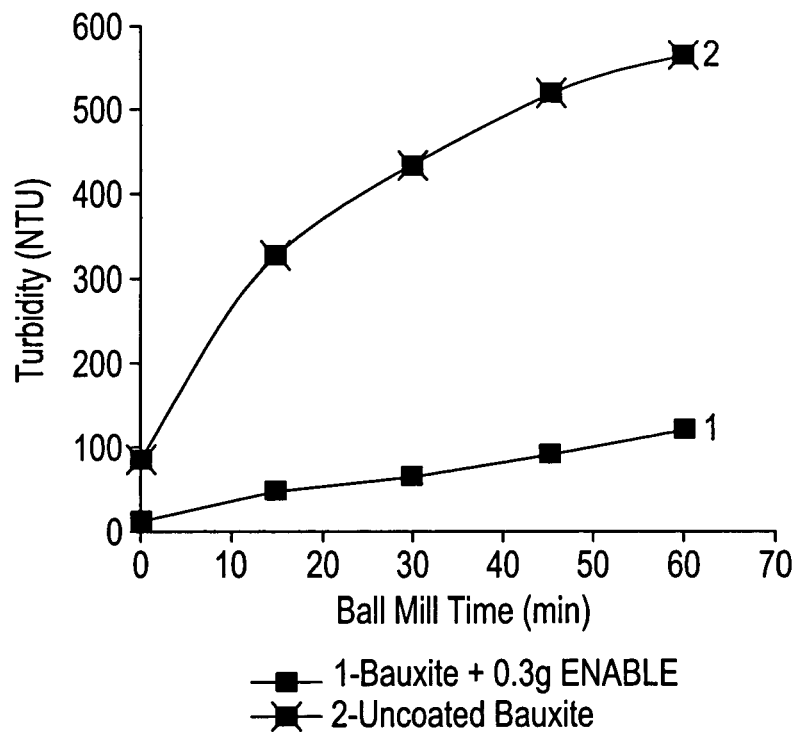
FIG. 15B shows the turbidity of uncoated bauxite modified with ENABLE modifier.

This example demonstrates the use of bauxite without a resin coating. FIG. 15B also shows as low as 0.3 g ENABLE per 100 grams bauxite brings down the dust level for a sample of pure bauxite having a specific gravity of about 3.4 to 3.6 and not having a resin coating. The ENABLE was applied by the same cycle as had been used when the resins were present.

Both the SST (440° F.) and the coating time (4 min 40 sec) used for bauxite and ENABLE are the normal coating temperature and time. This lack of dust shows the ENABLE modifier improves the fracture resistance of the bauxite and moderates the abrasive properties between other particles and system equipment.

Example 8

This example demonstrates the use of a ceramic substrate having a curable resin triple layer coating modified with NIPOL modifier. This example employs a substrate of pure bauxite having a specific gravity of about 3.4 to 3.6 and coated according to TABLE 2, but substituting NIPOL modifier as the modifier. In this example, the control is a ceramic substrate having a curable resin triple layer coating without NIPOL modifier.

Figure 16:
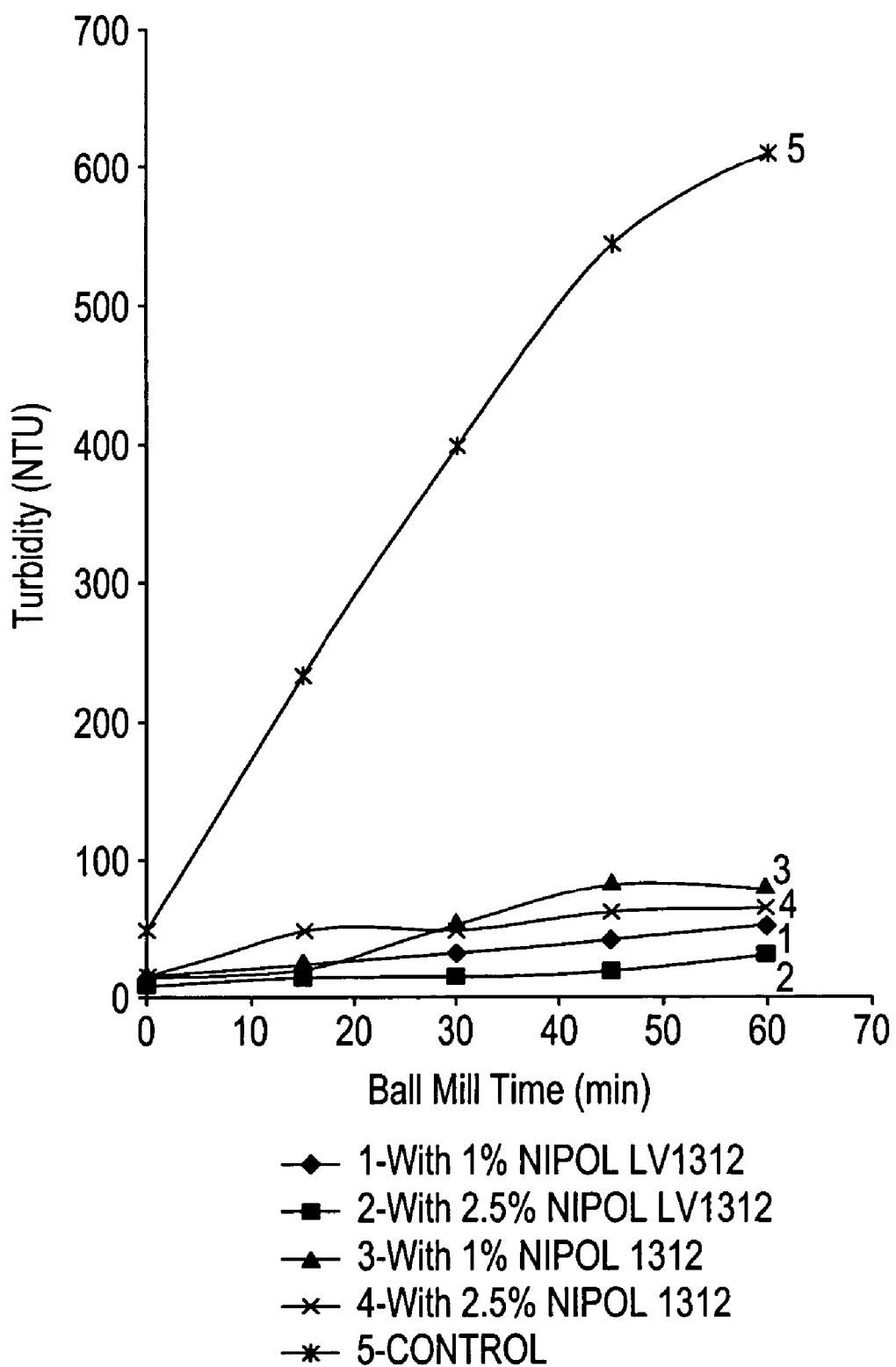
FIG. 16 shows ceramic substrate triple coated with curable resin modified with NIPOL modifier.

FIG. 16 shows the NIPOL modifier is also good as a dust suppressant.

Example 9

This example was undertaken to demonstrate aqueous acid resistance. The substrate (sand or ceramic) is heated to a temperature adequate to heat/melt the thermoplastic/elastomer to a low viscosity (about 100 to about 500 degrees F.) to allow good coverage of the additive onto the substrate. Levels of the most effective elastomer can be in the range of about 0.05 to about 2% based on the weight of the substrate. The coated particle is recovered from the mixer and screened to the desired size range. Samples of this material is subjected to the Acid Solubility Test for Proppants and described below; with the results as described.

The results of an acid test (See API RP 56, Section 7) are listed in TABLE 8 and show a reduction in the "acid solubles" for the coated substrates(s), consisting of dense ceramic (bauxite) and brown sand of at least 10% below that of the controls. This reduction in acid solubility is a direct result of coating the substrates with a material that restricts the permeability of the aqueous materials. Thereby, protecting the substrate from adhesion loss with the coating and dissolution with a corresponding loss of performance attributes such as crush resistance and conductivity of the proppant pack.

Acid solubility test on ENABLE modified substrates was carried out using a mud acid (ammonia bifluoride and hydrochloric acid). 1% ENABLE (10 g ENABLE/1000 g substrate) was coated as follows:

Bauxite: 10 g ENABLE was coated onto 1000 g of 20/40 mesh bauxite at 440 F for 4 min 40 sec.

Brown sand: 10 g ENABLE was coated onto 1000 g of 20/40 brown sand at 350 F for 4 min 10 sec.

Test Conditions: API RP 56 (30 minutes at 150 F)

The results are shown in TABLE 8.

TABLE 8

| Materials | Acid solubility (%) |
|---|---|
| 100% Bauxite | 1.79 |
| 100% Bauxite With 1% ENABLE | 1.09 |
| 100% Brown sand | 0.57 |
| 100% Brown sand With 1% ENABLE | 0.34 |

Example 10

The substrate (brown sand or ceramic) is heated to a temperature adequate to heat/melt the thermoplastic elastomer to a low viscosity (100-500 degrees F.) to allow good coverage of the additive onto the substrate. These are otherwise uncoated proppants.

Figure 17:
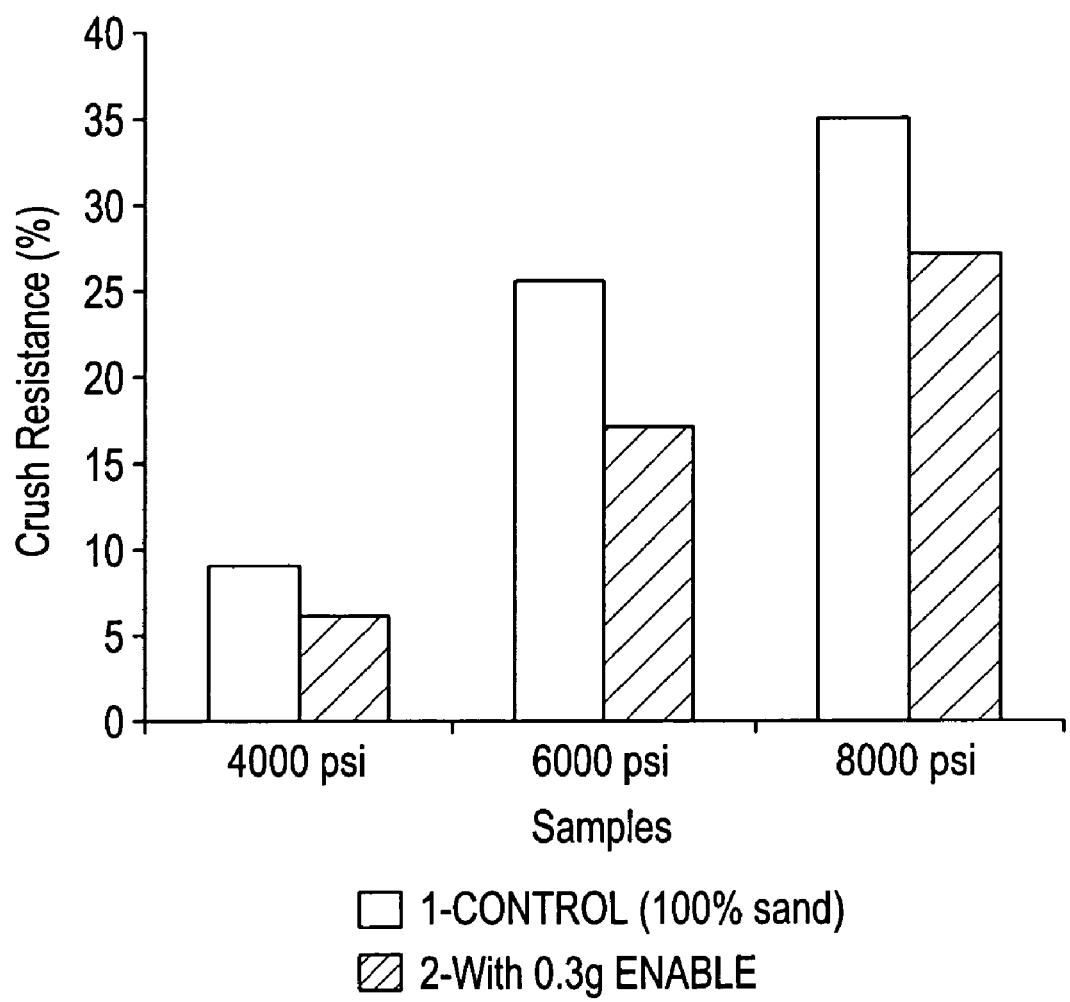
FIG. 17 shows the influence of ENABLE modifier on crush resistance of brown sand.

Levels of the most effective elastomer can be in the range of 0.05-2%. The coated particle is removed from the mixer and screened to the desired size range. Samples of this material were subjected to the Crush Test. FIG. 17 shows Percent Crush improvements experienced with the brown (Hickory) sand.

Figure 18:
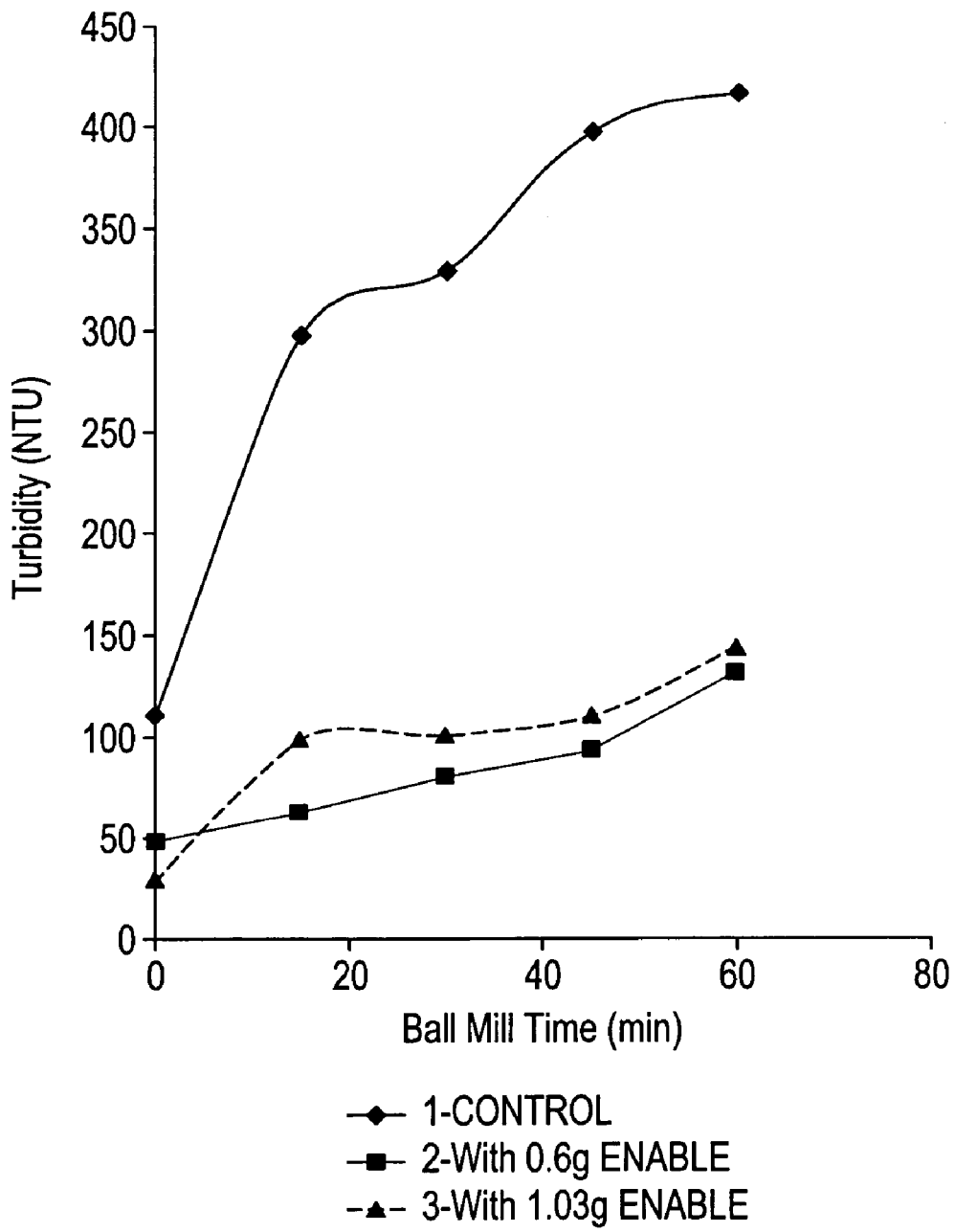
FIG. 18 shows the influence of ENABLE modifier on turbidity of lightweight ceramic.

FIG. 18 illustrates the dusting/fracture improvements that were experienced with an otherwise uncoated lightweight ceramic proppant having a specific gravity of about 2.7 grams/cubic centimeter (g/cc).

Figure 19:
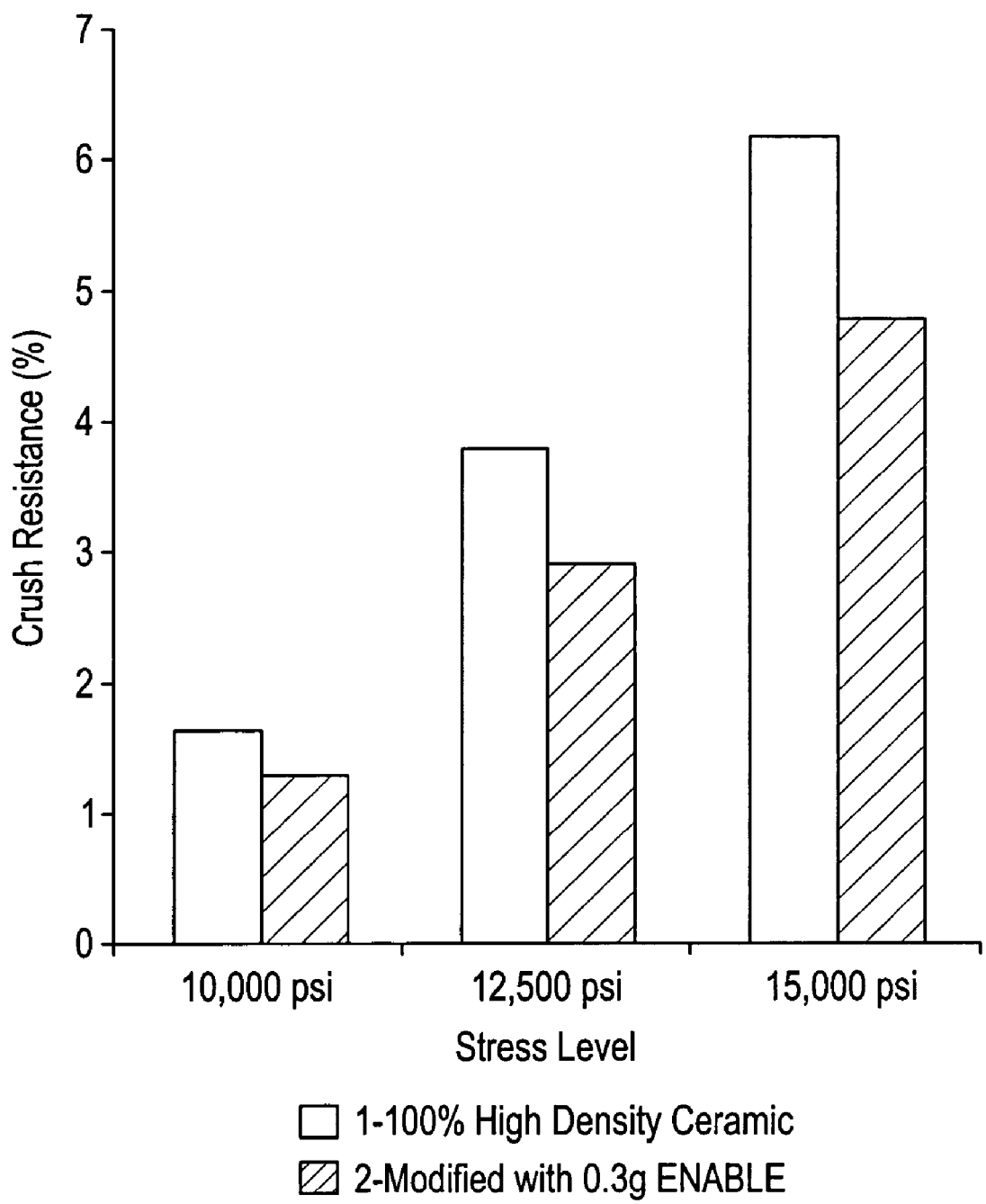
FIG. 19 shows the influence of ENABLE modifier on crush resistance of high density ceramic.

FIG. 19 illustrates the crush resistance improvements experienced with the dense ceramic (a substrate of non-resin coated pure bauxite having a specific gravity of about 3.4 to 3.6) and again demonstrates the performance enhancements that are possible utilizing the thermoplastic elastomers to impart dust control and fracture improvements to otherwise uncoated particles.

Example 11

This example may be used to demonstrate how the unconfined compressive strength may be improved. The substrate (sand or ceramic) is heated to a temperature adequate to heat/melt the thermoplastic/elastomer to a low viscosity (about 300 to about 500 degrees F.) to allow good coverage of the additive onto the substrate. Levels of the most effective elastomer can be in the range of 0.05-2%. At this point, we can detect unconfined compressive strength in two ways;

A) we remove the thermoplastic coated substrate and evaluate for UCS strength. The strengths recorded are a function of the nature of the thermoplastic material and the temperature at which we apply it to the particle and the level (LOI) of the thermoplastic on the particle;

B) while the substrate is still hot (with the thermoplastic already added), we put a layer of a novolac flake resin, followed by a resole resin (or hexa curative) at a level to obtain 1-4% resin solids on the substrate; followed by continued mixing to reach a desired conversion of the novolac plus curative applied (~3 minutes).

The coated particle from A and B above, is removed from the mixer and screened to the desired size range. Prophetic samples of this material are subjected to the Unconfined Compressive Strength test as described below. It is theorized that use of these elastomers enhanced the performance of the uncoated substrate or resin coated substrate, possibly by the creation of a bond at the interface of the particle/particle contact. Also, this is viewed as creation of a flexible adhesive to enhance the performance of the thermoset resins adhesion to the substrate, where otherwise failure may initiate.

TABLE 9 below illustrates the improvements in Unconfined Compressive Strength hypothetically theorized when lightweight ceramic is the substrate.

TABLE 9

| | MATERIAL TESTED | |
|---|---|---|
| | UCS @200 degrees F. | UCS @ 250 degrees F. |
| CONTROL (no elastomer, resins) | 0 | 0 |
| 1% ENABLE | 100 | 200 |
| 1% ENABLE + 3% phenolic resins | 600 | 700 |
| 1.75% ENABLE | 200 | 300 |
| 1.75% ENABLE + 3% phenolic resins | 800 | 900 |

Example 12

This example demonstrates the use of a processing aid in the manufacture of the coated particles. Unexpected advantages were observed when processing resin coated substrates which had been treated with the elastomers. The processing advantages show up early as reflected in a reduction in the amperage required to turn the agitator that is mixing the material during the coating process. During the coating step, a 25% reduction is noted in the amperage draw, indicating the use of the elastomer will function to lubricate the particles and avoid agglomeration. This is significant in terms of power consumption reduction, but also allows the mixer to accept a larger total charge, even at the same amperage demands.

Further evidence of reduced agglomeration can be seen in the screening of the product from the mixer, where the amount of clusters (and other oversize clumps) is reduced. This allows a yield improvement of about 2 to about 5% of the desired in-size particles because of the reduction in the agglomerates.

Example 13

This is an example that can be used to demonstrate the use of a coupling agent. It is theorized that the benefit of the present invention in improving Unconfined Compressive Strength described above arises at least in part because the thermoplastic elastomer functions as a coupling agent, to assist in getting the organic resins to adhere to both sand and ceramic. This is tested using similar data to what is shown in above-described UCS tests to reference the performance as a coupling agent, but compare it to the standard use of silane as a coupling agent, for sand and ceramic. A recipe similar to the highly curable resin coated proppants of TABLE 13 would be used (novolac+hexa on sand). The prophetic data listed in TABLE 10 shows how it is theorized the use of thermoplastic elastomer can improve UCS by functioning as a coupling agent to assist in bonding resin coating to white sand.

TABLE 10

|  | MATERIAL TESTED | |
| --- | --- | --- |
|  | UCS @200° F. | UCS @ 250° F. |
| CONTROL (use A 1100 Silane) | 600 | 700 |
| With 1% ENABLE (no silane) | 800 | 900 |
| With 1.75% ENABLE (no silane) | 1000 | 1200 |

Example 14

This example was undertaken to demonstrate the long term storage stability of the coated substrates. TABLE 11 shows the procedure and ingredients for coating resin coated sand with a highly curable coating which is sensitive to long term inventory issues. The first layer consists of a phenol-formaldehyde novolac flake (EX5150) to which is then added a liquid phenol-formaldehyde resole as crosslinker (OWR9200). Wherein, the substrate is heated in the mixer to the desired temperature, the components are added in the desired ratio. The addition occurs at the noted times, to effect only a desired amount of conversion of the novolac flake and resole combination. This facilitates the recovery of a "highly curable" coating on the particles. One detriment has been the tendency of the novolac flake and resole combination coating to be subject to moisture pick-up, which is demonstrated as the tendency to form large amounts of early premature "consolidation" during inventory, transportation, and warehousing. In the extreme case, when subjected to relatively high temperature and high humidity, this could even result in the mass of individual particles consolidating into one large lump, which is no longer free flowing or functional as a proppant. TABLE 11 demonstrates how several levels of ENABLE was used in lab trials to reduce the tendency to set-up prematurely as a consequence of heat and humidity. Amounts in TABLE 11 are in grams, unless otherwise indicated. The coating temperature was 330° F.

TABLE 11

| Ingredients | Weight (grams) | Add time (min:seconds) |
| --- | --- | --- |
| Sand particles | 1000 | 0:00 |
| *Novolac flake, EX5150 | 15 | 0:00 |
| Silane, A-1100 | 0.3 | 0:12 |
| Liquid Resole, OWR 9200 | 33.0 | 0:50 |
| ENABLE EN 33900 | 0, 1.0, 1.2, or 1.5 | 0:50 |
| water | 6-11 | 2:40 |
| Lubricant | 0.3-0.6 | 2:43 |
|  | Discharge | 3:43 |

*Novolac EX5150 and Resole OWR 9200 are available from Borden Chemical, Inc.

During the coating trials, essentially identical batches were produced without the ENABLE additive. Below, in TABLE 12 are the results of a number of batches with and without the ENABLE, illustrating the capacity to moderate the effect of heat and humidity on the undesirable premature consolidation of the free flowing particles. For this test, 50 gms of the free flowing particles are placed in a 2 inch diameter by 2.75 inch tall cardboard cylinder with a 1000 gm weight on top of the particles. The cylinder is then placed in a 104 degree F. oven at 95% relative humidity for 24 hours at which point the samples are removed; the weight removed; and a wooden spatula used to determine how "solid" the sample has become. A rating scale of 0-10 (where 0 signifies no consolidation and 10 indicates a rock hard sample) is used to quantify the effect. This tests the ability of materials to remain unconsolidated. It is equally important that the ENABLE additive does not adversely affect the capability to bond together at elevated temperatures (UCS test, which simulates the downhole application at 200 degrees F.). This too was tested and reported in Table 12, which indicates the bond strength wasn't affected (within experimental error of the test).

TABLE 12

|  | BATCH# | | | |
| --- | --- | --- | --- | --- |
|  | 3 | 19 | 20 | 21 |
| ENABLE | no | 1.0 gms | 1.2 gms | 1.5 gms |
| Storage Rating | 10 | 6 | 5 | 7 |
| UCS(200F) | 875 psi | 949 psi | 794 psi | 911 psi |

Example 15

TABLE 13 shows the procedure and ingredients for coating resin coated sand with a highly curable coating. The first layer consisting of a phenol-formaldehyde novolac flake (EX5150) to which is then added the HEXA crosslinker. Wherein the substrate is heated in the mixer to the desired temperature and then components are added in the ratio, and at times as noted to effect only a minimum amount of conversion of the novolac flake. This facilitates the recovery of a "100% curable" coating on the particles. One detriment has been the tendency of the novolac flake/HEXA combination to be friable, which was demonstrated as the tendency to form large amounts of "dust" during processing and conveying. TABLE 13 demonstrates how ENABLE was used in a production plant trial to reduce the tendency to form dust. Amounts in TABLE 13 are in pounds unless otherwise indicated. The coating temperature was 290 degrees F.

TABLE 13

| Ingredients | Weight (pounds) | Add time (min:seconds) |
|---|---|---|
| 20/40 Sand particles | 800 | 0:00 |
| *Novolac flake, EX5150 | 30.1 | 0:08 |
| ENABLE EN 33900 | 0.6 | 0:30 |
| Silane A-1100 | 0.5 | 0:35 |
| 40% HEXA | 11.4 | 1:18 |
| water | 7.7 | 1:18 |
| Silicone lubricant | 1.3 | 1:18 |
| Discharge | | 2:58 |

*Novolac EX5150 is available from Borden Chemical, Inc.

During the coating trials, essentially identical batches were produced without the ENABLE to suppress dust. Below, in TABLE 14 are the results of a number of batches with and without the 0.6# ENABLE, illustrating the dust level at an intermediate point in the cycle and the final dust level as the product exits the process.

TABLE 14

| | BATCH# | | | | | |
|---|---|---|---|---|---|---|
| | 5 | 15 | 30 | 45 | 58 | 62 |
| ENABLE | no | no | no | no | yes | yes |
| Dust, Int. | 124 | 103 | 114 | 161 | 78 | 97 |
| Dust, Final | 135 | 135 | 125 | 173 | 91 | 112 |

It should be apparent that embodiments other than expressly described above come within the spirit and scope of the present invention. Thus, the present invention is not limited by the foregoing description but rather by the claims appended hereto.

The invention claimed is:

1. A particle comprising:
a particulate substrate; and
a thermoplastic polymer present on or in the substrate in an amount sufficient to improve the dust suppression of the particle above that which would occur if the thermoplastic polymer was absent; wherein the particle comprises 0.005 to 4.0 weight percent of the thermoplastic polymer, based upon weight of the particle.

2. The particle of claim 1, wherein the thermoplastic polymer has a glass transition temperature of at most about 50 degrees C.

3. The particle of claim 1, wherein the thermoplastic polymer comprises an amorphous polymer having a glass transition temperature of at most about 50 degrees C.

4. The particle of claim 1, wherein the thermoplastic polymer comprises a semi-crystalline polymer having a softening point in the range of 40 to 80 degrees C.

5. The particle of claim 1, having an absence of a thermosetting resin.

6. The particle of claim 1, wherein the substrate is selected from at least one member of the group consisting of sand, ceramic particles, nut flour, and glass beads.

7. The particle of claim 1, further comprising at least one layer of a thermosetting resin coating substantially surrounding the substrate to form a coated particle.

8. The particle of claim 7, wherein at least one said layer of a thermosetting resin coating further comprises filler particles.

9. The particle of claim 1, wherein the thermoplastic polymer is selected from the group consisting of homopolymers of C1-C12 alkyl(meth)acrylates, olefin polymers and copolymers, copolymers of olefins with acrylates, styrene or anhydrides, butadiene homopolymers with or without functionality at their chain ends, butadiene-acrylonitrile copolymers with or without functionality at their chain ends, and mixtures thereof.

10. The particle of claim 7, wherein the thermosetting resin is a phenol-aldehyde, epoxy, urea-aldehyde, furfuryl alcohol, melamine-aldehyde, polyester, alkyd, novolac, furan resin, or a combination comprising at least one of the foregoing thermosetting resins.

11. The particle of claim 1, wherein the particulate substrate comprises a single particle.

12. The particle of claim 1, wherein the substrate is a composite particle comprising a binder, and wherein filler particles are homogeneously disbursed throughout the binder.

13. The particle of claim 12, wherein a thermoplastic polymer is located on a surface of the composite particle.

14. The particle of claim 1, wherein the thermoplastic polymer comprises a member selected from the group consisting of ethylene-n-butyl acrylate copolymer, n-butyl acrylate homopolymer and mixtures thereof.

15. The particle of claim 1, wherein the thermoplastic polymer comprises up to about 10 weight percent of polyvinyl acetal and polyvinyl butyral, based on the total weight of the thermoplastic polymer on a dry basis.

16. The particle of claim 1, wherein the thermoplastic polymer comprises a member selected from the group consisting of butadiene homopolymers and butadiene-acrylonitrile copolymers.

17. The particle of claim 1, wherein the thermoplastic polymer comprises a member selected from the group consisting of butadiene homopolymers and butadiene-acrylonitrile copolymers with functionality at their chain ends, and wherein the functionality comprises functional groups selected from the group consisting of carboxy, amine, methacrylate and epoxy.

18. The particle of claim 1, wherein the thermoplastic polymer comprises an ethylene-n-butyl acrylate copolymer having functional groups selected from the group consisting of carboxy, amine, methacrylate and epoxy.

19. The particle of claim 1, wherein the thermoplastic polymer is selected from the group consisting of: a carboxyl terminated butadiene-acrylonitrile with an acrylonitrile content of about 10%, a Tg of about minus 50 to minus 77 degrees C., a Brookfield viscosity of about 60,000 MPa, and a carboxyl content of about 25%; a methacrylate vinyl terminated butadiene-acrylonitrile copolymer with an acrylonitrile content of about 18%, a Tg of up to about minus 49 degrees C., and a Brookfield viscosity of about 50000 MPa; an amine terminated butadiene-acylonitrile copolymer with an acrylonitrile content of about 18%, a Tg of up to about minus 59 degrees C., and a Brookfield viscosity of about 100000 MPa; and a combination comprising at least one of the foregoing thermoplastic polymers.

20. The particle of claim 1, wherein the particle has a turbidity of 5 to 200 NTU.

21. The particle of claim 7, wherein the coating comprises 0.05 to 100 weight percent of the thermosetting resin, based upon weight of the particle.

22. The particle of claim 1, wherein upon being subjected to a 60 minute ball mill test the particle achieves a turbidity measurement of less than 200 NTU at 30 minutes ball mill time and/or less than 300 NTU at 60 minutes ball mill time.

23. The particle of claim 1, wherein upon being subjected to a 60 minute ball mill test the particle achieves a turbidity measurement of less than 100 NTU at 30 minutes ball mill time and/or less than 150 NTU at 60 minutes ball mill time.

24. The particle of claim 1, further having at least one curable thermosetting resin coating and a UCS of at least 85% of a control particle which has the same composition but lacks the thermoplastic polymer.

25. The particle of claim 1, further having at least on precured thermosetting resin coating which reduces the fracture tendency of the coated particle, as measured by a crush resistance test, by at least 20% when compared to a control particle which has the same composition except for the thermoplastic polymer.

26. The particle of claim 1, further having at least one precured thermosetting resin coating which reduces the fracture tendency of the coated particle, as measured by a crush resistance test, by at least 10% when compared to a control particle which has the saint composition except for the thermoplastic polymer.

27. The particle of claim 1, having at least one precured thermosetting resin coating and having sufficient thermoplastic polymer to have a crush strength of at least equal to that of a control particle which has the same composition, but lacks the thermoplastic polymer.

28. The particle of claim 1, wherein the particle displays reduced abrasion towards other particles, handling equipment and/or down hole tubular objects and/or equipment as compared with substrate particles that lack the thermoplastic polymer.

29. The particle of claim 1, having sufficient thermoplastic polymer to reduce water pickup byte particle of 20 weight percent when compared with a particle that lacks the thermoplastic polymer.

30. The particle of claim 1, having sufficient thermoplastic polymer to result in a particle having at least 10% of a reduction in weight loss under an API RP 56 acid resistance test as compared to a particle which is the same but lacks the thermoplastic polymer.

31. The particle of claim 1, having sufficient thermoplastic polymer to result in a storage stability of 24 hours when stored at 95% relative humidity at a temperature of 104 degrees F.

32. The particle of claim 1, wherein the amount of thermoplastic polymer is sufficient to produce reduced agglomeration, and wherein clusters and other oversized clumps are reduced by an amount effective to produce a yield improvement of at least 2 to 5% when compared with particle that lack the thermoplastic polymer.

33. The particle of claim 1, wherein the thermoplastic polymer present on or in the substrate improves the crush resistance and/or the abrasive properties and/or the acid resistance of the particle above that which would occur if the thermoplastic polymer was absent.

34. A method for manufacturing a particle comprising:
heating a particulate substrate; and
disposing upon the particulate substrate, a thermoplastic polymer in an amount sufficient to improve the dust suppression and/or crush resistance and/or acid resistance and/or abrasion resistance of the particle above that which would occur if the thermoplastic polymer was absent wherein the particle comprises 0.005 to 4.0 weight percent of the thermoplastic polymer, based upon weight of the particle.

35. The method of claim 34, comprising mixing the thermoplastic polymer with the particulate substrate after the particulate substrate is heated to temperatures of about 225° to 550° F.

36. The method of claim 34, further comprising the steps of mixing a thermosetting resin with the particulate substrate at temperatures of about 225° to 550° F., to form a thermosetting resin coating on the particulate substrate.

37. The method of claim 34, wherein the disposing comprises the steps of mixing the thermoplastic polymer with the particulate substrate preheated to temperatures of about 225° to 550° F., and further adding a thermosetting resin to form a thermosetting resin coating on the particulate substrate.

38. The method of claim 36, wherein the thermosetting resin is in the form of novolac flakes, and wherein the novolac flakes are added to the preheated particulate substrate to form a mixture, and wherein a thermoplastic polymer is further added to the mixture about 30 to 90 seconds after the flakes are added to the particulate substrate.

39. The method of claim 38, wherein the novolac flakes contains filler particulates or wherein the filler particulates are added concurrently with the novolac flakes.

40. The method of claim 36, wherein the thermosetting resin is selected from the group consisting of a phenolic resole resin, a furan resin, a terpolymer of phenol, furfuryl alcohol and formaldehyde, phenol formaldehyde novolac resin and mixtures thereof.

41. The method of claim 34, wherein the particulate substrate is selected from the group consisting of sand, bauxite, zircon, ceramic particles, nut flour, glass beads, composite particles comprising a resin binder with filler particles, and mixtures thereof and has a particle size of about 8 to about 100 mesh in size.

42. The method of claim 34, wherein the substrate is a single particle and a thermosetting resin is further applied to the particulate substrate to coat the substrate, following which the thermosetting resin is cured, and following which the thermoplastic polymer is then applied to the particle.

43. The method of claim 42, wherein after the thermosetting resin has cured, the particles are coated with additional thermosetting resin and cured again, following which a thermoplastic polymer is disposed upon the additional thermosetting resin.

44. The method of claim 43, wherein the thermosetting resin comprises a resole resin and the additional thermosetting resin comprises a polyurethane resin or an alkaline modified resole resin curable with ester.

45. The method of claim 34, further comprising granulating the particles.

46. The method of claim 34, further comprising coating the particle with a thermosetting resin that contains dispersed filler particles, wherein the filler particles have an average grain size of 4 to 10 micrometers.

47. A method of treating a hydraulically induced fracture in a subterranean formation surrounding a wellbore comprising introducing a proppant comprising free flowing particles of claim 1 into the fracture.

48. The method according to claim 47, wherein a pack comprising the particles is formed in the formation.

49. A method of treating a hydraulically induced fracture in a subterranean formation surrounding a wellbore comprising introducing a proppant comprising free flowing particles of claim 7 into the fracture.

50. The method according to claim 49, wherein a pack comprising the particles is formed in the formation.

51. A method for treating a subterranean formation comprising:
applying to the subterranean formation a particle comprising a particulate substrate upon which is disposed a thermoplastic polymer and a hydraulic fracturing fluid;

wherein the particle comprises 0.005 to 4.0 weight percent of the thermoplastic polymer, based upon weight of the particle.

52. The method for treating a subterranean formation of claim 51, wherein the particulate substrate further has a curable thermosetting coating and wherein the curable thermosetting coating undergoes curing within fractures of the subterranean formation.

53. The method for treating a subterranean formation of claim 51, further comprising introducing to particles into the well bore forming a gravel pack about a wellbore and about a containment area.

54. A method for treating a subterranean formation comprising:
applying to the subterranean formation a particle comprising a particulate substrate upon which is disposed a thermoplastic polymer, a thermosetting resin and a hydraulic fracturing fluid; wherein the particle comprises 0.005 to 4.0 weight percent of the thermoplastic polymer, based upon weight of the particle.

55. The method for treating a subterranean formation of claim 54, further comprising introducing the particles into the well bore forming a gravel pack about a wellbore and about a containment area.

56. A particle comprising:
a particulate substrate; and
a thermoplastic polymer, wherein the particle has a turbidity of about 10 to 200 NTU after a one hour ball mill test and wherein the particle has a compressive strength retention of greater than about 50% as measured by a UCS test when compared with a particle having that does not comprise the thermoplastic polymer; and wherein the particle comprises 0.005 to 4.0 weight percent of the thermoplastic polymer, based upon weight of the particle.

57. The particle of claim 56, wherein the particle further comprises a first thermosetting resin coating and optionally a second thermosetting resin coating, and wherein the first thermosetting resin and the second thermosetting resin are phenol-aldehydes, epoxies, urea-aldehydes, furfuryl alcohols, melamine-aldehydes, polyesters, alkyds, novolacs, furan reins, or a combination comprising at least one of the foregoing thermosetting resins, and wherein the particle further comprises an outermost coating that comprises a thermoplastic polymer.

58. The particle of claim 57, wherein the first thermosetting resin coating comprises a first curative in an amount sufficient to at most partially cure the first thermosetting resin and wherein the second thermosetting resin coating comprises a second curative in an amount sufficient to at most partially cure the second thermosetting resin coating.

59. A particle comprising:
a particulate substrate;
a thermoplastic polymer; and
a thermosetting resin, wherein the particle has a turbidity of about 10 to 200 NTU after a one hour ball mill test and has a compressive strength retention of greater than about 50% as measured by a UCS test when compared with a particle that does not comprise the thermoplastic polymer; and wherein the particle comprises 0.005 to 4.0 weight percent of the thermoplastic polymer, based upon weight of the particle.

60. A particle comprising:
a particulate substrate;
a thermoplastic polymer; and
a thermosetting resin, wherein the thermoplastic polymer is present in an amount sufficient to improve the dust suppression and/or crush resistance and/or acid resistance and/or abrasion resistance of the particle above that which would occur if the thermoplastic polymer was absent; and wherein the particle comprises 0.005 to 4.0 weight percent of the thermoplastic polymer, based upon weight of the particle.

61. The particle of claim 60, wherein the thermoplastic polymer has a glass transition temperature of at most about 50 degrees C.

62. The particle of claim 60, wherein the particulate substrate is selected from the group consisting of sand, ceramic particles, nut, flour, and glass beads.

63. The particle of claim 60, wherein the thermosetting resin substantially surrounds the substrate to form a coated particle.

64. The particle of claim 63, the thermosetting resin comprises at least one layer that comprises filler particles.

65. The particle of claim 60, wherein the thermoplastic polymer is selected from the group consisting of homopolymers of C1-C12 alkyl(meth)acrylates, olefins, copolymers of olefins with acrylates, styrene or anhydrides, butadiene homopolymers with or without functionalities at their chain ends, butadiene-acrylonitrile copolymers with or without functionality at their chain ends, and mixtures thereof.

66. The particle of claim 60, wherein the thermosetting resin is a phenol-aldehyde, epoxy, urea-aldehyde, furfuryl alcohol, melamine-aldehyde, polyester, alkyd, novolac, furan resin, or a combination comprising at least one of the foregoing thermosetting resins.

67. The particle of claim 60, wherein the particulate substrate is a composite particle comprising binder and filler particles homogeneously dispersed throughout the binder.

68. The particle of claim 67, wherein a thermoplastic polymer is located on a surface of the composite particle.

69. The particle of claim 60, wherein the thermoplastic polymer forms a blend with the thermosetting resin.

70. The particle of claim 60, wherein the thermoplastic polymer comprises a member selected from the group consisting of ethylene-n-butyl acrylate copolymer, n-butyl acrylate homopolymer and mixtures thereof.

71. The particle of claim 60, wherein the thermoplastic polymer comprises a member selected from the group consisting of butadiene homopolymers and butadiene-acrylonitrile copolymers.

72. The particle of claim 60, wherein the thermoplastic polymer is selected from the group consisting of butadiene homopolymers having functional groups at their chain ends and butadiene-acrylonitrile copolymers having functional groups at their chain ends, wherein the functional groups are selected from the group consisting of carboxy, amine, methacrylate and epoxy.

73. The particle of claim 60, wherein the thermoplastic polymer comprises an ethylene-n-butyl acrylate copolymer having functional groups selected from the group consisting of carboxy, amine, methacrylate and epoxy.

74. The particle of claim 60, wherein the thermoplastic polymer comprises a polymer selected from the group consisting of a carboxyl terminated butadiene-acrylonitrile with an acrylonitrile content of about 10%, a Tg of about minus 50 to minus 77 degrees C., a Brookfield viscosity of about 60,000 MPa, and a carboxyl content of about 25%; a methacrylate vinyl terminated butadiene-acrylonitrile copolymer with an acrylonitrile content of about 18%, a Tg of up to about minus 59 degrees C., and a Brookfield viscosity of about 50000 MPa; an amine terminated butadiene-acrylonitrile copolymer with an acrylonitrile content of about 18%, a Tg of up to about minus 59 degrees C., and a Brookfield viscosity of about 100000 MPa; or a combination comprising at least one of the foregoing thermoplastic polymers.

75. The particle of claim 60, wherein the particle has a turbidity of 5 to 200 NTU.

76. The particle of claim 60, wherein upon being subjected to a 60 minute ball mill test, the particle achieves a turbidity measurement of less than 200 NTU at 30 minutes ball mill time and/or less than 300 NTU at 60 minutes ball mill time.

77. The particle of claim 60, wherein the particle, upon being subjected to a 60 minute ball mill test achieves a turbidity measurement of less than 100 NTU at 30 minutes ball mill time ad/or less than 150 NTU at 60 minutes ball mill dine.

78. The particle of claim 60, further having at least one precured thermosetting resin coating which reduces the fracture tendency of the coated particle, as measured by a crush resistance test, by at least 10% compared to a control particle which lacks the thermoplastic polymer.

79. The particle of claim 60, having at least one precured thermosetting resin coating and having sufficient thermoplastic polymer to have a crush strength at least equal to that of a control particle which lacks the thermoplastic polymer.

80. The particle of claim 60, wherein the particle displays reduced abrasion towards other particles, handling equipment and/or down hole tubular objects and/or equipment as compared with another particle that lack the thermoplastic polymer.

81. The particle of claim 60, having sufficient thermoplastic polymer to reduce water pickup byte particle of 20% as compared with a particle that lacks the thermoplastic polymer.

82. The particle of claim 60, having sufficient thermoplastic polymer to result in a particle having at least 10% of a reduction in weight loss under an API RP 56 acid resistance test as compared to a particle that lacks the thermoplastic polymer.

83. The particle of claim 60, having sufficient thermoplastic polymer to produce particles that are flowable after 24 hours of being stored at 95% relative humidity and 104 degrees F.

84. The particle of claim 60, wherein the amount of thermoplastic polymer is sufficient to produce reduced agglomeration, and wherein clusters and other oversized clumps are reduced by an amount effective to produce a yield improvement of at least 2 to 5% when compared with particle that lack the thermoplastic polymer.

85. A method for manufacturing a particle comprising:
heating a particulate substrate;
disposing upon the particulate substrate, a thermosetting resin; and
disposing upon the particulate substrate and/or the thermosetting resin, a thermoplastic polymer in an amount sufficient to improve the dust suppression and/or crush resistance and/or acid resistance and/or abrasion resistance of the particle above that which would occur if the thermoplastic polymer was absent; and wherein the particle comprises 0.005 to 4.0 weight percent of the thermoplastic polymer, based upon weight of the particle.

86. A particle comprising:
a substantially homogeneous formed particle comprising:
a core comprising a binder and filler particles dispersed throughout the binder, wherein particle size of the filler particles ranges from about 0.5 to about 60 µm; wherein the particle has a bulk density of 0.50 to 1.30 grams per cubic centimeter, and a grain density of 0.90 to about 2.2 gr/cm$^3$; and wherein the particle optionally has a resin coating; and
a thermoplastic polymer, wherein the thermoplastic polymer has a glass transition temperature of at most 50 degrees C. and is selected from the group consisting of homopolymers of C1-C12 alkyl(meth)acrylates, copolymers of olefins with C1-C12 alkyl(meth)acrylates, butadiene homopolymers, butadiene-acrylonitrile copolymers, and a semicrystalline polymer; and wherein the particle comprises 0.005 to 4.0 weight percent of the thermoplastic polymer, based upon weight of the particle.

87. A proppant pack comprising the particles of claim 1, after the particles are placed in a well bore.

88. A proppant pack comprising the particles of claim 7, after the particles are placed in a well bore.

89. A proppant pack comprising the particles of claim 56, after the particles are placed in a well bore.

90. A proppant pack comprising the particles of claim 59, after the particles are placed in a well bore.

91. A proppant pack comprising the particles of claim 60, after the particles are placed in a well bore.

92. A proppant pack comprising the particles of claim 86, after the particles are placed in a well bore.

93. A foundry particle comprising the particles of claim 1.

94. A foundry core or mold comprising the particles of claim 1.

95. A foundry particle comprising the particles of claim 7.

96. A foundry core or mold comprising the particles of claim 7.

97. A foundry particle comprising the particles of claim 60.

98. A foundry core or mold comprising the particles of claim 60.

* * * * *